(12) United States Patent
Sakoda

(10) Patent No.: US 7,657,276 B2
(45) Date of Patent: Feb. 2, 2010

(54) RADIO COMMUNICATION SYSTEM, RADIO COMMUNICATION APPARATUS, RADIO COMMUNICATION METHOD, AND COMPUTER PROGRAM

(75) Inventor: Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 11/042,520

(22) Filed: Jan. 26, 2005

(65) Prior Publication Data

US 2005/0210157 A1 Sep. 22, 2005

(30) Foreign Application Priority Data

Feb. 2, 2004 (JP) ............................. 2004-025506
Jan. 5, 2005 (JP) ............................. 2005-001004

(51) Int. Cl.
*H04B 7/00* (2006.01)
(52) U.S. Cl. ...................... 455/522; 455/421; 455/423; 455/435.1; 455/67.11
(58) Field of Classification Search ................. 455/420, 455/421

See application file for complete search history.

(56) References Cited

U.S. PATENT DOCUMENTS 6,882,851 B2 * 4/2005 Sugar et al. .................. 455/454

2002/0172186 A1 * 11/2002 Larsson ...................... 370/349

* cited by examiner

*Primary Examiner*—Yuwen Pan
(74) *Attorney, Agent, or Firm*—Oblon, Spivak, McClelland, Maier & Neustadt, L.L.P.

(57) ABSTRACT

In order to allow each of communication stations to execute impartial control of accesses to communication media by setting executable-communication ranges of their own independently of each other in a communication environment based on a CSMA method, the present invention provides a radio communication system in which each communication station is capable of checking the occupation state of communication media and setting such an executable-communication range of its own in accordance with the occupation state of the communication media that the number of communication stations coexisting in the executable-communication range is brought to a value within a predetermined range. For example, a specific communication station sets an executable-communication range of its own in order to limit the number of other communication stations capable of communicating with the specific communication station. In addition, a communication station sets an executable-transmission range suitable for an executable-reception range set by itself in order to reduce the degree of non-uniformity of the access control and to minimize the impact of interferences on other communication stations.

26 Claims, 32 Drawing Sheets

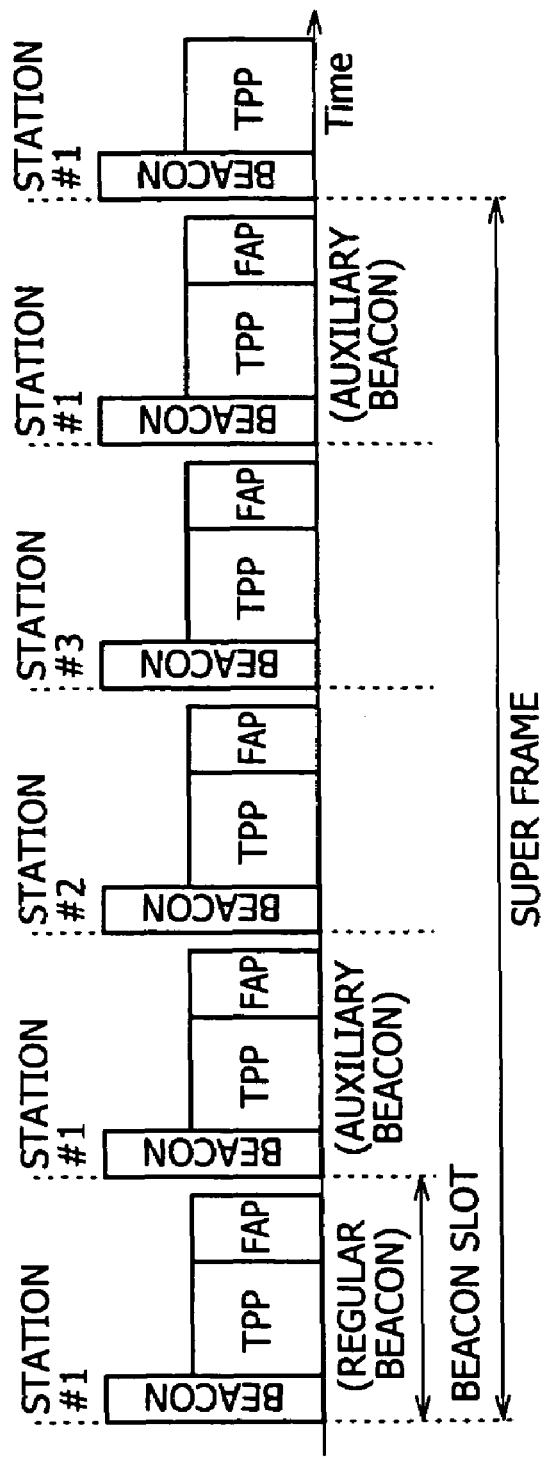

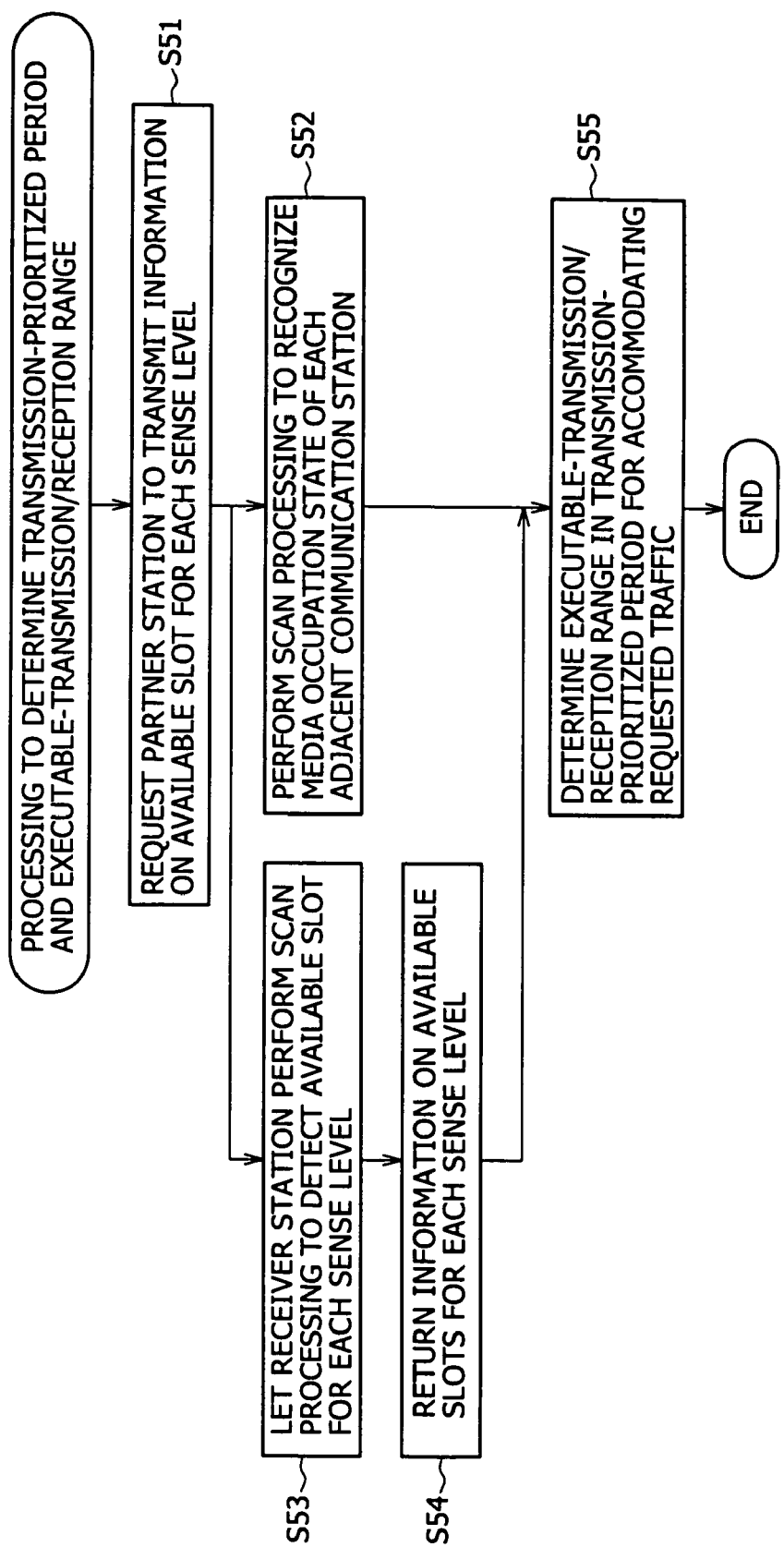

RADIO COMMUNICATION SYSTEM, RADIO COMMUNICATION APPARATUS, RADIO COMMUNICATION METHOD, AND COMPUTER PROGRAM

BACKGROUND OF THE INVENTION

The present invention relates to a radio communication system, radio communication apparatus, a radio communication method and a computer program for carrying out communications between a plurality of radio communication stations as is the case with a radio LAN (Local Area Network). More specifically, the present invention relates to a radio communication system, radio communication apparatus, a radio communication method and a computer program, in which radio communication stations make accesses to communication media while avoiding collisions in accordance with detection of carriers on the basis of a CSMA (Carrier Sense Multiple Access with Collision Avoidance) method.

To put it in more detail, the present invention relates to a radio communication system, radio communication apparatus, a radio communication method and a computer program, in which every radio communication station operates by obtaining a desired communication opportunity in accordance with the state of occupation of the communication media. More specifically, the present invention relates to a radio communication system, radio communication apparatus, a radio communication method and a computer program, in which every radio communication station operates by obtaining a desired communication opportunity by dynamically controlling a communication range in accordance with the state of occupation of the communication media.

By constructing a LAN including a plurality of computers connected to each other, information such as files and data can be shared by the computers, peripheral equipment such as a printer can be shared by the computers and information can be exchanged between the computers in the form of transmitted emails and transferred data/contents.

Traditionally, a wired LAN is generally constructed by using optical fibers, coaxial cables or twist-pair cables. In this case, a work to lay out the cables must be done. Thus, it is difficult to construct the network as a simple work. In addition, the work to draw the cables is complicated. On the top of that, after the construction, a range in which equipment can be moved from a location to another is restricted due to limited lengths of the cables so that the work to move equipment is not convenient either.

As a system for freeing the user from LAN wiring problems caused by the wire-communication method as described above, attention is paid to a radio LAN. In accordance with the radio LAN, in a work space such as an office, most of wiring cables can be eliminated. Thus, a communication terminal such as a personal computer (PC) can be moved from a location to another with ease.

In recent years, with an increased speed and decreased cost of a radio LAN, the demand for a radio LAN has been rising substantially. In particular, a study of introduction of a personal area network (PAN) is being conducted recently. The PAN is a small-scale radio network built to connect a plurality of electronic apparatus existing in the immediate surroundings of users in order to allow the electronic apparatus to communicate information between them. As the PAN, different radio systems using radio bands requiring no license from a supervisory authority are prescribed. Examples of the radio band requiring no license are the 2.4 and 5 GHz.

Standard specifications for radio network include IEEE (The Institute of Electrical and Electronics Engineers) 802.11 described in documents such as non-patent document 1, HiperLan/2 described in documents such as non-patent document 2 or 3, IEEE302.15.3 and Bluetooth communication. There are some different versions of the IEEE802.11 standard due to differences in adopted radio communication method and used frequency band. An example of the versions is an IEEE802.11a standard described in documents such as non-patent document 4.

Transmission and Reception Procedures

In general, a local area network using a radio technology is constructed by adoption of method by which an apparatus to serve as a control station called an access point or a coordinator is provided in the area covered by the local area network and a network is constructed under integrated control executed by the control station.

In a radio network including an access point, an access control method is widely adopted for transmitting information from a communication apparatus. In accordance with the access control method, first of all, a reservation is made with the access point as a reservation for a band required for the transmission of the information. Then, a transmission line is utilized in accordance with the reservation to avoid collisions with information transmissions carried out by other communication apparatus. That is to say, by providing an access point in the radio network, it is possible to carry out synchronous radio communications in which communication apparatus in the network establish synchronization with each other.

If communication apparatus on transmitting and receiver sides in a radio network including an access point carry out an asynchronous radio communication, however, the communication must be performed through the access point. Thus, the asynchronous radio communication raises a problem that the utilization of the transmission line is reduced to a half.

As another method of constructing a radio network, on the other hand, there has been proposed ad-hoc communication of allowing terminals to carry out an asynchronous communication directly. In particular, in the case of a small-scale radio network including relatively few clients located at locations close to each other, ad-hoc communication is pondered to be suitable direct asynchronous communication between any terminals without using a special access point. In a radio LAN system conforming to the IEEE802.11 standard, for example, an ad-hoc mode is provided as a mode in which the system allows terminals to operate as autonomous terminals in a distributed-processing manner and on a peer-to-peer basis without requiring a control station.

In this case, when a plurality of users makes accesses to the same channel, it is necessary to avoid contentions. As a representative communication procedure for avoiding a contention, a CSMA (Carrier Sense Multiple Access with Collision Avoidance) method is known. The CSMA method is a connection method allowing several accesses to be made on the basis of carrier detection. Since it is difficult for a terminal to receive a signal transmitted by the terminal itself as a signal representing transmitted information, in place of a CSMA/CD (Collision Detection) method, a CSMA/CA (Collision Avoidance) method is adopted. In accordance with the CSMA/CA method, a transmission of information from a communication apparatus is started only after confirming the fact that there is no transmission of information from another communication apparatus so that a collision can be avoided.

A communication based on the CSMA/CA method is explained by referring to FIG. 33 below. In the following example shown in the figure, four communication stations STA0 to STA3 exists in a communication environment.

Every communication station having data to be transmitted monitors the state of communication media for a predetermined frame interval DIFS following detection of a last packet. The frame interval DIFS is also referred to as a DCF (Distributed Coordination Function) Inter Frame Space. Then, if the communication media is clear or there is no transmitted signal during this frame interval DIFS, the communication station enters a random back-off period. If there is no transmitted signal also during this back-off period, the communication station is given a right of transmission.

In the following example shown in the figure, communication station STA0 with a set back-off period shorter than those of the other communication stations obtains a transmission right and is thus capable of starting a transmission of data to communication station STA1.

In the transmission of the data, communication station STA0 serving as the sender of the transmission of data stores information on an application of an NAV (Network Allocation Vector) and the length of time it takes to complete the transaction of the data communication in a duration field of the header of a MAC frame. In the following description, the header of a MAC frame is also referred to as a MAC header.

Station STAL serving as the receiver of the data-frame transmission carries out an operation to receive the data destined for this station itself throughout the period stored in the MAC header as a duration to be described later. As the operation to receive the data is completed, communication station STA1 transmits an ACK packet to the communication station STA0 serving as the sender of the data transmission in response to the transmitted data.

In the mean time, communication stations other than communication station STA1 serving as the receiver of the data-frame transmission to receive data frames each decode the duration field of the MAC header, recognizing that the communication media is being occupied, and inhibit a transmission of data without monitoring the media till the current transmission is ended. This work is referred to as establishment of an NAV (Network Allocation Vector). The NAV is effective throughout a time period indicated by the duration field. Typically, the duration field shows a period of time that lasts till communication station STA1 serving as the receiver of the data-frame transmission transmits an ACK packet to communication station STA0.

As described above, in accordance with the CSMA/CA method, only one communication station is capable of obtaining a transmission right while avoiding contentions and, in addition, the other communication stations each inhibit an operation to transmit data during the time period of the current data communication in order to get rid of collisions.

In this case, as is already known, a concealed-terminal problem is raised in the radio LAN network of the ad-hoc environment. A concealed terminal is a communication terminal that cannot be heard by a specific communication station serving as a communication partner in a communication between specific communication stations but can be heard by the other specific communication station serving as the other partner in the communication. Since concealed stations are not capable of carrying out a negotiation between each other, with only the CSMA/CA method described above, it is quite within the bounds of possibility that transmission operations result in a collision.

As one of methodologies for solving the concealed-terminal problem, a CSMA/CA method based on an RTS/CTS procedure is known. This known methodology is also adopted in the IEEE802.11 standard.

In accordance with the RTS/CTS method, a communication station serving as a data sender transmits an RTS (Request To Send) packet making a request for transmission of data to a communication station serving as a data receiver and the communication station serving as a data receiver transmits a CTS (Clear to Send) packet as a response to the RTS packet to inform the communication station serving as a data sender that the RTS packet has been received before the transmission of the data is started. Then, when a concealed terminal receives at least either the RTS or CTS packet, a period during which the execution of a data transmission based on the CTS/RTS procedure is expected is set as a transmission-inhibiting period of time in order to avoid collisions.

FIG. 34 is an explanatory diagram showing typical operations of this RTS/CTS procedure. In the case of this radio communication environment, however, four communication stations STA0 to STA3 are assumed to exist in the environment. Communication station STA2 is capable of communicating with adjacent communication station STA0. Communication station STA0 is capable of communicating with adjacent communication stations STA1 and STA2. Communication station STA1 is capable of communicating with adjacent communication stations STA0 and STA3. Communication station STA3 is capable of communicating with adjacent communication station STA1. In this case, communication station STA2 is seen by communication station STA1 as a concealed terminal and communication station STA3 is seen by communication station STA0 as a concealed terminal.

Every communication station having data to be transmitted monitors the state of communication media for a predetermined frame interval DIFS following detection of a last packet. The frame interval DIFS is also referred to as a DCF (Distributed Coordination Function) Inter Frame Space. If the communication media is clear or there is no transmitted signal during this frame interval DIFS, the communication station enters a random back-off period. If there is no transmitted signal also during this back-off period, the communication station is given a right of transmission.

In the following example shown in the figure, after the frame interval DIFS, communication station STA0 with a set back-off period shorter than those of the other communication stations obtains a transmission right and is thus capable of starting a transmission of data to communication station STA1.

That is to say, an RTS (request to send) packet is sent from communication station STA0 about to transmit data to communication station STA1. In response to the transmission request RTS packet, communication station STA1 transmits a CTS (clear to send) packet to communication station STA1 within a shorter frame interval SIFS (Short IFS). Then, within a shorter frame interval SIFS after receiving the CTS packet, communication station STA0 starts a transmission of data packets. As the transmission of data packets is completed, communication station STA1 transmits an ACK packet to communication station STA0 within a shorter frame interval SIFS.

At that time, communication stations STA3 and STA2 located at positions of concealed terminals seen from communication stations STA0 and STA1 respectively each execute control to inhibit a transmission of data till the communication between communication stations STA0 and STA1 described above is completed as indicated by a result of monitoring the utilization of a transmission line. To put it concretely, communication station STA2 detects the start of a data transmission from communication station STA1 serving as a data sender as evidenced by transmission of an RTS packet. Communication station STA2 then decodes information recorded in the duration field in the MAC header of the RTS packet. This information will be described later. A period, which lasts till the transmission of subsequent data packets is completed as evidenced by the transmission of the ACK packet, is recognized as a period during which the transmission line is already occupied. During this period, an NAV (Network Allocation Vector) is established and communication station STA2 enters a state of waiting for a transmission opportunity.

On the other hand, communication station STA3 detects the start of a data transmission to communication station STA1 serving as a data receiver as evidenced by transmission of a CTS packet. Communication station STA3 then decodes information recorded in the duration field in the MAC header of the CTS packet. This information will be described later. A period, which lasts till the transmission of subsequent data packets is completed as evidenced by the transmission of the ACK packet, is recognized as a period during which the transmission line is already occupied. During this period, an NAV is established and communication station STA3 enters a state of waiting for a transmission opportunity.

As described above, receiving at least either an RTS or CTS packet, a concealed terminal sets a transmission-inhibiting period of its own as a period coinciding with a time interval during which a data transmission based on the RTS/CTS procedure is expected to take place. Thus, a collision can be avoided. It is to be noted that the transmission rates for frames of exchanged CTS, data and ACK packets basically conform to the transmission rate adopted for the RTS packet.

Configuration of the Frame Format

FIG. 35 is a diagram showing a typical configuration of the frame format prescribed in the IEEE802.11a standard, which is an extension standard of IEEE802.11.

A preamble is added to the head of each packet as information indicating the existence of the packet. The preamble defines a known symbol pattern in accordance with specifications. The receiver examines the preamble of a received signal to determine whether or not the preamble matches the known symbol pattern. If the preamble of a received signal matches the known symbol pattern, a packet is determined to exist in the received signal.

A field following the preamble is defined as a signal field. The signal field includes information required for decoding an information portion of the packet. The information required for decoding the information portion of the packet is referred to as a PLCP (Physical Layer Convergence Protocol) header. The PLCP header includes a rate field, a length field, a parity bit, an encoder tail bit and a service field. The rate field shows the transmission rate of the information portion, which includes the service field of the PLCP header. The length field shows the length of the information portion. The packet receiver is capable of carrying the work to decode the information portion included in the packet as a portion following the PLCP header on the basis of results of decoding the rate and length fields included in the header.

A signal portion including the PLCP header is encoded into a noise-proof portion prior to a transmission at a speed of 6 Mbps. On the other hand, the information portion of an ordinary packet is transmitted in a transmission-rate mode having a highest possible bit rate in a range generating no errors in accordance with factors such as an SNR of the receiver.

The IEEE802.11a standard defines 8 different transmission-rate modes, i.e., modes at transmission rates of 6, 9, 12, 18, 24, 36, 48, and 54 Mbps. Thus, if the receiver and the transmitter are located at places close to each other, a transmission-rate mode at a high bit rate is selected. For a communication station existing at a far location, on the other hand, this information cannot be obtained in some cases.

The information portion is passed on to a link layer at a higher level as a PSDU (Physical Layer Service Data Unit).

As shown in FIG. 35, a preamble is included in the head of a transmitted signal as known information used for indicating the existence of the signal. FIG. 36 is a diagram showing a typical structure of the preamble as prescribed in the IEEE802.11a standard. Pre-1 and pre-2 portions of the preamble shown in FIG. 35 form a known pattern signal indicating that energy is filled for every four sub-carriers. The pattern includes a series of repeated electric waveforms each having a length of 0.8 microseconds. On the other hand, pre-3 and pre-4 portions of the preamble form a known pattern indicating that energy is filled for 52 sub-carriers. The pattern includes a series of repeated electric waveforms each having a length of 3.2 microseconds. The recipient receiving the packet is capable of determining the existence of the signal representing the packet on the basis of a result of processing a signal included in the 8.0-microsecond portion at the head of the preamble.

The IEEE802.11 standard defines some frame types. FIG. 37 is a diagram showing a typical structure of the PSDU portion in each of the RTS, CTS, ACK and data frames used in the RTS/CTS procedure described above.

The different frames each have a frame-control field and a duration field, which are defined as common fields. The frame-control field includes information indicating, among others, the type and application of the frame. To put it concretely, the frame-control field includes information described in table 1 below. On the other hand, the duration field describes information on an NAV application. To put it concretely, the duration field shows the length of time it takes to complete the transaction of all the packets.

TABLE 1

| Field name | Length [bits] | Description |
| --- | --- | --- |
| Protocol Version | 2 | Information on a version |
| Type/Subtype | 6 | Identifier indicating a frame type |
| To DS, From DS | 2 | Identifier indicating what each address shows |
| More Fragment | 1 | Flag indicating the end of a fragment |
| Retry | 1 | Flag indicating whether retransmission is necessary |
| Power Management | 1 | Flag showing a power management mode |
| More Data | 1 | Flag indicating that more data has been stored |
| WEP | 1 | Flag showing utilization of a WEP |
| Order | 1 | |

In addition to the frame-control and duration fields described above, an RTS frame includes a receiver address (RA), a transmitter address (TA) and a frame check sequence (FCS), which is a checksum. The receiver address (RA) and the transmitter address (TA) are the address of the receiver and the address of the transmitter respectively.

In addition to the frame-control and duration fields described above, CTS and ACK frames each include a receiver address (RA) and an FCS, which is a checksum.

In addition to the frame-control and duration fields described above, a data frame includes four address fields, a sequence field (SEQ), a frame body, and an FCS, which is a checksum. The four address fields are fields for identifying, among others, communication stations serving as the sender and the transmitter. The frame body is a field containing net information to be passed on to an apparatus on a high layer.

Take the case shown in FIG. 34 as an example. In this case, communication station STA0 transmits an RTS packet to communication station STA1. The type/subtype information included in the frame-control field of the RTS packet indicates that the packet is an RTS packet. The duration field of the RTS packet shows the length of time it takes to complete the transaction to transmit all packets. That is to say, the duration field shows the length of a period ending at a time T8. The RA field describes the address of communication station STA1 and the TA field describes an address of its own.

This RTS packet is also received by communication station STA2 adjacent to communication station STA0. Receiving the RTS packet, communication station STA2 detects the preamble of the packet and then starts a work to receive an RTS signal representing the RTS packet. Subsequently, on the basis of information obtained as a result of decoding the PLCP header, communication station STA2 decodes the PSDU. Then, from the frame-control field of the PSDU, communication station STA2 recognizes the fact that the received packet is an RTS packet and transmits some information to communication station STA0 to notify communication station STA0 that the RTS packet has been received. In addition, from the RA field, communication station STA2 is capable of recognizing the fact that communication station STA2 is not a communication station for which the RTS packet is destined. Then, communication station STA2 recognizes the fact that the communication media is being occupied, establishes a NAV and inhibits transmission operations without monitoring the communication media till the present transaction started by the RTS packet is completed so that the data transmission desired by communication station STA0 is not obstructed. The established NAV is effective during a period indicated by the duration field. Thus, communication station STA2 is put in a state of being incapable of transmitting data till the time T8.

On the other hand, this RTS packet is also received by communication station STA1 designated as the destination of the packet. By execution of a procedure similar to the one described above, communication station STA1 decodes the PSDU and, from the frame-control field, communication station STA1 recognizes the fact that the received packet is an RTS packet. In addition, from the RA field, communication station STA1 is capable of recognizing the fact that communication station STA1 itself is a communication station for which the RTS packet is destined. That is to say, as communication station STA1 recognizes the fact that communication station STA0 intends to transmit packets to communication station STA1, communication station STA1 transmits a CTS packet to communication station STA0 at a time T3 within a frame interval SIFS in response to the RTS packet. The frame-control field of the PSDU of the CTS packet shows that this packet is a CTS packet. On the other hand, the duration field shows the length of time it takes to complete the transaction, that is, the length of a period ending at the time T8. The RA field describes the address of communication station STA0 serving as the destination of the packet transmission. It is to be noted that the transmission-rate mode of the CTS packet must be the same as that of the RTS packet.

By the way, this CTS packet is also received by communication station STA3 adjacent to communication station STA1. Receiving the CTS packet, communication station STA3 detects the preamble of the packet and then starts a work to receive a CTS signal representing the CTS packet. Subsequently, on the basis of information obtained as a result of decoding the PLCP header, communication station STA3 decodes the PSDU. Then, from the frame-control field of the PSDU, communication station STA3 recognizes the fact that the received packet is a CTS packet. In addition, since the RA field describes the address of communication station STA0 other than communication station STA3 itself as the destination of the packet transmission, communication station STA3 is capable of recognizing the fact that packet reception by an adjacent communication station is scheduled. Then, communication station STA3 establishes a NAV and inhibits transmission operations till the present transaction started by the RTS packet is completed so that the packet reception desired by communication station STA1 is not obstructed. The established NAV is effective during a period indicated by the duration field. Thus, communication station STA3 is put in a state of being incapable of transmitting data till the time T8.

On the other hand, this CTS packet is also received by communication station STA0 designated as the destination of the packet. By execution of a procedure similar to the one described above, communication station STA0 decodes the PSDU and, from the frame-control field, communication station STA0 recognizes the fact that the received packet is a RTS packet. In addition, from the RA field, communication station STA0 is capable of recognizing the fact that communication station STA0 is a communication station for which the packet is destined. That is to say, communication station STA0 recognizes the fact that communication station STA1 has completed preparations for receiving packets from communication station STA0. Then, communication station STA0 starts a transmission of a data packet to communication station STA1 at a time T5 within a frame interval SIFS in response to the packet.

The transmission of a data packet is ended at a time T6. If communication station STA1 is capable of decoding the data correctly, communication station STA1 transmits an ACK packet at a time T7 within a frame interval SIFS to communication station STA0. Communication station STA0 receives the ACK packet and ends the transaction to transmit and receive packets at the time T8. At the time T8, adjacent communication stations STA2 and STA3 discontinue the NAV and return to a normal state of being capable of transmitting and receiving packets.

The control and data frames are transmitted and received through the same communication media and, basically, the transmission power is not controlled.

Typical Access Control in the CSMA Procedure

The basic operations of the access control based on the CSMA method have been described by referring to FIG. 33. By referring to FIGS. 38 and 39, the following description explains operations of the access control taking the existence of a communication station into consideration.

In the example shown in FIG. 38, four communication stations STA0, STA1, STA2, and STA3 exist. Communication station STA0 intends to transmit data to communication station STA2 while communication station STA1 is transmitting data to communication station STA3. In addition, all the communication stations transmit data through common communication media.

Before communication station STA0 transmits data to communication station STA2, communication station STA0 checks the state of media utilization. While communication station STA1 is transmitting data to communication station STA3, communication station STA0 is not capable of transmitting data to communication station STA2.

In the example shown in FIG. 39, four additional communication stations STA4, STA5, STA6, and STA7 exist as well. Communication station STA4 may be transmitting data to communication station STA5, or communication station STA6 may be transmitting data to communication station STA7. In addition, all the communication stations transmit data through common communication media.

Before communication station STA0 transmits data to communication station STA2, communication station STA0 checks the state of media utilization. While communication station STA1 is transmitting data to communication station STA3, communication station STA4 is transmitting data to communication station STA5, or communication station STA6 is transmitting data to communication station STA7, communication station STA0 is not capable of transmitting data to communication station STA2.

As is obvious from the above description, as the number of communication stations transmitting data through common communication media (or transmitting data within an executable-communication range) increases, it is natural that a communication station more likely loses a transmission opportunity. The technical term 'executable-communication range' used in this specification means a range in which communications can be carried out.

In addition, if a specific communication station holds pieces of information on surrounding communication stations existing in an executable-reception range of the specific communication station, it is necessary to set the maximum number of surrounding communication stations whose pieces of information can be held at a large value taking a worst case into consideration so that the actual number of surrounding communication stations whose pieces of information can be held does not exceed the large value. The technical term 'executable-reception range' used in this specification means a range in which receptions of data can be carried out.

The following description describes a study of problems raised in an access control method based on the CSMA technique including the RTS/CTS procedure described above.

(1) Access-Control Non-Uniformity Caused by Non-Uniformity of Transmission Powers The access control method based on the CSMA technique including the RTS/CTS procedure raises a problem of access-control non-uniformity among communication stations having different transmission powers.

In an example shown in FIG. 40, four communication stations, namely, STA2, STA0, STA1, and STA3, exist in a communication environment. It is assumed that communication station STA1 intends to transmit data to communication station STA3 and communication station STA0 intends to transmit data to communication station STA2. It is also assumed that, in the example shown in the figure, basically, only communication stations adjacent to each other are located in a range that can be reached by a transmitted electric wave. In addition, the following description also assumes transmission-power non-uniformity. Since the transmission power of communication station STA0 is smaller than the transmission power of communication station STA1, a signal transmitted by communication station STA1 to communication station STA0 in the direction of STA1→STA0 can be received by communication station STA0, but a signal transmitted by communication station STA0 to communication station STA1 in the direction of STA0→STA1 cannot be received by communication station STA1.

First of all, at a time T1, communication station STA1 transmits an RTS signal to communication station STA0 after verifying that the communication media is clear during a predetermined frame period and completing a set back-off state.

Since a signal transmitted by communication station STA1 in the direction of STA1→STA0 can be received by communication station STA0 as described above, communication station STA0 receives the RTS signal and sets a NAV ending at a time T8 at which the transaction initiated by the RTS signal will be completed. During the NAV, communication station STA0 is not capable of transmitting data. Then, in accordance with the RTS/CTS procedure described earlier, communication station STA1 transmits data to communication station STA3 and ends the transaction at the time T8.

Thereafter, assume that communication station STA0 is capable of transmitting an RTS signal at a time T9 after verifying that the communication media is clear during a predetermined frame period and completing a set back-off state in the same way as communication station STA1 did as described above. Since a signal transmitted by communication station STA0 to communication station STA1 in the direction of STA0→STA1 cannot be received by communication station STA1 as described above, the RTS signal transmitted by communication station STA0 does not arrive at communication station STA1. Thus, communication station STA1 is capable of transmitting a signal independently of the transmission/reception state of communication station STA0.

In a word, communication station STA1 capable of transmitting data with a large transmission power is placed in an unconditionally favorable position in comparison with communication station STA0, which has only a small transmission power. As a result, a problem of non-uniform accesses is raised if impartial control of accesses among communication stations is to be implemented.

It is to be noted that a variable area ad-hoc network has been proposed as described in documents such as patent document 1. In the variable area ad-hoc network, prior to a transmission of a radio packet, a transmission power required for the transmission is determined. However, every radio communication apparatus in such a network determines a transmission power by considering a frequency utilization rate and necessary transmission time for each transmission path as well as the importance and type of information to be transmitted even though the occupation state of the communication media is not taken into consideration. In other words, the communication station is not capable of recovering a transmission opportunity, which has been lost due to a particular occupation state of the communication media.

(2) Fewer Transmission Opportunities for Many Adjacent Stations

In the access method based on the CSMA technique as shown in FIG. 38, the number of transmission opportunities decreases as the number of communication stations each making an attempt to transmit and receive data through the same communication media increases. Consider a case in which a particular communication station intends to communicate with another communication station, which is located at a location extremely close to the particular communication station and has a very small loss of a pass to the particular communication station in comparison with the loss of a pass between the particular communication station and any other communication station. Even in this case, while the other communication station is receiving a signal from a further communication station, the particular communication station is not allowed to communicate with the other communication station in order to avoid a collision.

(3) Limiting the Number of Managed Stations for Many Adjacent Stations

In a radio communication system, in which every specific communication station is linked with all other communication stations in a range reachable by an electric wave transmitted by the specific communication station, for example, the specific communication station needs to store information on the other communication stations.

In most general cases, however, the number of other communication stations on which information can be stored in the specific communication station is limited by a hardware restriction of the specific communication station or a system restriction. If the number of other communication stations exceeds the limit, it is feared that complicated processing such as exception processing needs to be carried out.

As a conceivable solution to the above problem, a worst-case value or a maximum value of the number of other communication station is set at a sufficiently large value so that it is not necessary to carry out exception processing. From the implementation point of view, however, allocation of an exhaustlessly large memory area is not desirable. In addition, in dependence on the system, if too many other communication stations exist, another communication station can probably no longer be accommodated.

[List of Documents]
[Patent Document 1]
  Japanese Patent Laid-open No. 2001-128231
[Non-patent Document 1]
  International Standard ISO/IEC 8802-11: 1999 (E) ANSI/IEEE Std 802.11, 1999 Edition, Part 11: Wireless LAN Medium Access Control (MAC) and Physical Layer (PHY) Specifications
[Non-patent Document 2]
  ETSI Standard ETSI TS 101 761-1 V1.3.1 Broadband Radio Access Networks (BRAN); HIPERLAN Type 2; Data Link Control (DLC) Layer; Part 1: Basic Data Transport Functions
[Non-patent Document 3]
  ETSI TS 101 761-2 V1.3.1 Broadband Radio Access Networks (BRAN); HIPERLAN Type 2; Data Link Control (DLC) Layer; Part 2: Radio Link Control (RLC) sublayer
[Non-patent Document 4]
  Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-speed Physical Layer in the 5 GHZ Band

SUMMARY OF THE INVENTION

It is thus a main object of the present invention, which addresses the problems described above, to provide an excellent radio communication system, radio communication apparatus and a radio communication method, and a computer program allowing each communication station to properly make accesses to communication media while avoiding collisions in accordance with carrier detection on the basis of a CSMA method.

It is another object of the present invention to provide an excellent radio communication system, radio communication apparatus and a radio communication method, and a computer program allowing every communication station to properly operate by obtaining a desired communication opportunity in accordance with a state of occupation of communication media in a radio communication environment wherein control of accesses to the communication media is executed on the basis of the CSMA method.

It is a further object of the present invention to provide an excellent radio communication system, radio communication apparatus and a radio communication method, and a computer program allowing every communication station to properly operate by obtaining a desired communication opportunity in accordance with a state of occupation of communication media in a radio communication environment wherein control of accesses to the communication media is executed on the basis of the CSMA method.

It is a still further object of the present invention to provide an excellent radio communication system, radio communication apparatus and a radio communication method, and a computer program with features of allowing every communication station to set an executable-communication range in which the communication station is capable of independently transmitting and receiving data and being capable of executing impartial control of accesses to communication media without causing every communication station to experience non-uniformity access opportunities even if communication stations each set an executable-transmission range in a radio communication environment wherein control of accesses to the communication media is executed on the basis of the CSMA method. The technical term 'executable-transmission range' used in this specification means a range in which transmissions of data can be carried out.

It is a still further object of the present invention to provide an excellent radio communication system, radio communication apparatus and radio communication method, and a computer program allowing any specific communication station to obtain a desired opportunity to transmit data even if the number of communication stations existing around the specific communication station increases in a radio communication environment wherein control of accesses to the communication media is executed on the basis of the CSMA method.

It is a still further object of the present invention to provide an excellent radio communication system, radio communication apparatus and a radio communication method, and a computer program allowing information on adjacent communication stations to be properly managed even if the number of communication stations existing around the specific communication station increases in a radio communication environment wherein control of accesses to communication media is executed on the basis of the CSMA method.

In accordance with a first aspect of the present invention addressing the problems described above, there is provided a radio communication system allowing each communication station to properly make accesses to communication media while avoiding collisions in accordance with detection of signals transmitted by other communication stations or information described in the transmitted signals.

Each communication station is allowed to set an executable-communication range in which the communication station is capable of transmitting and receiving data.

Each communication station checks the occupation state of the communication media and sets an executable-communication range of its own.

It is to be noted that the technical term 'system' used in this specification means a logical set of a plurality of apparatus or a plurality of functional modules each used for implementing a specific function. However, the apparatus or the functional modules do not have to be specially accommodated in a single box.

In the radio communication system provided by the present invention, every communication station controls accesses to the communication media while avoiding collisions in accordance with detection of signals transmitted by other communication stations by execution of typically a CSMA/MA procedure. As an alternative, every communication station controls accesses to the communication media while avoiding collisions in accordance with information described in a transmitted signal. The information includes a duration defined as typical information on a packet transmission period and information on a timing with which the other communication station transmits the signal. In addition, every communication station is capable of making a multi-dimensional connection in time-division multi communication.

In the radio communication system provided by the present invention, each communication station is capable of controlling a signal detection capability of its own to set an executable-reception range. In addition, each communication station is capable of controlling a transmission power of its own to set an executable-transmission range.

That is to say, each communication station is capable of checking the occupation state of the communication media and setting such an executable-communication range of its own in accordance with the occupation state of the communication media that the number of communication stations coexisting in the executable-communication range is brought to a value within a predetermined range.

Assume for example that any particular communication station recognizes the fact that an adjacent communication station is sending data by setting an executable-transmission range wider than the executable-transmission range of the particular communication station. In this case, as a response to such recognition, the particular communication station changes the executable-reception range of its own. In another typical case, a particular communication station recognizes the fact that that the particular communication station is located outside an executable-reception range of another communication station capable of receiving data transmitted by the particular communication station. In this other case, as a response to such recognition, the particular communication station may change the executable-reception range of its own. The executable-communication range is changed in this way, and the particular communication station is capable of establishing balance between the particular communication station itself and each of the communication stations surrounding the particular communication station as well as implementing impartial and uniform control of accesses.

In addition, a communication station may autonomously change the executable-transmission range and the executable-reception range for the purpose of reducing the number of interferences when, for example, a result of determination indicates that reception-power information received from a communication station serving as a communication-partner station is sufficiently high so that data can be transmitted at a desired high data rate even if the transmission power is decreased.

In addition, any specific communication station may change the executable-transmission range and the executable-reception range for the purpose of assuring a wider transmission time band when a result of determination indicates that a period of transmission to a desired communication partner cannot be assured due to the fact that a state in which signals from communication stations other than the desired communication partner are occupying the communication media has been continuing.

In addition, a result of determination may indicate ambiguity as to whether the adjacent communication stations are each capable of communicating with the specific communication station due to the fact that the adjacent communication stations are located in the vicinity of the border of the wave range. In that case, any specific communication station may change the executable-transmission range and the executable-reception range for the purpose of excluding one or more adjacent communication stations from a wave range reachable by an electric wave transmitted by the specific communication station or including the adjacent communication stations in the wave range with a high degree of reliability.

In addition, any specific communication station may change the executable-transmission range and the executable-reception range for the purpose of absorbing differences in number of interferences between other communication stations surrounding the specific communication station when a result of determination indicates that there are variations in transmission power, transmitted-signal precision, and reception characteristic, which are inherent in the other communication stations.

In addition, any specific communication station is capable of changing an executable-reception range of its own for the purpose of limiting the number of communication stations from which the specific communication station is capable of receiving data. Thus, even if the number of communication stations surrounding the specific communication station is increased, a proper executable-communication range is set. Accordingly, the specific communication station is capable of properly managing information on the communication stations surrounding the specific communication station without rising the magnitude of a hardware load borne by the specific communication station.

In addition, as the number of communication stations surrounding a specific communication station increases, the period in which the communication media is clear for the specific communication station becomes shorter so that the number of transmission opportunities is expected to decrease. In such a case, proper executable-communication range is set, and the specific communication station is capable of obtaining a desired transmission opportunity.

In addition, any specific communication station is capable of changing an executable-transmission range of its own for the purpose of limiting the number of communication stations to which the specific communication station is capable of transmitting data.

An executable-communication range of a communication station includes an executable-reception range and an executable-transmission range. The former range can be set in accordance with the signal detection capability of the communication station whereas the latter range can be set in accordance with the transmission power of the communication station. The former and latter ranges can be set independently of each other.

In addition, it is possible to provide a configuration, which is set to allow every communication station to change an executable-communication range of its own. For example, it is possible to provide a configuration, which is set to allow every communication station to narrow an executable-communication range of its own only for a period in the neighborhood of a time band of communication with a specific communication station. In addition, a communication station may extract media occupation information according to the executable-transmission range and executable-reception range of both the transmitter and receiver communication stations prior to determination of a time band of communication between the communication station and a specific communication station, and determine the communication time band on the basis of the extracted media occupation information.

If the executable-reception range and executable-transmission range of a specific communication station are set non-uniformly, the following phenomena may occur. That is to say, the specific station may be capable of receiving a signal from another communication station but incapable of transmitting a signal to the other station. Conversely, the specific station may be capable of transmitting a signal to another communication station but incapable of receiving a signal from the other station. In such cases, a communication station capable of transmitting data at a high transmission power is placed in an unconditionally favorable position, being capable of acquiring a right of making an access to the communication media with ease. Thus, there is raised a problem of non-uniformity of access control.

In accordance with the present invention, on the other hand, an executable-transmission range suitable for an executable-reception range by a communication station is set, or an executable-reception range suitable for an executable-transmission range by the station is set. The station is capable of operating in an executable-transmission range extremely uniform with its executable-reception range. Thus, even in a radio communication environment in which every communication station is permitted to set its own executable-communication range allowing data to be transmitted by the station to another station, the aforementioned problem of non-uniformity of access control can be solved.

In addition, when specific communication stations operate as respectively a master station and a slave station capable of communicating only with the master station, the slave station is required to have only a relatively low processing capability and does not have an intention to receive a signal from a communication station other than the master station. Thus, such a slave station may set the executable-reception range of its own at a value not exceeding the executable-reception range of the master station. In addition, a communication station serving as a slave station may report existence of its own to the master station in response to a signal received from the master station.

In addition, communication stations may exchange information on their executable-transmission ranges. In a radio communication network of an autonomous-distribution type, for example, all communication stations transmit beacon signals to each other independently of each other. A beacon signal transmitted by a communication station conveys information on a transmission power of the station.

In a radio communication system in which every communication station mutually recognizes transmission powers of other communication stations, a communication station transmitting data is capable of estimating a receiver SNR of a communication station serving as the destination of the transmission in order to determine a proper data rate. To put it in detail, a communication station transmitting data is capable of estimating a receiver SNR of a communication station serving as the destination of the transmission on the basis of a receiver SNR obtained from a signal received in the past from the receiver communication station as well as transmission powers of the transmitting and receiver stations. Then, the transmitter communication station is capable of determining a proper data rate in accordance with a result of the estimation.

In addition, in accordance with a second aspect of the present invention, there is provided a computer program written in a format that can be read by a computer as a program to be executed by said computer in a computer system to carry out processing for controlling operations of a radio communication apparatus making accesses to communication media while avoiding collisions in accordance with detection of signals transmitted by other communication stations or in accordance with information described in the transmitted signals in a predetermined radio communication environment. The computer program includes a media-monitoring step of monitoring the occupation state of the communication media, and a communication control step of setting an executable-communication range in communication means on the basis of the communication-media occupation state monitored at the media-monitoring step.

The computer program according to the second aspect of the present invention is a computer program written in a format that can be read by a computer for carrying out predetermined processing in a computer system. In other words, the computer program according to the second aspect of the present invention is installed in a computer system, and the computer system is capable of demonstrating collaborative actions to operate as a radio communication apparatus. A plurality of such radio communication apparatus is activated, a radio communication network can be constructed to provide the same effects as the radio communication system according to the first aspect of the present invention.

In accordance with the present invention, every communication station is capable of controlling a range allowing a signal to be received. Thus, the non-uniformity of the control of accesses to the communication media can be substantially reduced even for communication stations with different transmission powers. As a result, impartial data transmission highly independent of transmission powers can be implemented.

In addition, in accordance with the present invention, even if a number of communication stations appears around a specific communication station, a range of receiving signals for the specific communication station can be controlled to considerably reduce the length of a period during which the specific communication station is not capable of transmitting a signal. In addition, the transmission power is controlled at the same time, and the impact of interferences on other communication stations can be reduced.

Thus, in accordance with the present invention, since the signal transmission/reception range can be controlled in accordance with the number of surrounding communication stations and the time band in which the communication media is occupied by other communication stations, even in a radio communication system limiting the number of communication stations accommodated therein and the amount of traffic among the accommodated stations, it is possible to assure good communications in an accommodatable range in exchange for shrinkage of the signal transmission/reception range.

Other objects of the present invention as well as its characteristic and merits will probably become apparent from the following more detailed explanation based on embodiments described below by referring to diagrams as embodiments of the present invention.

BRIEF DESCRIPTION OF THE DRAWINGS

FIG. 20 is a diagram showing a state in which a communication station transmits a plurality of virtual beacons each referred to as an auxiliary beacon to increase the transmission-prioritized period;

FIG. 21 is a diagram showing a typical format of a beacon frame transmitted in a radio communication system provided by the present invention as a radio communication system having an autonomous-distribution type;

FIG. 43 shows a flowchart representing a processing procedure executed by a communication station to determine an executable-reception range and executable-transmission range of its own on the basis of the state of utilization of the transmission-prioritized period of every adjacent communication station and the sense level of every adjacent communication station.

DETAILED DESCRIPTION OF THE PREFERRED EMBODIMENTS

Embodiments of the present invention are described by referring to diagrams as follows.

Transmission lines used in communications assumed in the present invention are radio lines forming a network connecting a plurality of communication stations. The communication assumed in the present invention is traffic of a store-and-forward type. Through the assumed communication, information is transmitted in packet units. In addition, in the following description, every communication station is assumed to be a single-channel communication station. However, the present invention can be extended to a case in which communication media is multi-channel communication media including a plurality of frequency channels.

In a radio communication network provided by the present invention, data transmissions effectively utilizing channel resources and transmitted (MAC) frames in a flexible time-division-multiplexing access structure are controlled. In addition, every communication station is capable of transmitting information directly and asynchronously in accordance with an access procedure based on the CSMA (Carrier Sense Multiple Access) method. In an embodiment of the present invention, a communication environment is assumed as an environment conforming to IEEE802.11a, which is an extension standard of IEEE802.11.

A. Configuration of the Radio Communication Apparatus

Figure 1:
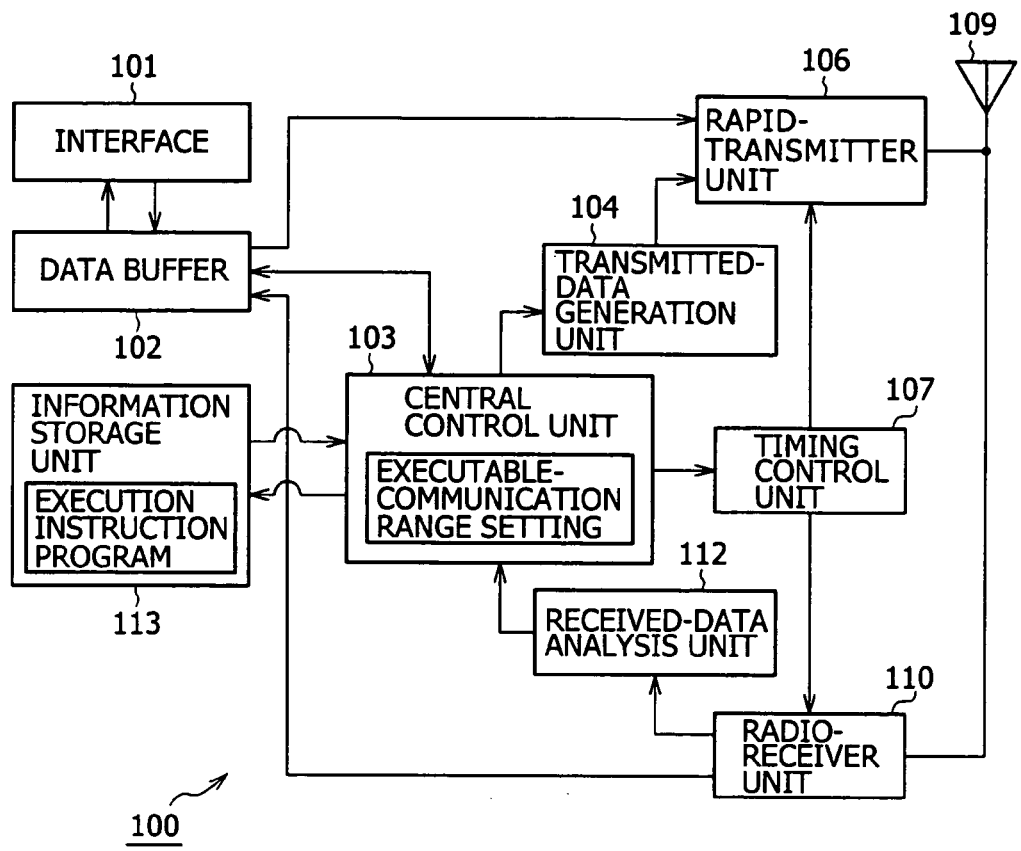
FIG. 1 is a diagram showing a model of the functional configuration of a radio communication apparatus operating as a communication station in a radio communication network implemented by an embodiment of the present invention.

FIG. 1 is a diagram showing a model of the functional configuration of a radio communication apparatus 100 operating as a communication station in a radio communication network implemented by an embodiment of the present invention. The radio communication apparatus 100 shown in the figure is connected to other radio communication apparatus by a network allowing the apparatus to effectively make channel accesses in the same radio communication system.

As shown in the figure, the radio communication apparatus 100 includes an interface 101, a data buffer 102, a central control unit 103, a transmitted-data generation unit 104, a radio-transmitter unit 106, a timing control unit 107, an antenna 109, a radio-receiver unit 110, a received-data analysis unit 112 and an information storage unit 113.

The interface 101 is a component for exchanging various kinds of information with an external apparatus connected to the radio communication apparatus 100 even though the apparatus is not shown in the figure. An example of the external apparatus is a personal computer.

The data buffer 102 is a memory for temporarily storing data received from an apparatus connected to the radio communication apparatus 100 through the interface 101 and a radio transmission line.

The central control unit 103 is a component for managing a series of information transmission/reception processes in the radio communication apparatus 100 and controlling accesses to the transmission line in a centralized manner. Basically, the control of accesses to the transmission line is executed to operate a back-off timer over random times while monitoring the state of the transmission line on the basis of the CSMA method and obtain a right to transmit data if no signal is transmitted during the back-off period. In this embodiment, the central control unit 103 checks the occupation state of the communication media and sets such an executable-communication range of its own that the number of communication stations coexisting in the executable-communication range is in a predetermined range.

The transmitted-data generation unit 104 generates packet and beacon signals to be transmitted from the radio communication apparatus 100 to another communication station designated as a receiver station. A packet exchanged between communication stations can be a data packet, an RTS packet, a CTS packet, or an ACK packet. In the case of the radio communication apparatus 100, the radio communication apparatus 100 transmit an RTS packet to a communication station, which is designated as a receiver station to receive data to be transmitted, as a packet to make a request for a transmission of the data. The radio communication apparatus 100 receives a CTS packet from the communication station designated as a receiver station to receive data as a packet indicating that this receiver station is ready to receive the data. The radio communication apparatus 100 receives an ACK packet from the receiver station as a packet indicating that the receiver station has received the data transmitted by the radio communication apparatus 100. For example, a portion having a predetermined length is extracted from data stored in the data buffer 102 to be transmitted and used as the payload of a created data packet.

The radio-transmitter unit 106 includes a modulator, a D/A converter, an up-converter, and a power amplifier (PA), which are not shown in the figure. The modulator is a component for modulating a signal to be transmitted by adoption of a predetermined modulation method such as an OFDM (Orthogonal Frequency Division Multiplexing) method. The D/A converter is a component for converting digital signal to be transmitted into an analog signal. The up-converter is a component for up-converting the analog signal to be transmitted by applying frequency conversion to the analog signal. The power amplifier is a component for amplifying the power of the up-converted signal to be transmitted. The radio-transmitter unit 106 then carries out a radio transmission process to transmit the amplified signal at a predetermined transmission rate. In this embodiment, the transmission power is controlled in the radio-transmitter unit 106, and the radio communication apparatus 100 is capable of setting an executable-transmission range of its own. In addition, in this embodiment, a transmission rate is determined on the basis of a transmission power and a receiver SNR, which are set as quantities between the radio communication apparatus 100 and each communication partner. The determination of a transmission rate will be described later in detail.

The radio-receiver unit 110 includes an LNA (Low Noise Amplifier), a down-converter, an AGC (Automatic Gain Controller), an A/D converter, and a demodulator, which are not shown in the figure. The LNA is a component for amplifying the voltage of a signal received from another communication station through the antenna 109. The down-converter is a component for down-converting a signal completing the voltage amplification in the LNA by applying frequency conversion to the signal. The A/D converter is a component for converting a received analog signal into a digital signal. The demodulator is a component for carrying out a synchronization process for establishing synchronization, a channel estimation process, and a demodulation process adopting a demodulation method such as the OFDM method. In this embodiment, a signal detection capability is controlled in the radio-receiver unit 110, and the radio communication apparatus 100 is capable of setting an executable-reception range of its own.

The antenna 109 is a component for transmitting a signal destined for another radio communication apparatus through a predetermined frequency channel of radio communication or receiving a signal transmitted by another radio communication apparatus. In this embodiment, only one antenna is provided for each communication station and cannot be used for transmitting and receiving signals simultaneously at the same time.

The timing control unit 107 is a component for controlling timings to transmit and receive radio signals. The timings include a timing to transmit a packet of its own and timings to transmit packets such as the RTS, CTS, data and ACK packets conforming to the RTS/CTS method. In addition, the timings also include a timing to set a NAV as well as a timing to transmit and receive beacon signals when receiving a packet destined for another communication station. The timings to transmit packets conforming to the RTS/CTS method set a frame interval IFS and a back-off period.

The received-data analysis unit 112 is a component for analyzing packet and beacon signals received from another communication station.

The information storage unit 113 is a memory used for storing instructions of a procedure for executing processing such as operations to control a sequence of accesses made by the central control unit 103. The information storage unit 113 is also used for storing data including information obtained from a result of an analysis of received packet and beacon signals.

In this embodiment, the central control unit 103 carries out operations to control communications by checking the communication media and setting such an executable-communication range of its own communication station that the number of communication stations coexisting in the executable-communication range is in a predetermined range.

For example, the central control unit 103 sets an executable-communication range of its own communication station in order to limit the number of communication stations existing in the executable-communication range. Thus, a suitable executable-communication range of its own communication station is set, and it is possible to properly manage information on adjacent communication stations without increasing a hardware load even if the number of surrounding communication stations increases.

In addition, as the number of communication stations surrounding the communication station of its own increases, the period in which the communication media is clear for the communication station of its own becomes shorter so that the number of transmission opportunities is expected to decrease. In such a case, a proper executable-communication range is set, and the communication station of its own is capable of adjusting the number of coexisting communication stations and obtaining a desired transmission opportunity.

On the top of that, the central control unit 103 is capable of setting an executable-communication range of its own communication station in order to limit the number of communication stations to which data can be transmitted from the communication station of its own.

In this case, if an executable-transmission range for the radio-transmitter unit 106 and an executable-reception range for the radio-receiver unit 110 are set individually, and the executable-transmission range and the executable-reception range are set at non-uniform values, the non-uniform setting raises a problem of non-uniformity of access control that a communication station capable of transmitting data at a high transmission power is placed in an unconditionally favorable position allowing a right to make an access to the communication media to be obtained with ease. In order to solve this problem of non-uniformity of access control, the executable-transmission range is set at a value suitable for the executable-reception range, or the executable-reception range is set at a value suitable for the executable-transmission range so that the communication station of its own is capable of operating at uniform executable-transmission and executable-reception ranges.

Figure 2:
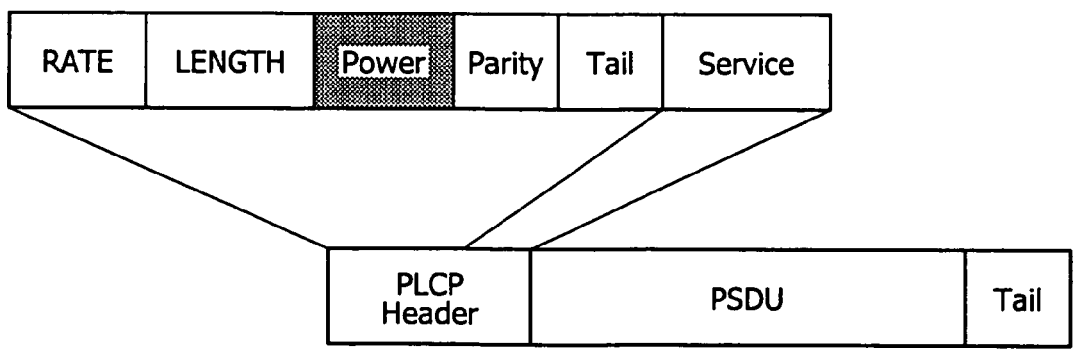
FIG. 2 is a diagram showing a typical structure of a frame format, which is adopted when it is quite within the bounds of possibility that the radio communication apparatus changes its transmission power.

FIG. 2 is a diagram showing a typical structure of a frame format, which is adopted when it is quite within the bounds of possibility that the radio communication apparatus 100 operating as a communication station in the radio communication system implemented by this embodiment changes the transmission power.

Information required for decoding a packet is referred to as a PLCP (Physical Layer Convergence Protocol) header. The PLCP header includes a rate field, a length field, a power field, a parity bit, an encoder tail bit, and a service field. The rate field shows the transmission rate of the information portion, which includes the service field of the PLCP header. The length field shows the length of the information portion. The power field shows the transmission power of the communication station transmitting the packet.

The packet receiver is capable of carrying the work to decode the information portion included in the packet as a portion following the PLCP header on the basis of results of decoding the rate and length fields included in the header. In addition, the power field of the PLCP header is referred, and it is possible to grasp the transmission power of a communication partner.

In the example shown in the figure, the power field is included in the PLCP header as a field showing the transmission power of the communication station transmitting the packet. It is to be noted, however, that the information on the transmission power is not necessarily placed in the PLCP header. For example, the information can be provided at a location corresponding to a MAC header or described only in a beacon signal. In a word, it is important that a communication station transmitting data is capable of grasping information on the transmission power of a communication station receiving the data and a communication station receiving data is capable of grasping information on the transmission power of a communication station transmitting the data even though the mechanism for describing the information can be arbitrary.

B. Control of the Signal Detection Capability of the Radio Receiver Unit

As has been described earlier, known information referred to as a preamble is included at the head of a transmitted signal so that the signal-receiver side is capable of detecting the existence of the signal by detection of the preamble. In general, the operation to detect a signal is carried out as part of synchronization processing.

Figure 3:
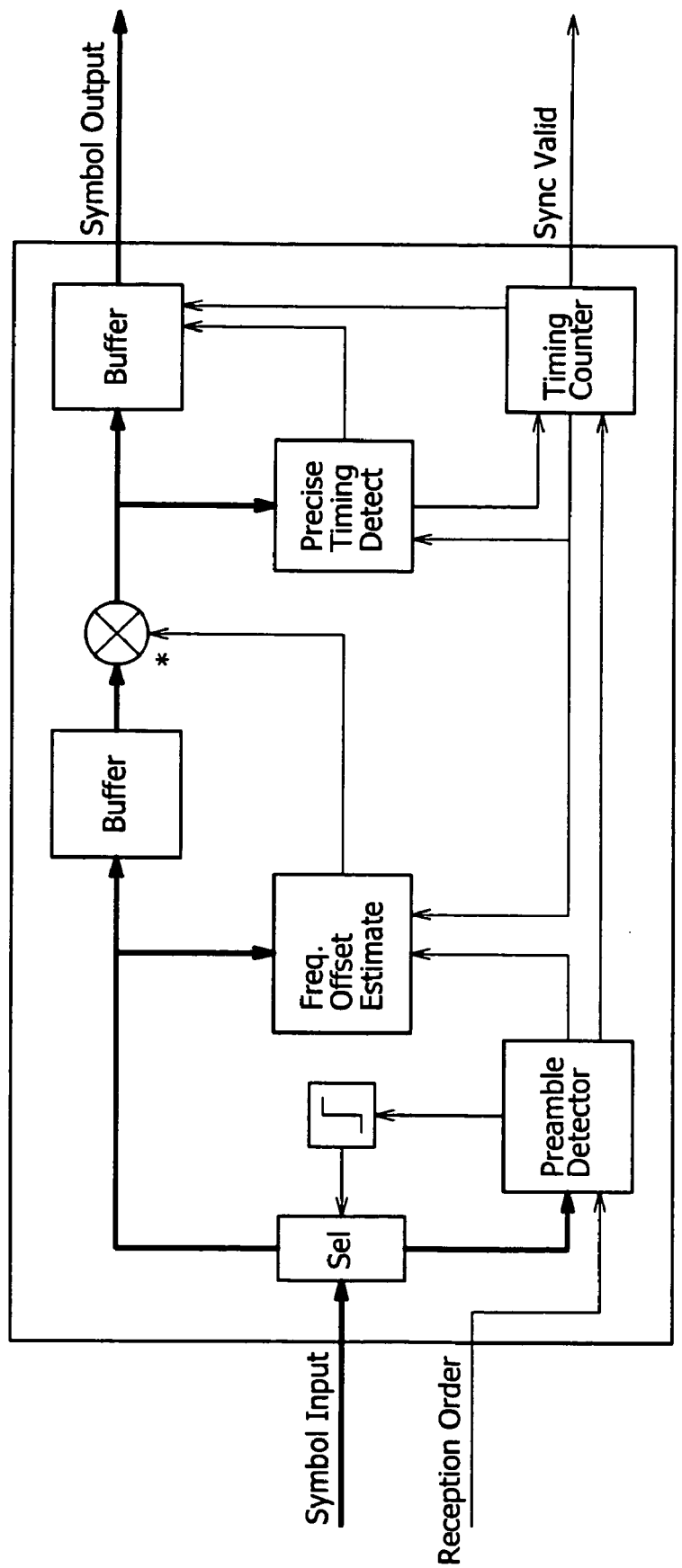
FIG. 3 is a diagram showing a typical configuration of a synchronization-processing circuit.

FIG. 3 is a diagram showing a typical configuration of a synchronization-processing circuit included in the radio-receiver unit 110 employed in the radio communication apparatus 100. The following description explains processing carried out on the preamble during detection of a signal including the preamble with referred to this figure.

In the synchronization-processing circuit, in addition to the detection of the signal, an operation to detect and correct a frequency offset as well as an operation to extract a signal reception time are carried out.

A received signal completing digital-conversion processing and digital-filter processing is supplied to the synchronization-processing circuit from a symbol input terminal. A signal output by the synchronization-processing circuit from a symbol output terminal is supplied to an IFFT (Inverse Fast Fourier Transform) unit not shown in the figure. A signal output from a sync valid terminal indicates that the signal output from symbol output terminal is valid.

During a period in which the preamble of a received signal has not been detected, a selector supplies the received signal to a preamble detector. The preamble detector carries out processing to detect the preamble of the received signal. The preamble is detected by searching for the first 8.0-microsecond half of the preamble.

As the preamble detector detects the preamble in the form of a broadcast burst, the preamble detector requests the selector to supply the received signal to a FIFO buffer as well as a frequency-offset estimate unit, and supplies a rough frequency correction value estimated from the preamble of the received signal to the frequency-offset estimate unit.

The frequency-offset estimate unit computes a correction frequency offset value on the basis of the rough frequency correction value received from the preamble detector as well as the second 8.0-microsecond half of the preamble received from the selector, and supplies the computed correction frequency offset value to a multiplier, which corrects the received signal (that is, the second 8.0-microsecond half of the preamble) read out from the FIFO buffer by using the computed correction frequency offset value.

A signal with its frequency offset corrected is again stored in another FIFO buffer and supplied to a precise timing detector for detecting a reception timing with a high degree of precision. The precise timing detector detects a reception timing with a high degree of precision by recognizing a cross correlation between the second half of the preamble and a reference. The detected reception timing is also stored in the other FIFO buffer and supplied to a sync valid terminal by way of a timing counter.

The timing counter recognizes information such as a delimiter of an OFDM symbol on the basis of the timing to receive the broadcast burst and manages among others periods of beacon transmission intervals.

Figure 4:
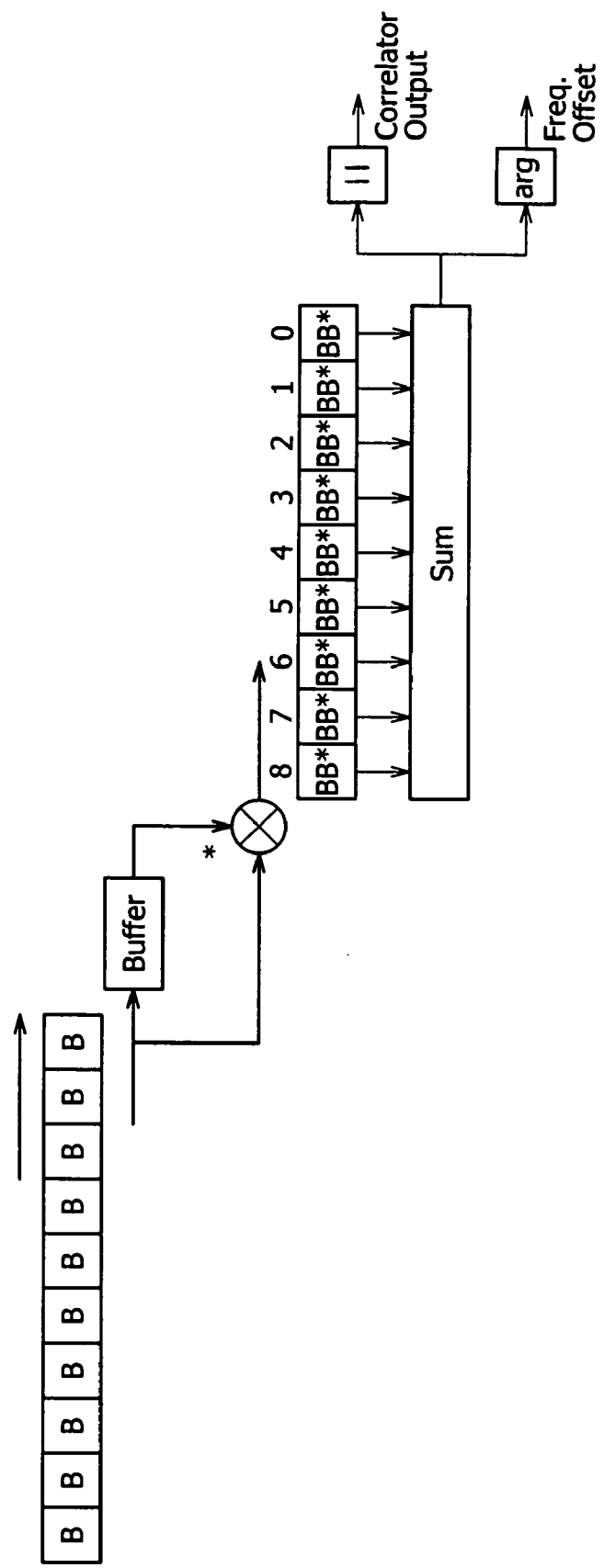
FIG. 4 is a diagram showing a typical configuration of a preamble detector.
Figure 5:
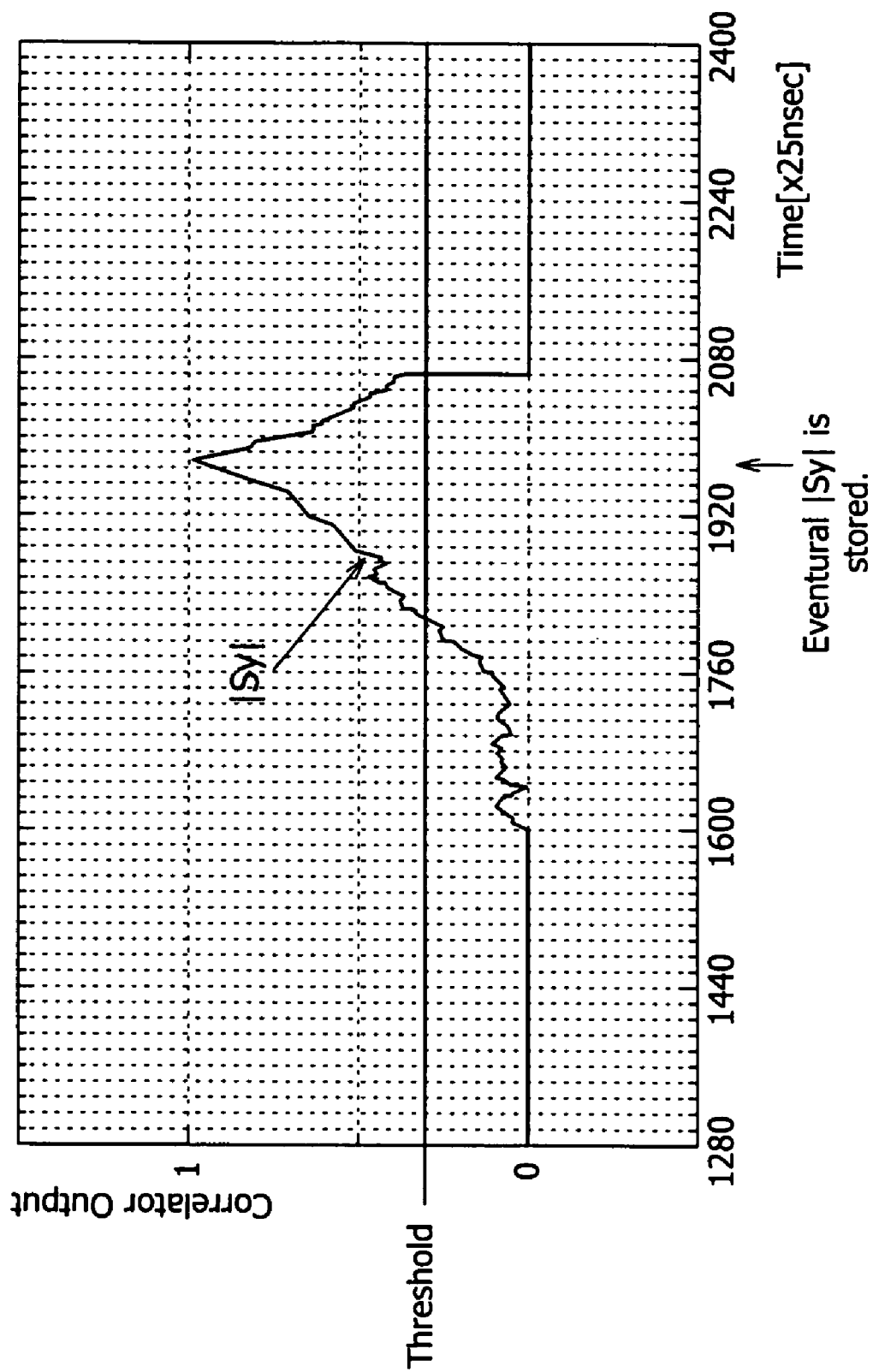
FIG. 5 is a diagram showing a typical signal output by the preamble detector.

FIG. 4 is a diagram showing a typical configuration of the preamble detector, and FIG. 5 is a diagram showing a typical signal output by the preamble detector.

While the preamble detector is operating, not only does the reception become unclear, but data is also received in a state wherein the frequency offset becomes at least equal to 200 kHz. In this case, by referring to FIG. 4, the following description explains the preamble detector by consideration of an implementation based on a methodology not making the detection characteristic dependent on the frequency offset as much as possible and assumption of a case in which the self correlation value of the received signal is used in the detection of a preamble. Of course, the same holds true of a case in which a cross correlation value between the received signal and a known pattern is used in the detection of a preamble. In this case, the configuration of the preamble detector shown in FIG. 4 is replaced with computation of the cross correlation value and the rest essentially remains the same as long as configuring the present invention is concerned.

In the preamble detector shown in the figure, a self correlation with a signal received 0.8 microseconds before is computed for a period of 8.0 microseconds and a sum of computed self correlations is found as a complex number. Then, the output of the synchronization detection circuit is split into two components, i. e., the absolute and phase (Arg) values of the complex number. The absolute value also referred to as a correlator output is the absolute value of the self correlation obtained as the complex number. The phase value is used in later processing as a frequency offset value. On the other hand, the absolute value of the correlation is used in signal detection. It is desirable to sufficiently understand a point that, by utilizing the fact that the first 8.0-microsecond half of the preamble is repeated at intervals of 0.8 microseconds, a preamble detector can be implemented by a circuit like the one shown in FIG. 4 even if a frequency offset is included.

If a preamble signal is supplied to a circuit like the one shown in FIG. 4, the correlation absolute value varying along the time axis is shown in FIG. 5. The time at which the peak of an electric waveform shown in FIG. 5 as an electric waveform representing the absolute value of the correlation is observed coincides with a time at which the reception of the first 8.0-microsecond half of the preamble is ended. The preamble detector like the circuit shown in FIG. 4 monitors the correlation absolute value. If the correlation absolute value exceeds a threshold value, the preamble detector determines that a signal including the preamble exists. In an example shown in FIG. 5, the threshold value is set at about 0.325.

Figure 6:
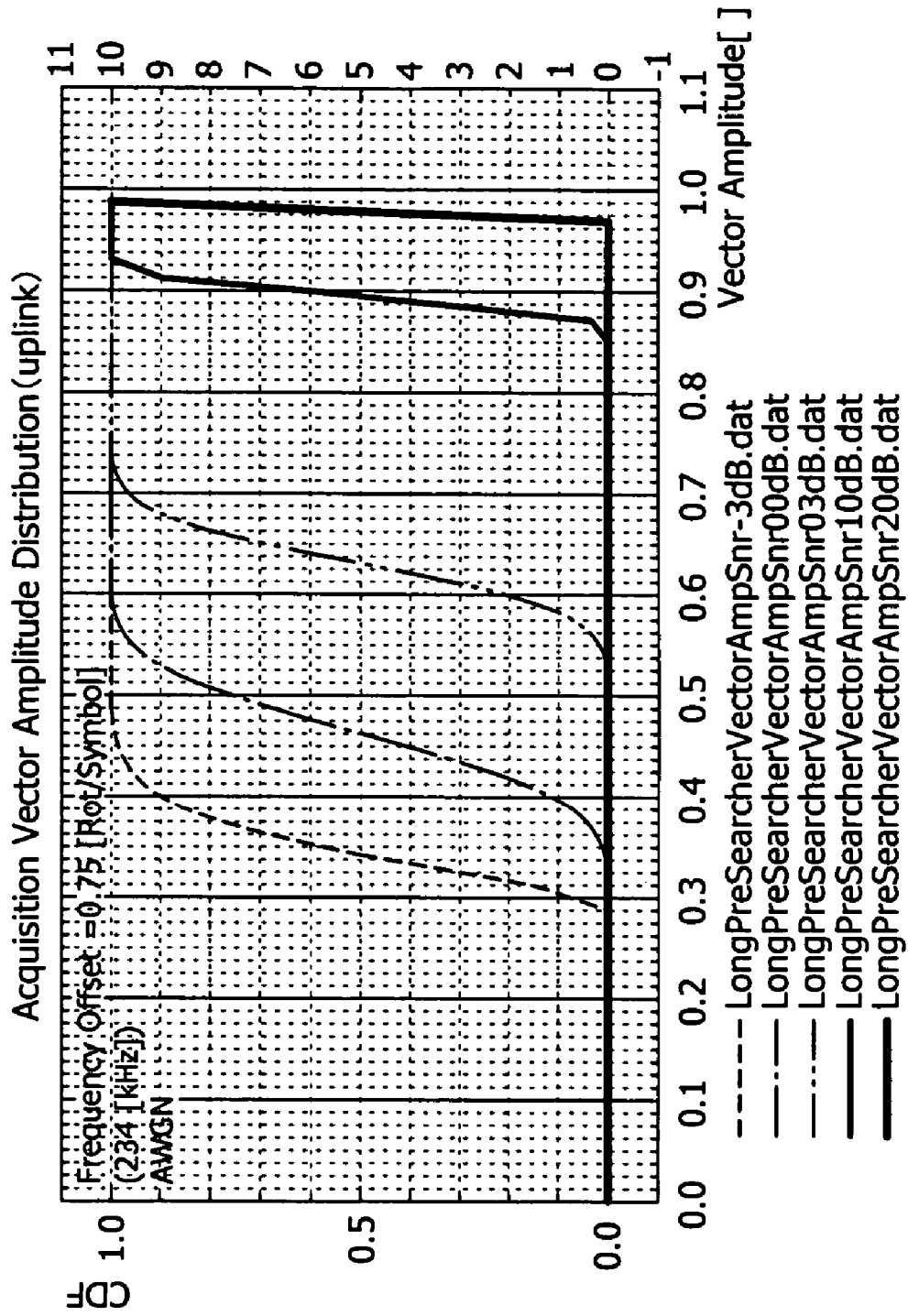
FIG. 6 is a diagram showing distributions of the value of a signal output by the preamble detector.

The maximum value of the absolute value of the self correlation output by the preamble detector like the one shown in FIG. 4 is known to have distributions like ones shown in FIG. 6 in dependence on the receiver SNR. As shown in the figure, the maximum value of the absolute value of the self correlation is in the range about 0.35 to 0.55 for a receiver SNR of 0 dB, in the range about 0.55 to 0.70 for a receiver SNR of 3 dB, and so on. The maximum value of the absolute value of the self correlation and the receiver SNR are in a strong correlation with each other.

Thus, the threshold value set in preamble detector is changed, and it is possible to control the approximate detection precision of the signal or the sensitivity of reception and, controlling the approximate detection precision of the signal or the sensitivity of reception implies adjusting the executable-reception range of the radio communication apparatus 100. Data can be detected at a low SNR even if the reception sensitivity is raised.

Assume for example that the radio communication apparatus 100 is set to receive a signal with a receiver SNR of at least 0 dB. In this case, the threshold value may be set at 0.325. If the radio communication apparatus 100 is set to receive a signal with a receiver SNR of at least 3 dB, the threshold value may be set at 0.55 or a slightly smaller value. With the threshold value set at 0.55, even if the a preamble signal with an SNR value of about 0 dB is received, the maximum value of the absolute value of the self correlation never exceeds 0.55 and the preamble is therefore undetected.

As another method for controlling the signal detection capability, it is possible to adopt means including a switch and an attenuator, which are inserted into the signal reception system. In this case, if it is desired to reduce the signal detection capability, the received signal is supplied to the attenuator before being processed.

As a further method for controlling the signal detection capability, the bit width of an A/D converter employed in the receiver is adjusted. That is to say, in order to reduce the signal detection capability, an A/D converter having a small bit width is used. In this way, power is saved, more quantization errors are tolerated and, as an equivalent effect, the SNR of the reception signal is reduced.

C. Access-Control Non-Uniformity Caused by Differences in Transmission Power between Communication Stations In the radio communication system provided by the present invention, every communication station is allowed to independently set an executable-communication range in which data can be transmitted to and received from other communication stations. As has been described before, however, in the access method based on the CSMA technique including the RTS/CTS procedure, when there is a difference in transmission-power limit between communication stations, there is raised a problem of access-control non-uniformity. For an example, refer to FIG. 40.

Thus, in this embodiment, every communication station sets a signal detection capability on the basis of a transmission power value, and creates such an executable-communication range of its own that the executable-transmission range is all but the same as the executable-reception range. Thus, the problem of access-control non-uniformity can be solved.

As shown in the table given below, for example, a communication station having a large transmission power persistently demands a signal detection capability in an environment with a lower SINR and sets a wide executable-reception range like the executable-transmission range. Conversely, a communication station having a small transmission power is not provided with a good signal detection capability in an environment with a low SINR due to the fact that the executable-reception range is narrowed by a quantity corresponding to a quantity by which the executable-transmission range is reduced due to the small transmission power.

TABLE 2

| Class | Transmission power value | Signal detection capability |
|---|---|---|
| #0 | 19[dBm] | >0 dB |
| #1 | 16[dBm] | >3 dB |
| #2 | 13[dBm] | >6 dB |

Of course, essentials of the present invention are not limited to typical values shown in the above table. An important point of the typical values shown in the above table merely suggests that the signal detection value be set at a value, which decreases as the transmission power value increases. In order to make the executable-reception range match the executable-transmission range, it is desirable to make the change in transmission power value about equal to the change in signal detection capability.

It is to be noted that, if the signal detection capability is reduced so that a signal is not received unless the signal has a high SNR, the control of accesses to the communication media allows a signal to be transmitted even if another signal already exists in the media. However, the fact that an interference power exists does not change and remains as it is. Thus, the signal detection capability is raised, and the dynamically varying range of the interference power changes considerably and, if the transmission data rate is variable, it is necessary in some cases to carry out processing so as to make an attempt to select a more conservative transmission data rate.

Addressing the problems described above, the description given so far suggests that the change in transmission power value be made about equal to the change in signal detection capability. As shown in the tables given below, however, the change in transmission power value can conceivably be made a little bit greater than the change in signal detection capability or, conversely, the change in transmission power value can conceivably be made a little bit smaller than the change in signal detection capability.

TABLE 3

| Class | Transmission power value | Signal detection capability |
|---|---|---|
| #0 | 19[dBm] | >0 dBm |
| #1 | 16[dBm] | >2 dBm |
| #2 | 13[dBm] | >4 dBm |

TABLE 4

| Class | Transmission power value | Signal detection capability |
|---|---|---|
| #0 | 19[dBm] | >0 dBm |
| #1 | 16[dBm] | >4 dBm |
| #2 | 13[dBm] | >8 dBm |

The transmission power value and the signal detection capability can also each be a constant in every communication station. However, a feature of the present invention is that, by dynamically controlling the transmission power value and the signal detection capability, the communication station is capable of controlling the transmission and reception ranges in accordance with a situation of the communication. Note that it is desirable to have all communication stations in the same radio communication system operate by abiding by the same rules.

Figure 40:
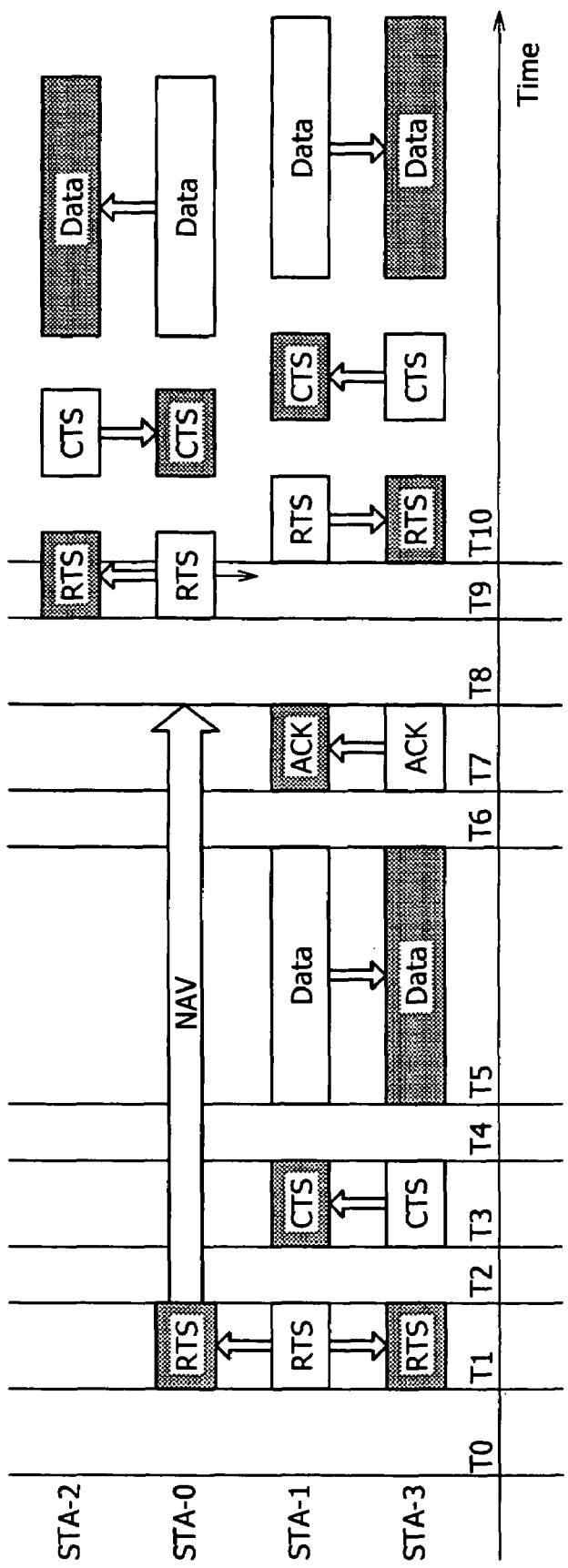
FIG. 40 is an explanatory diagram referred to in describing non-uniformity of access control as access-control non-uniformity caused by non-uniformity of transmission powers.

The transmission power value and the signal detection capability are controlled and set as described above, and it is possible to reduce the effect of a problem that the number of transmission opportunities given to communication station STA0 having a small transmission power is unconditionally decreased in a situation in which the control of accesses to the communication media becomes non-uniform due to differences in transmission power limit between communication stations like the situation shown in FIG. 40.

Figure 7:
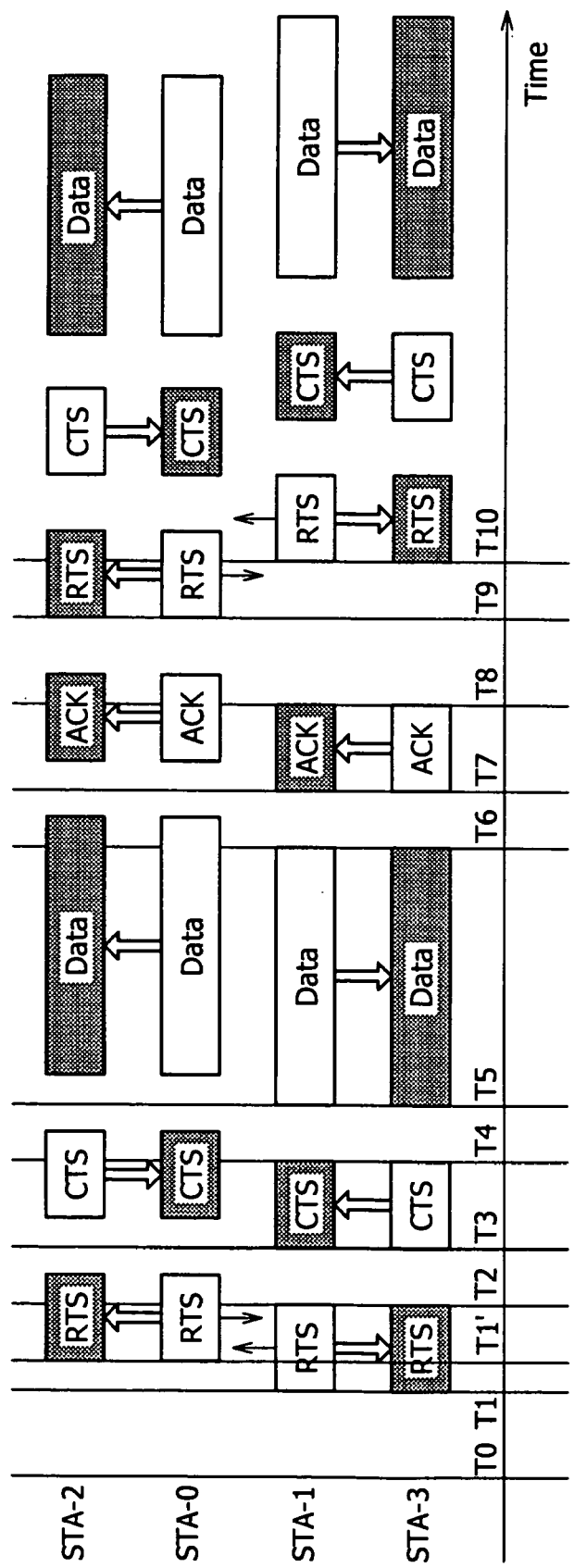
FIG. 7 is a diagram showing a sequence of accesses to communication media for a case in which control according to the present invention is executed to control and set the transmission power value and the signal detection capability in the same situation as an example shown in FIG. 40.

FIG. 7 is a diagram showing a sequence of accesses to communication media for a case in which control according to the present invention is executed to control and set the transmission power value and the signal detection capability in the same situation as the example shown in FIG. 40.

In the example shown in FIG. 7, four communication stations STA0, STA1, STA2, and STA3 exist in a radio communication environment. It is assumed that communication station STA1 intends to transmit data to communication station STA3 and communication station STA0 intends to transmit data to communication station STA2. In this case, basically, only communication stations adjacent to each other are located in a range reachable by a transmitted electric wave. Since the transmission power of communication station STA0 is smaller than the transmission power of communication station STA1, however, a signal transmitted by communication station STA1 in the STA1→STA0 direction to communication station STA0 is received by communication station STA0 but a signal transmitted by communication station STA0 in the STA0→STA1 direction to communication station STA1 is not received by communication station STA1. In addition, in the example shown in the figure, since the transmission power of communication station STA0 is small, the signal detection capability of communication station STA0 is set at a value smaller than the signal detection capability of communication station STA1.

First of all, at a time T1, communication station STA1 transmits an RTS signal but, since the signal detection capability of communication station STA0 is set at a small value, communication station STA0 is not capable of receiving the RTS signal. Thus, communication station STA 1 transmits data to communication station STA3 in accordance with the procedure described before and ends the transaction at a time T8.

Since communication station STA0 does not receive the RTS signal transmitted by communication station STA1, during a period ending at the time T8, communication station STA0 does not establish a NAV and enter a state of waiting for a transmission opportunity. That is to say, while communication station STA 1 is transmitting data to communication station STA3 in accordance with the RTS/CTS procedure, communication station STA0 is capable of transmitting data to communication station STA2 concurrently with the transmission of data from communication station STA1 to communication station STA3. That is to say, at a time t', communication station STA0 transmits an RTS signal to communication station STA2 and is then capable of transmitting data to communication station STA2 in accordance with the procedure described before.

In the example shown in FIG. 40, communication station STA0 sets the signal detection capability at a value too high in comparison with the transmission power. Thus, receiving interference by a signal transmitted from communication station STA1, communication station STA0 is not capable of making an access to the communication media. In the example shown in FIG. 7, on the other hand, communication station STA0 sets the signal detection capability at a small value corresponding to the transmission power. Thus, receiving no interference by a signal transmitted from communication station STA1, communication station STA0 is capable of making an access to the communication media. That is to say, it is possible to get rid of a situation in which communication station STA1 capable of transmitting data with a large transmission power is placed in an unconditionally favorable position.

In the example shown in FIG. 7, communication station STA0 has only an amplifier for small transmission powers. In order to maximize the executable-reception range at least on a temporary basis, however, assume that the executable-reception range is set at a value greater than the executable-transmission range by a difference large in comparison with balance, which should be established between the transmission power and the signal detection capability as a standard set for the whole radio communication system as shown in table 2 or 3. Even in this state, if all communication stations surrounding communication station STA0 each set a similar executable-transmission range and a similar executable-reception range, bi-directionality can be assured and no problem is raised. Thus, the processing to set a signal detection capability as described above does not need to be carried out as long as a communication station having a transmission power exceeding a transmission power of its own is not recognized.

If communication station STA0 receives a signal from communication station STA1 and recognizes that communication station STA1 is transmitting the signal at a transmission power exceeding a transmission power of communication station STA0 itself, however, in the present state of the art, the fact that the executable-reception range is set at a value greater than the executable-transmission range by a difference large in comparison with the standard balance is recognized as a problem. The communication station is capable of solving this problem by controlling the signal detection capability to change an executable-reception range of its own.

When communication station STA0 receives a signal from another communication station such as communication station STA4 and does not recognize that communication station STA0 itself is transmitting a signal at a transmission power exceeding the transmission power of communication station STA4, communication station STA4 determines such that communication station STA0 is outside the executable-reception range of communication station STA4. Communication station STA4 determines the fact from the evidence that a response will not be received from communication station STA4 even if communication station STA0 transmits a signal to communication station STA4. In that case, communication station STA0 is determined to have set an executable-reception range wider than that of communication station STA4. In this case, communication station STA0 changes the executable-reception range to exclude communication station STA4 from the executable-reception range, which includes communication station STA4 as an adjacent communication station.

Note that it may be understood that the non-uniformity of the access control like the one shown in FIG. 40 is not caused by the fact that communication station STA0 has set the signal detection capability at an excessively large value in comparison with a transmission power of its own. Alternatively, the uniformity is caused by the fact that communication station STA1 has set the signal detection capability at too a small value in comparison with a transmission power of its own. In that case, the signal detection capability of communication station STA1 can be reset at a larger value. In this case, communication station STA1 is capable of receiving an RTS signal from communication station STA0, establishing a NAV for a predetermined period of time and entering a state of waiting for a transmission opportunity. In this way, communication station STA1 does not interfere communication operations carried out by communication station STA0. Also in this case, it is possible to get rid of a situation in which communication station STA1 capable of transmitting data with a large transmission power is placed in an unconditionally favorable position.

D. Control of Executable-Communication Ranges of Communication Stations Existing Too Densely If communication stations exist at dense locations surrounding a specific communication station, there will be raised problems that the number of transmission opportunities given to the specific communication station decreases and the management of adjacent communication stations becomes complicated as described earlier.

In this embodiment, the transmission power value as well as the signal detection capability is controlled and set to set an executable-communication range in accordance with the density of communication stations existing at locations surrounding a specific communication station, and the above problems can be coped with. The following description explains a method of coping with communication stations existing at dense locations surrounding a specific communication station.

Figure 38:
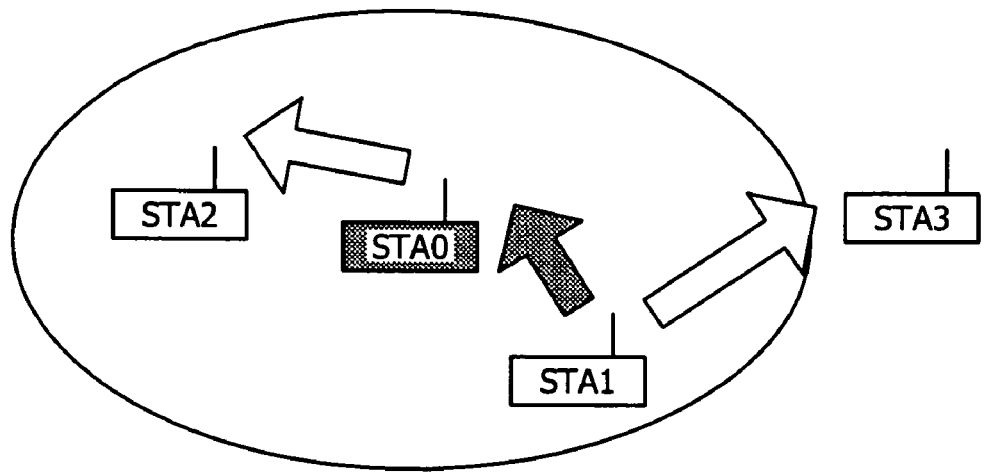
FIG. 38 is an explanatory diagram showing operations of access control based on a CSMA procedure with existence of a communication station taken into consideration.
Figure 39:
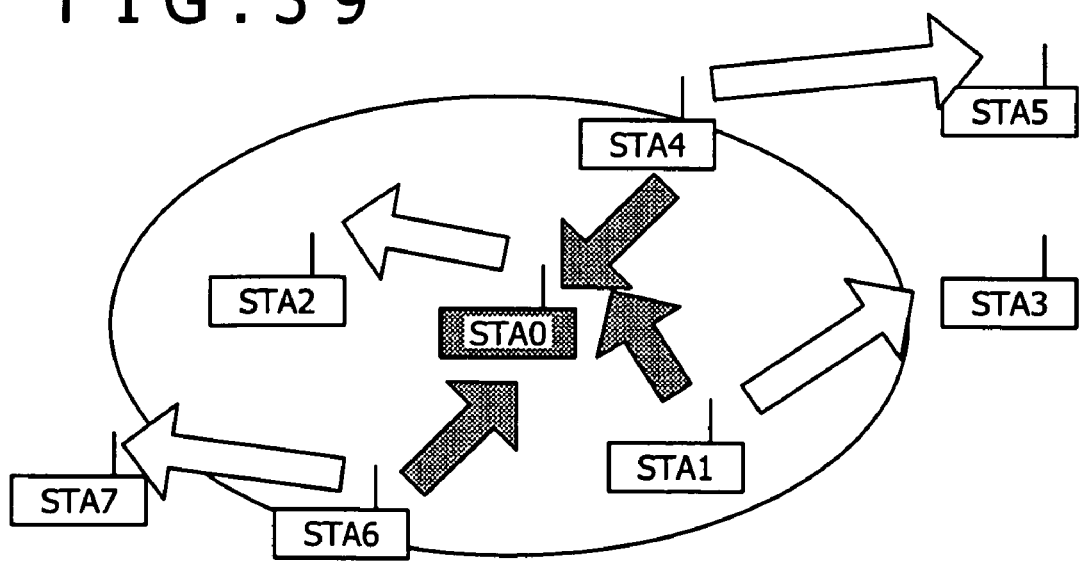
FIG. 39 is an explanatory diagram showing other operations of access control based on the CSMA procedure with existence of a communication station taken into consideration.

As described earlier by referring to FIG. 38, if a large number of communication stations exists at locations surrounding communication station STA0, communication station STA0 needs to share resources with the communication stations existing at locations surrounding communication station STA0 so that communication station STA0 may not obtain a desired communication opportunity in some cases. In this case, all communication stations are assumed to have uniform transmission powers and uniform signal detection capabilities.

Figure 8:
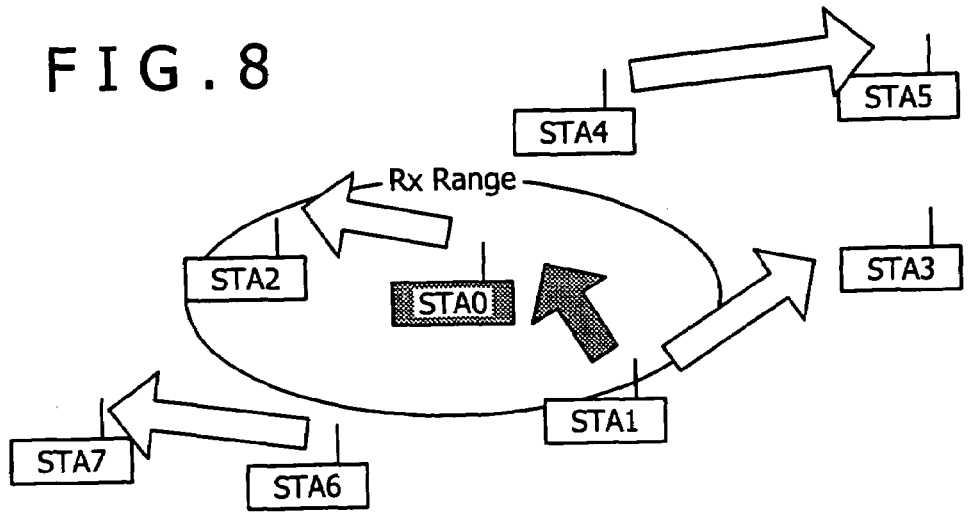
FIG. 8 is a diagram showing a state in which a specific communication station reduces an executable-reception range of its own due existence of other communication stations at dense locations surrounding the specific communication station.

In such a case, communication station STA0 executes control to reduce the executable-reception range, in which STA0 is capable of receiving signals from other communication stations, by decreasing the signal detection capability in accordance with the procedure described above. FIG. 8 is a diagram showing a model of this case. As is obvious from comparison of FIG. 8 with FIG. 38, communication station STA0 limits an executable-reception range of its own to those of communication stations STA1 and STA2 to decrease the signal detection capability. As a result, in spite of the fact that interferences from communication stations STA6 and STA4 exist as before, communication station STA0 needs to share the communication media with only communication station STA1 from the stand point of the media-access control. Thus, communication station STA0 is capable of obtaining more communication opportunities.

In this case, since the signal detection capability of only communication station STA0 is decreased, only communication station STA0 is not in a harmony of access control with other communication stations. That is to say, the transmission power of communication station STA0 is large in comparison with its signal detection capability, giving rise to impartial control of accesses to the communication media. As a result, the other communication stations are disturbed.

Figure 9:
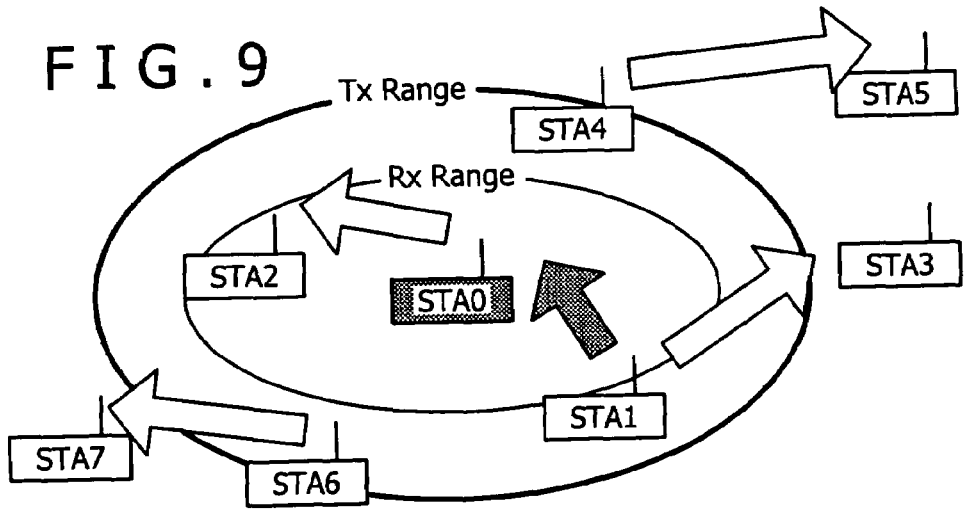
FIG. 9 is a diagram showing a state in which an executable-reception range and executable-transmission range of a communication station become mutually non-uniform because the communication station controls the executable-reception range.

To put it concretely, as shown in FIG. 9, in spite of the fact that a signal transmitted from communication station STA0 reaches communication stations STA4 and STA6, signals transmitted from communication stations STA4 and STA6 do not reach communication station STA0. That is to say, communication stations STA4 and STA6 have their own transmissions limited so as not to disturb transmissions of data from communication station STA0. On the other hand, communication station STA0 gives interferences to communication stations STA4 and STA6 by being able to transmit data to communication stations STA4 and STA6 without sensing transmissions by communication stations STA4 and STA6. In a word, if the executable-transmission range of a communication station is different from an executable-reception range of its own, the communication station is put in a state of communication, which can no longer be said to be impartial from the standpoint of acquisition of an opportunity to make an access to the communication media.

Figure 10:
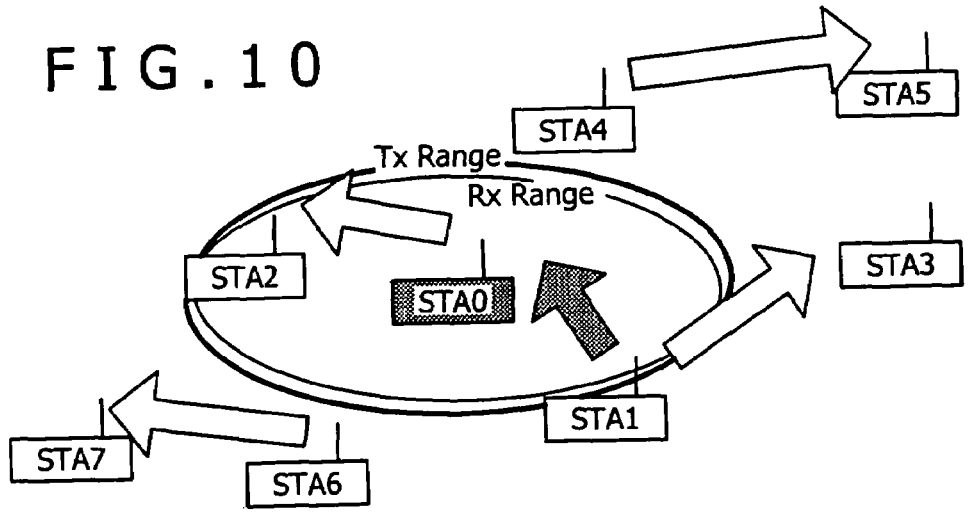
FIG. 10 is a diagram showing a state in which the executable-transmission range of communication station STA0 can be made all but coincident with its executable-reception range after communication station STA0 carries out processing to also decrease its transmission power following the reduction of its signal detection capability.

In order to solve this problem, when communication station STA0 decreases its signal detection capability to cope with the density of adjacent communication stations, as shown in tables 2 to 4 given earlier, communication station STA0 needs to carry out processing to also reduce its transmission power as well. In this way, the executable-transmission range of communication station STA0 can be made all but the same as its executable-reception range so that the adjacent stations are no disturbed by the situation of communication station STA0 anymore. FIG. 10 is a diagram showing a state in which the executable-transmission range of communication station STA0 can be made all but coincident with its executable-reception range after communication station STA0 carries out processing to also decrease its transmission power following the reduction of its signal detection capability.

If the objective is to make the executable-transmission range of communication station STA0 coincident with its executable-reception range, it is desirable to have the change in transmission power value equal to the change in signal detection capability threshold as shown in table 2.

In the radio communication system implemented by this embodiment, there are a variety of cases in which different factors are considered by a communication station as factors for determination to change an executable-communication range of its own.

If a result of determination indicates, among others, a situation in which reception-power information received by a specific communication station from a communication station serving as a partner is sufficiently large so that data can be transmitted from the specific communication station at a desired high data rate even if the transmission power is reduced, for example, the specific communication station may autonomously change its executable-reception range and executable-transmission range in some cases in order to reduce the number of interferences. It is to be noted that, in such cases, if data is determined to be difficult to transmit at the desired high data rate after the reduction of the transmission power, the transmission power may be raised again in some of the cases.

In addition, a result of determination may indicate that a state in which a signal transmitted from a communication station other than a desired communication partner is occupying the communication media has been continuing so that a specific communication station is not capable of allocating time of transmission to the desired communication station. In that case, the specific communication station may change its executable-transmission range and executable-reception range for the purpose of allocating more transmission time bands.

In addition, a result of determination may indicate that there are too many communication stations surrounding a specific communication station so that the number of such surrounding communication stations exceeds the number of communication stations to be able to handle by the specific communication station. In that case, the specific communication station may change its executable-transmission range and executable-reception range for the purpose of reducing the number of existing communication stations surrounding the specific one.

In addition, result of determination may indicate ambiguity as to whether a specific communication station is capable of determining whether or not one or more other surrounding communication stations are each an adjacent communication station with which the specific communication station is capable of communicating due to the fact that the other surrounding communication stations are barely located in a range reachable by an electric wave transmitted by the specific communication station. In that case, the specific communication station may change the executable-transmission range and executable-reception range for the purpose of excluding the other adjacent communication stations from the ranges or including the adjacent communication stations in the ranges with a high degree of reliability.

In addition, any specific communication station may change the executable-reception range of its own as a reaction to recognition of the fact that the specific communication station is outside the executable-reception range of another communication station whose signal can be received by the specific communication station. To put it concretely, given communication stations A and B as an example, assume that a result of determination indicates that, in spite of the fact that communication station A is capable of receiving a signal from communication station B, communication station B does not recognize the existence of communication station A as evidenced by, among others, the fact that communication station B does not respond to a transmission of a signal from communication station A to communication station B. In this case, communication station A may change the executable-reception range or executable-transmission range of its own in order to exclude communication station B from its position to serve as an adjacent communication station.

The specific communication station described above may make the change to the executable-reception range from a standpoint different from the aforementioned point of view. That is to say, the specific communication station may change the executable-reception range for the purpose of absorbing variations inherent in communication stations. The inherent variations include variations in transmission power or variations in transmitted-signal precision and variations in signal reception performance among communication stations. If an executable-reception range is changed for such purposes, in some cases, the specific communication station may also adjust the executable-transmission range by making changes finer than the variations (or the steps) shown in tables 2 to 4 as variations in signal detection capability.

It is to be noted that the executable-reception range is finely adjusted not only for the purpose of absorbing variations in performance, which are inherent in communication stations, but also for the purpose of absorbing differences in number of inferences among adjacent communication stations.

Figure 11:
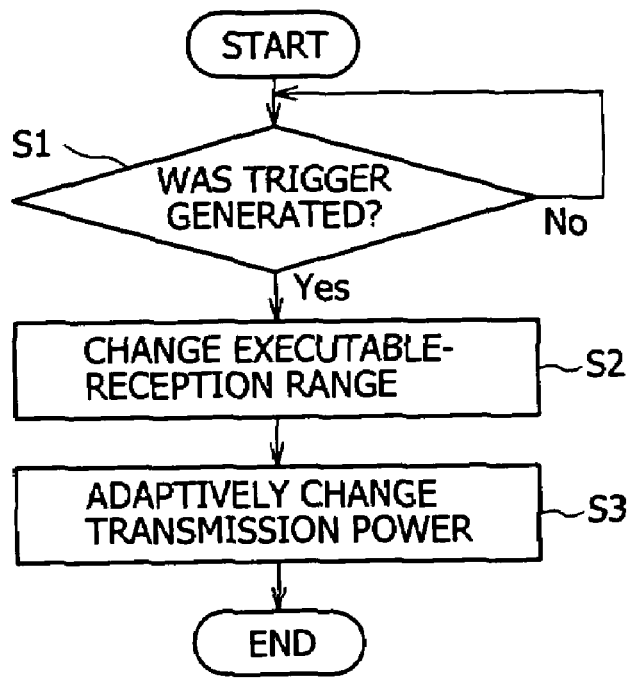
FIG. 11 shows a flowchart representing a procedure executed by a communication station as a procedure for adaptively setting the executable-transmission range to accompany control of the executable-reception range.

FIG. 11 shows a flowchart representing a procedure executed by any specific communication station as a procedure for adaptively setting the executable-transmission range to accompany control of the executable-reception range.

First of all, a predetermined trigger is detected at a step S1 at the beginning of the flowchart. Examples of the predetermined trigger are a change in number of communication stations surrounding the specific communication station and an operation to newly set an executable-communication range in an adjacent communication station. As a reaction to the predetermined trigger, at the next step S2, the specific communication station changes its signal detection capability to set the executable-reception range of its own at a proper value. Then, at the next step S3, the transmission power of its own is controlled to set the executable-transmission range at a range adapted to the executable-reception range.

A list of triggers each detected at the step S1 as a trigger to change the executable-reception range is given as follows.

(1) a result of determination indicating that a state in which a signal transmitted from a communication station other than a desired communication partner is occupying the communication media has been continuing so that the specific communication station is not capable of allocating time of transmission to the desired communication station.

(2) a result of determination indicating that there are too many communication stations surrounding the specific communication station so that the number of such surrounding communication stations exceeds the number of communication stations to be able to handle by the specific communication station.

(3) a result of determination indicating ambiguity as to whether a specific communication station is capable of determining whether or not one or more other surrounding communication stations are each an adjacent communication station with which the specific communication station is capable of communicating due to the fact that the other surrounding communication stations are barely located in a range reachable by an electric wave transmitted by the specific communication station.

(4) recognition of the fact that the specific communication station is outside the executable-reception range of another communication station whose signal can be received by the specific communication station.

(5) a need to absorb variations inherent in communication stations. The inherent variations include variations in transmission power, variations in transmitted-signal precision, or variations in signal reception performance among communication stations.

Figure 12:
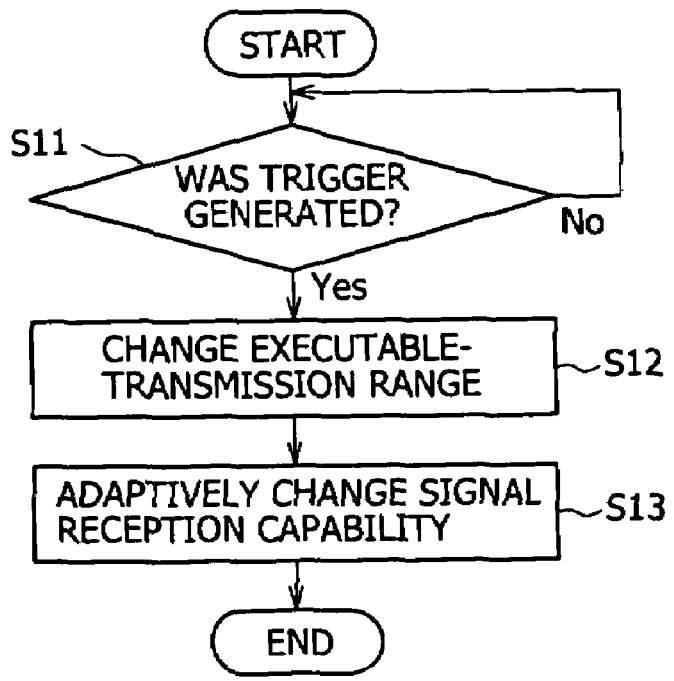
FIG. 12 shows a flowchart representing a procedure executed by a communication station as a procedure for adaptively setting the executable-reception range to accompany control of the executable-transmission range.

FIG. 12 shows a flowchart representing a procedure executed by any specific communication station as a procedure for adaptively setting the executable-reception range to accompany control of the executable-transmission range.

First of all, a predetermined trigger is detected at a step S11 at the beginning of the flowchart. Examples of the predetermined trigger are a change in number of communication stations surrounding the specific communication station and an operation to newly set the executable-communication range in an adjacent communication station. As a reaction to the predetermined trigger, at the next step S12, the specific communication station changes its transmission power to set the executable-transmission range of its own at a proper value. Then, at the next step S13, a signal detection capability of its own is controlled to set the executable-reception range at a range adapted to the executable-transmission range.

A list of triggers each detected at the step S11 as a trigger to change the executable-transmission range is given as follows.

(1) a result of determination indicating that a state in which the power of a specific communication station to receive a signal from a communication station serving as a partner is sufficiently large and data can be transmitted from the specific communication station at a desired high data rate even if the transmission power is reduced.

(2) a result of determination indicating ambiguity as to whether a specific communication station is capable of determining whether or not one or more other surrounding communication stations are each an adjacent communication station with which the specific communication station is capable of communicating due to the fact that the other surrounding communication stations are barely located in a range reachable by an electric wave transmitted by the specific communication station.

E. Applications to Networks of the Autonomous-Distribution Type

In accordance with descriptions up to the preceding paragraph, by controlling and setting the transmission power as well as the signal detection capability, a communication station is capable of solving a problem of access-control non-uniformity caused by non-uniformity among executable-transmission ranges of communication stations and a problem of few transmission opportunities caused by a large number of adjacent communication stations.

This paragraph explains details of an application of the mechanism for controlling and setting the executable-communication range of any communication station to a network of the autonomous-distribution type.

E-1. Network Configuration

In an autonomous-distribution radio communication system not particularly having a relation between a controlling communication station and a controlled communication station, any specific communication station transmits beacon information through a channel to inform other adjacent communication stations in a communication range of the existence of the specific communication station and to get information on the configuration of the network. The specific communication station includes the transmitted frame period beacon in the head of a transmission frame period, which is referred to hereafter as a super frame. The transmission frame period is defined by a beacon interval. Typically, the super frame has a value of 80 milliseconds. However, the values of the super frame are not specially limited to 80 milliseconds.

In addition, every specific communication station scans the channel for a period corresponding to the transmission frame period to detect a beacon transmitted by each adjacent communication station. Then, by decoding information described in each detected beacon, the specific communication station is capable of recognizing the configuration of the network or participating in the network.

Figure 13:
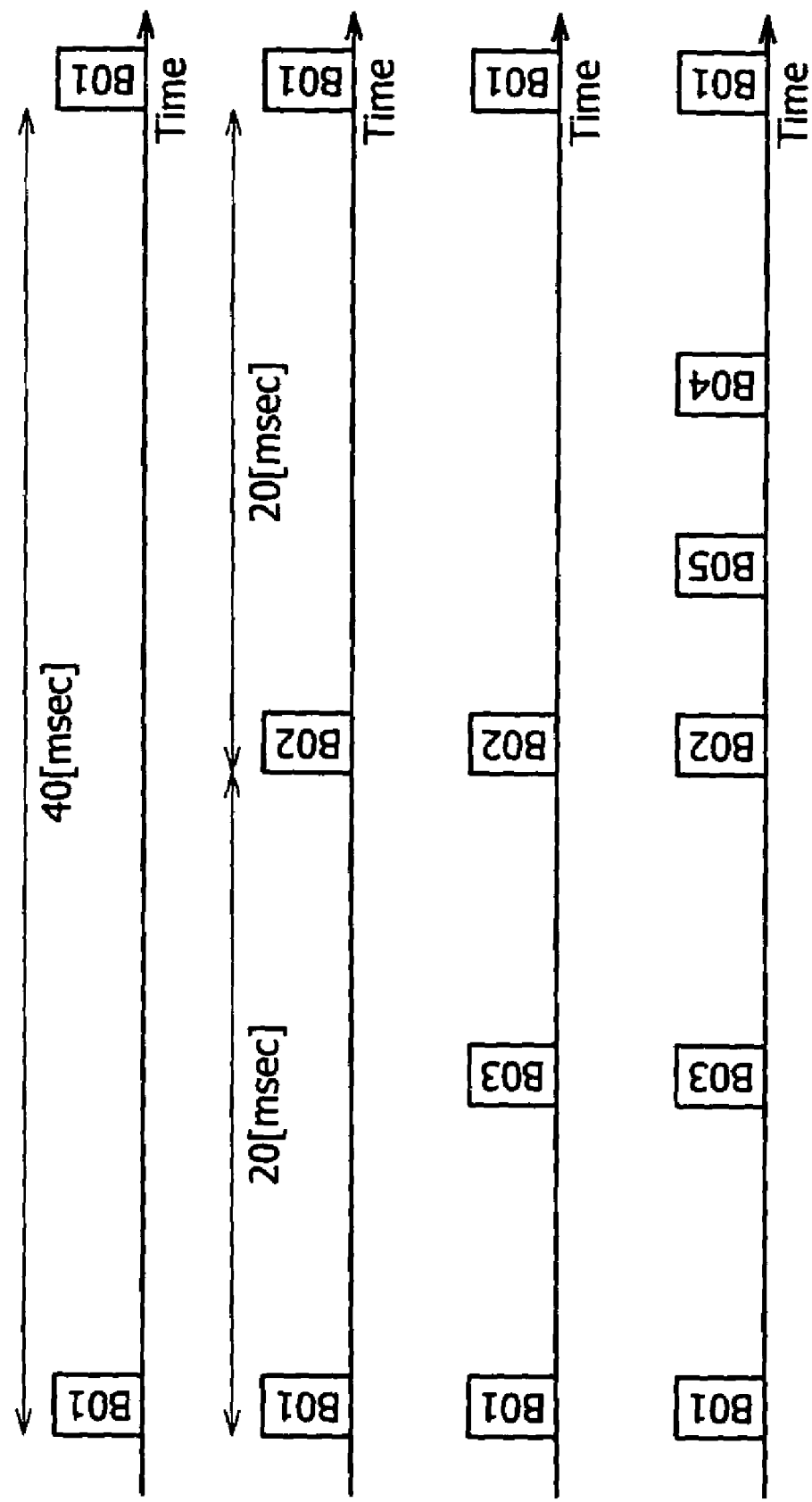
FIG. 13 is an explanatory diagram showing a beacon transmission procedure adopted by every communication station.

A beacon transmission procedure followed by every communication station is explained by referring to FIG. 13.

Every communication station gradually establishes synchronization with an adjacent communication station while listening to a beacon transmitted by the adjacent station. When a communication station newly appears, the newly appearing communication station sets a beacon transmission timing of its own by avoiding a collision with the beacon transmission timing of every existing communication station.

In addition, when no communication stations exist at surrounding locations, communication station 01 is capable of starting a transmission of a beacon with a proper timing. The transmission interval of a beacon is 80 milliseconds. Reference notation B01 on the top row of the example shown in FIG. 13 denotes a beacon transmitted by communication station 01.

Thereafter, when a communication station newly participates in the communication range, the newly participating communication station sets a beacon transmission timing of its own by avoiding a collision with beacons already existing at other locations.

Assume for example that new communication station 02 appears in a channel in which only communication station 01 exists as shown on the top line of FIG. 13. At that time, communication station 02 receives a beacon from communication station 01, recognizing the existence of communication station 01 and the position of the beacon. Then, communication station 02 sets a timing to transmit a beacon of its own in about the middle of the interval of the beacons transmitted by communication station 01 as shown on the second line of FIG. 13 and starts transmissions of beacons of its own.

Assume that communication station 03 further appears. At that time, communication station 03 receives at least one of beacons transmitted by communication station 01 and communication station 02, recognizing the existence of the communication stations transmitting the beacons received by communication station 03. Then, communication station 03 sets a timing to transmit a beacon of its own in about the middle of the interval of the beacons transmitted by communication station 01 and communication station 02 as shown on the third line of FIG. 13 and starts transmissions of beacons of its own.

Thereafter, each time a communication station newly participates in the radio communication system, the interval of beacons becomes narrower in accordance with the beacon insertion algorithm described above. For example, communication station 04 participating next in the radio communication system sets a timing to transmit a beacon of its own in about the middle of the interval of the beacons transmitted by communication station 01 and communication station 02, and communication station 05 participating after communication station 04 in the radio communication system sets a timing to transmit a beacon of its own in about the middle of the interval of the beacons transmitted by communication station 02 and communication station 04 as shown on the bottom line of FIG. 13.

In order to prevent beacons from overflowing the band (or the super frame), however, a minimum beacon interval $B_{min}$ is set in advance and two or more timings to transmit beacons are by no means allowed to exist within the minimum beacon interval $B_{min}$. Assume for example that the minimum beacon interval $B_{min}$ is set at 5 milliseconds for a super frame of 80 milliseconds. In this case, only up to 16 communication stations can be accommodated in a range that can be reached by a transmitted electric wave.

In a process to determine the position of a new beacon in a super frame, it is desirable to uniformly distribute beacon transmission timings of communication stations in the super frame rather than determination of the timings at dense positions distributed in a biased manner for a channel in order to improve the efficiency of the transmission. This is because every communication station must acquire a transmission-prioritized period (TPP) right after a transmission of a beacon. The acquisition of a TPP will be described later. Thus, as shown in FIG. 13, basically, a communication station starts transmission of beacons in about the middle of the time band of a longest beacon interval in a range in which transmitted signals can be heard by the communication station itself. However, there is also another utilization method for placing beacon transmission timings of communication stations at dense positions distributed in a biased manner. In the remaining portion of the super frame, data-receiving operations are stopped to reduce the power consumptions of the communication stations.

Figure 14:
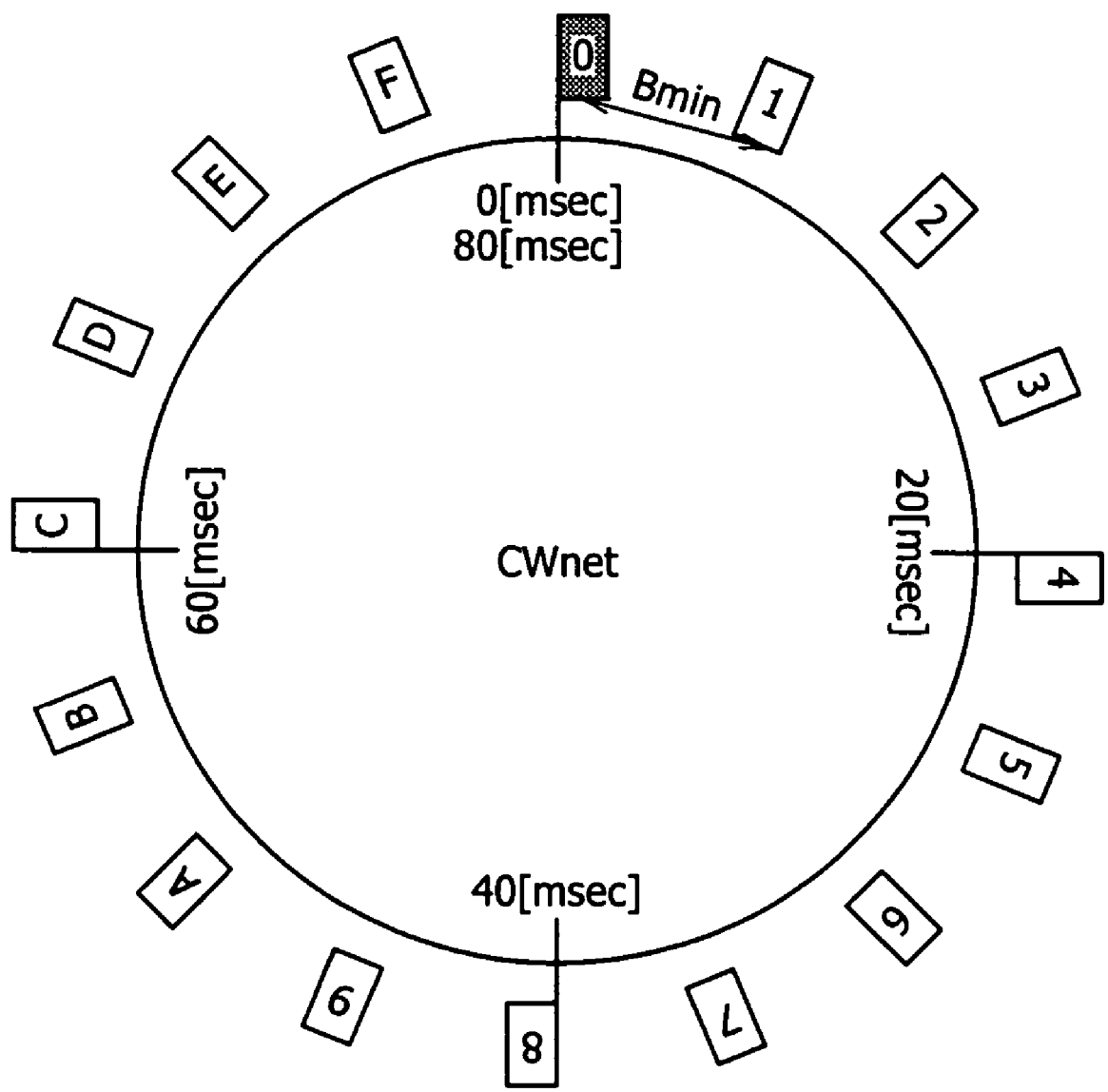
FIG. 14 is a diagram showing beacon transmission timings that can be set in a super frame.

FIG. 14 is a diagram showing a typical distribution of beacon transmission timings that can be placed in one super frame. In the example shown in the figure, however, the lapse of the 80-millisecond super frame is represented by the rotation of a needle of a clock, which rotates the tip of the needle along a circular circumference in the clockwise direction by one revolution in 80 milliseconds.

In the example shown in FIG. 14, there are 16 positions marked by symbols 0 to F as times at which a beacon can be transmitted. That is to say, the positions are each a slot at which a beacon transmission timing can be placed. As described earlier by referring to FIG. 13, an algorithm is adopted as an algorithm for sequentially placing the beacon transmission timing of a newly participating communication station in about the middle of the interval of beacons set by existing communication stations. Assume that beacons have been positioned in accordance with this algorithm. If the minimum beacon interval $B_{min}$ is set at 5 milliseconds, only a maximum of 16 beacons can be placed in one super frame. That is to say, only up to 16 communication stations are allowed to participate in the network.

It is to be noted that, as shown explicitly in neither FIG. 13 nor FIG. 14, each beacon is transmitted at a time coincident with an offset deliberately set as an offset from a TBTT (Target Beacon Transmission Time), which is the beacon transmission time. This offset is referred to hereafter as a TBTT offset. In this embodiment, the TBTT offset is set at the value of a pseudo random number. A pseudo random number is determined uniquely by a TOIS (TBTT Offset Indication Sequence), which is updated for each super frame.

By providing a TBTT offset, actual beacon transmission times can be shifted from each other even if two communication stations place their beacon transmission timings at the same slot in the super frame so that, even if beacons transmitted by communication stations in a super frame collide with each other, the communication stations are capable of mutually listening to their transmitted beacons in another super frame or, to be more specific, two adjacent communication stations are capable of mutually listening to the beacons transmitted by both stations. Every communication station includes a TOIS updated for each super frame in beacon information, and informs surrounding communication stations of the beacon information as will be described later.

In addition, when any communication station is neither transmitting nor receiving data, the communication station is required as a mandatory to carry out a receiving operation before and after the communication station transmits a beacon. On the top of that, even if any communication station is neither transmitting nor receiving data, the communication station is required as a mandatory to carry out a scan process typically once several seconds by operating a receiver continuously over one super frame in order to determine whether or not each of surrounding communication stations is present or in order to determine whether or not the TBTT of each of surrounding communication stations has been shifted. Then, if a communication station recognizes a shifted TBTT, leading and lagging TBTTs are defined, and times are adjusted to the most lagging TBTT. A leading TBTT is a TBTT shifted within $-B_{min}/2$ milliseconds relative to a reference, which is a group of TBTTs recognized by the communication station. On the other hand, a lagging TBTT is a TBTT shifted within $+B_{min}/2$ milliseconds relative to the reference.

E-2. Transmission-Prioritized Period TPP

In an a communication environment not particularly having a relation between a controlling communication station and a controlled communication station, the radio communication apparatus 100 operating as a communication station executes transmission control effectively utilizing a transmission channel through transmitted (MAC) frames each having a flexible time-division-multiplexing access structure or communication control such as control of random accesses based on the CSMA/CA method.

Figure 15:
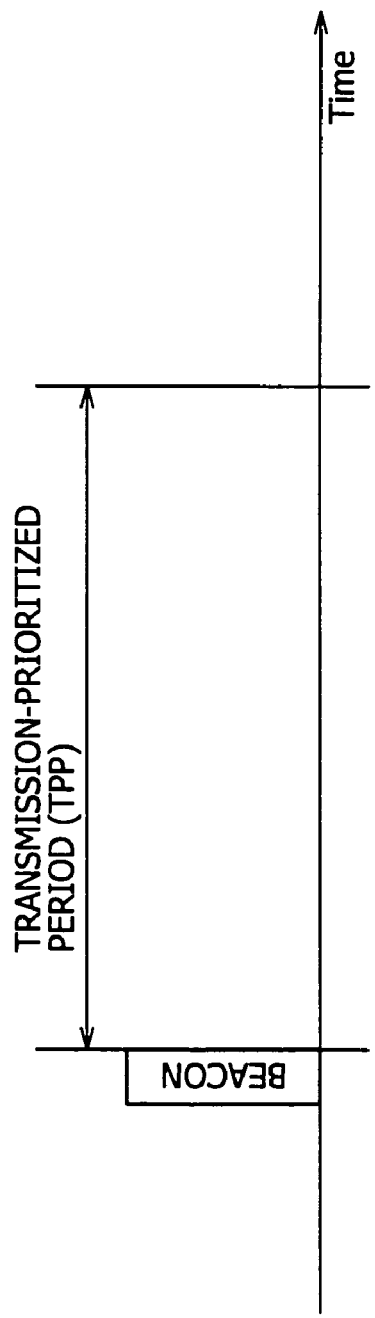
FIG. 15 is a diagram showing a state in which a transmission priority is given to a communication station transmitting a beacon.

In this embodiment, every communication station transmits beacons at fixed intervals. For a while following a transmission of a beam, however, a transmission priority is given to a communication station transmitting a beacon so that the traffic of signals can be managed autonomously in a distributed-processing manner and a communication band (QoS) can be allocated. FIG. 15 is a diagram showing a state in which a transmission priority is given to a communication station transmitting a beacon. In this specification, a period in which a transmission priority is given to a communication station transmitting a beacon is referred to as a transmission-prioritized period (TPP).

Figure 16:
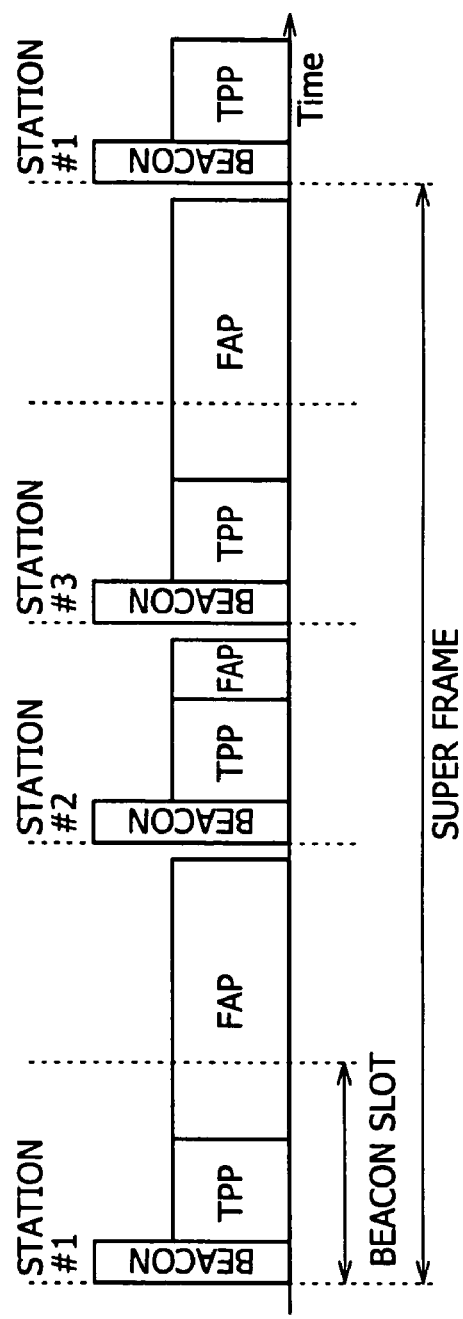
FIG. 16 is a diagram showing a typical configuration of a super frame (T_SF) for a case in which a transmission-prioritized period (TPP) is given to a communication station, which has transmitted a beacon.

FIG. 16 is a diagram showing a typical structure of a super frame T_SF including a transmission-prioritized period TPP given to each communication station transmitting a beacon. As shown in the figure, a transmission-prioritized period TPP is given to each communication station transmitting a beacon right after the transmitted beacon. A period following the TPP is defined as a FAP (Fairly Access Period). In the FAP, the communication station transmitting a beacon carries out communications in accordance with the ordinary CSMA/CA method as other communication stations do. The FAP is ended with a timing to transmit a beacon from the next communication station. Then, the timing to transmit a beacon from the next communication station is followed by a TPP given to the next communication station and a FAP.

Figure 17:
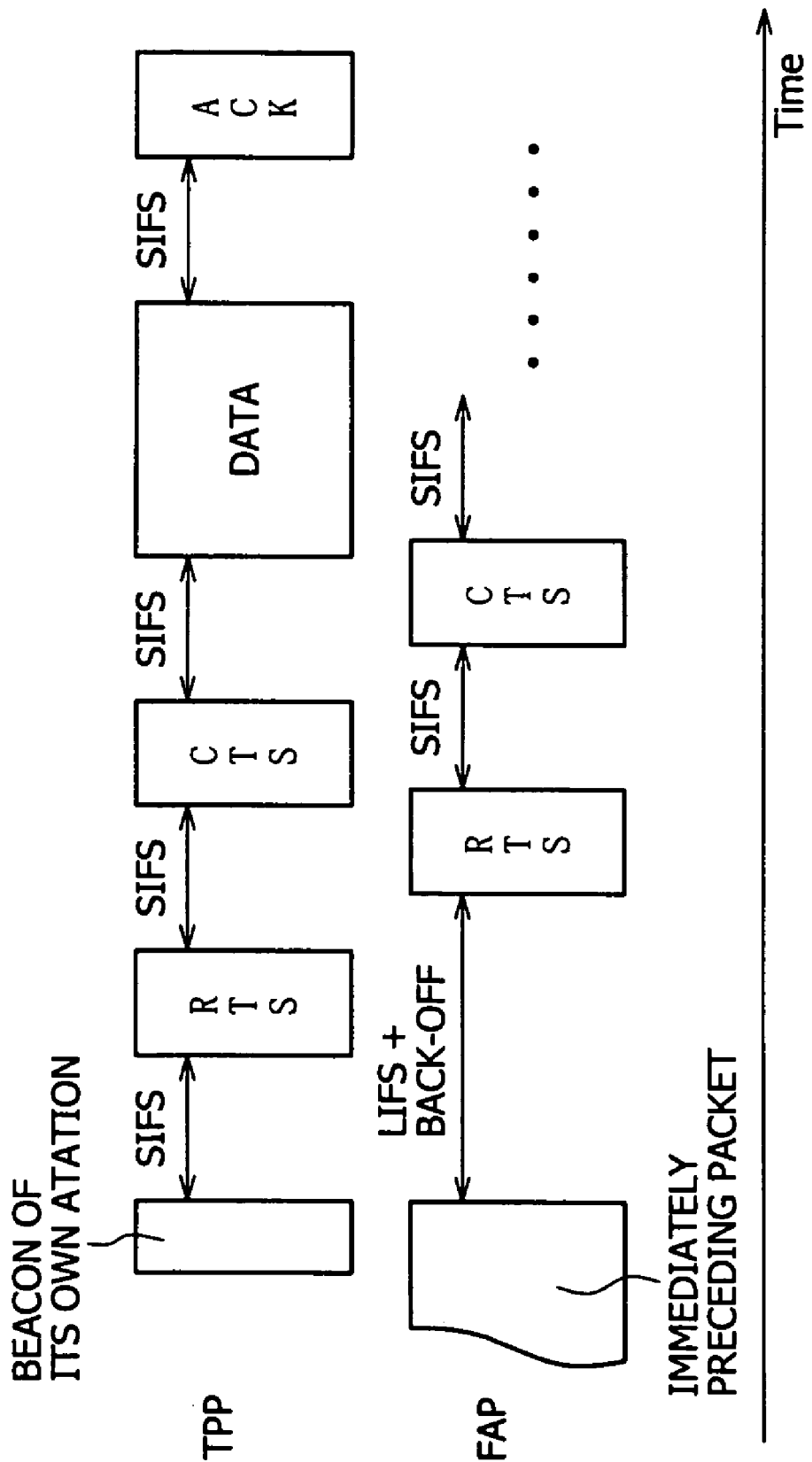
FIG. 17 is an explanatory diagram showing operations carried out by a communication station to start transmissions of signals during a TPP and a FAP.

FIG. 17 is an explanatory diagram showing operations carried out by a communication station to start transmissions of signals during a TPP and a FAP.

In a TPP, a communication station is capable of starting a transmission right after a shorter packet interval SIFS following a transmission of a beacon of its own. In the example shown in the figure, a beacon-sender communication station transmits an RTS packet right after the shorter packet interval SIFS. Thereafter, the CTS, data, and ACK packets are exchanged with a partner communication station in the same way at inter-frame intervals defined by the shorter packet interval SIFS so that adjacent communication stations are not disturbed and a sequential-communication procedure can be executed.

In the FAP, on the other hand, a beacon-sender communication station starts transmissions after entering a wait state for a period of a LIFS+random back-off as other communication stations do. In other words, each communication station is given a right of transmission through a back-off period on an equal-opportunity basis. In the example shown in the figure, after another communication station transmits a beacon, first of all, the state of the communication media is monitored during an LIFS. If the communication media is clear or no signal is transmitted during the LIFS, the communication station to receive the right of transmission enters a back-off period. If no signal is transmitted during the back-off period, the communication station transmits an RTS packet. It is to be noted that, by exchanging a series of packets including the CTS, data, and ACK packets at inter-frame intervals defined by the shorter packet interval SIFS with a partner communication station as packets following the transmission of the RTS packet, a sequential communication procedure can be executed without disturbing adjacent communication stations.

In accordance with the conventional signal management method described above, a communication station given a high priority is capable of setting a shorter frame interval and, hence, obtaining a transmission right by taking precedence of other communication stations, which are each given a lower priority. In the embodiment described, however, the transmission-prioritized period TPP is firmed at a fixed period not exceeding the minimum beacon interval. After the transmission-prioritized period TPP, a communication station transits to a FAP, which is a period in which all communication stations make an attempt to obtain a transmission right under an equal-opportunity condition during the common IFS and the random back-off period.

Figure 18:
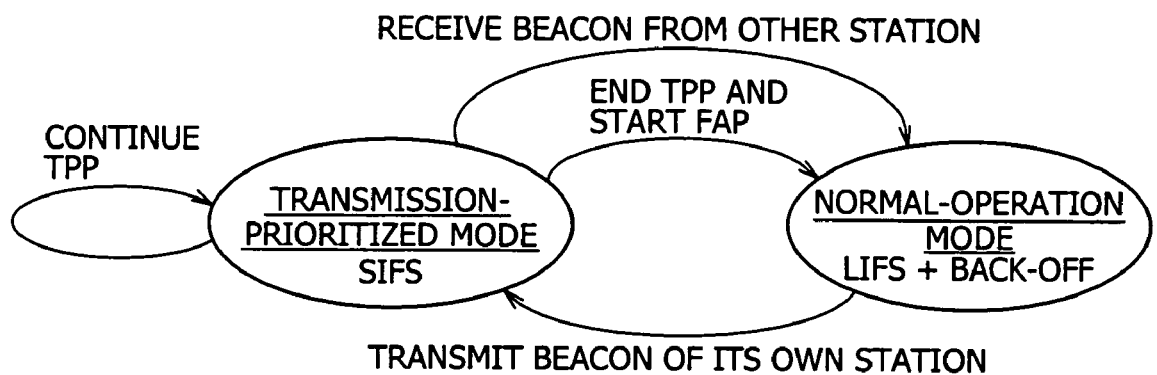
FIG. 18 is a state-transition diagram showing typical state transitions of a radio communication apparatus operating as a communication station.

FIG. 18 is a state-transition diagram showing typical state transitions of a radio communication apparatus operating as a communication station.

In a normal-operation mode, a communication station is put in a wait state for a long frame interval LIFS and a random back-off period following the LIFS before starting transmissions of packets.

In this normal-operation mode, with a beacon transmission timing TBTT of its own, the communication station transmits a beacon before making a transition to a transmission-prioritized mode. To put it in detail, the communication station transits to the transmission-prioritized mode by entering a transmission-prioritized period TPP.

In the transmission-prioritized mode, the communication station starts a transmission of a packet at the end of a wait period equal to the SIFS frame interval shorter than the LIFS frame interval to obtain a transmission right without disturbing adjacent communication stations.

The communication station continues the transmission-prioritized mode for the transmission-prioritized period TPP having a length corresponding to the length of a band requested by an apparatus on an upper layer.

When a FAP is started at the end of the TPP or when the communication station receives a beacon from another communication station, the communication station transits back from the transmission-prioritized mode to the normal-operation mode.

Figure 19:
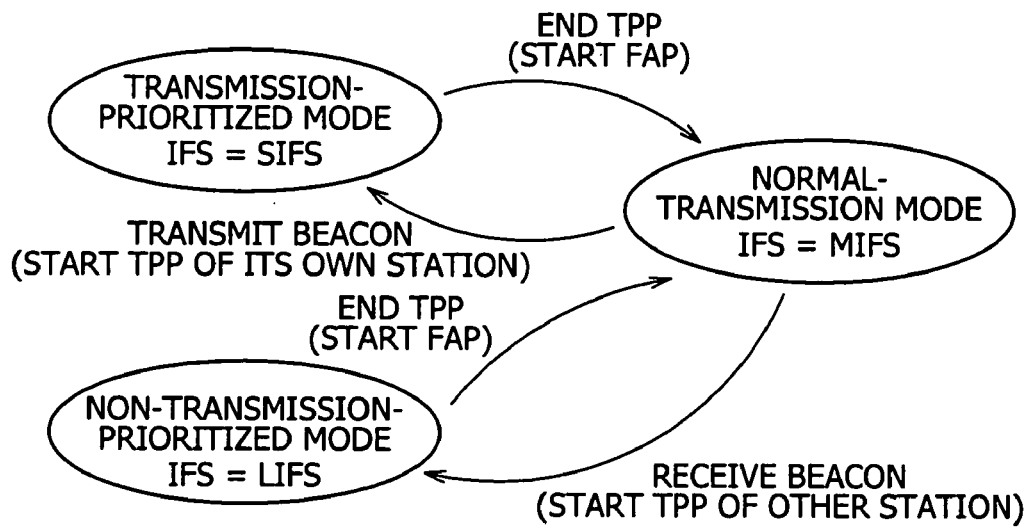
FIG. 19 is a state-transition diagram showing other typical state transitions of a radio communication apparatus operating as a communication station.

FIG. 19 is a state-transition diagram showing other typical state transitions of a radio communication apparatus operating as a communication station. In the state transitions shown in the figure, for each communication station, there are three defined states, i. e., a transmission-prioritized mode, a normal-transmission mode, and a non-transmission-prioritized mode. The transmission-prioritized mode corresponds to the transmission-prioritized period TPP in which the communication station has a transmission-prioritized right. The normal-transmission mode corresponds to the FAP period in which no communication station has a transmission-prioritized right. The non-transmission-prioritized mode corresponds to the transmission-prioritized mode of any other communication station.

In the normal-transmission mode, a communication station is put in a wait state for an ordinary frame interval MIFS and a random back-off period following the MIFS before starting transmissions of packets. Thus, during the FAP period, all communication stations in the radio communication system exchange packets after the period of (MIFS+back-off).

In this normal-transmission mode, with a beacon transmission timing TBTT of its own, the communication station transmits a beacon before making a transition to a transmission-prioritized mode. To put it in detail, the communication station transits to the transmission-prioritized mode by entering a transmission-prioritized period TPP.

In the transmission-prioritized mode, the communication station starts a transmission of a packet at the end of a wait period equal to the SIFS frame interval shorter than the ordinary MIFS frame interval to obtain a transmission right without disturbing adjacent communication stations. The communication station continues the transmission-prioritized mode for the transmission-prioritized period TPP having a length corresponding to the length of a band requested by an apparatus on an upper layer. When a FAP is started at the end of the TPP, the communication station transits back from the transmission-prioritized mode to the normal-transmission mode.

In addition, when the communication station receives a beacon from another communication station and the other communication station plunges into a transmission-prioritized period TPP, the communication station transits to a non-transmission-prioritized mode. In the non-transmission-prioritized mode, the communication station starts a transmission of a packet at the end of a wait period equal to the sum of a random back-off period and the LIFS frame interval longer than the ordinary MIFS frame interval of the normal-transmission mode.

When a FAP is started in the other communication station at the end of the TPP of the other communication station, the communication station transits back from the non-transmission-prioritized mode to the normal-transmission mode.

Basically, each communication station transmits a beacon once for every super frame but, in some cases, the communication station is allowed to transmit a plurality of beacons or signals each resembling a beacon in a super frame. Each time a beacon is transmitted, the communication station is capable of entering a TPP. In other words, the communication station is capable of assuring resources for priority transmissions in accordance with the number of beacons transmitted in a super frame. When a communication station transmits a plurality of beacons in a super frame, the beacon transmitted at the beginning of the super frame is referred to as a regular beacon whereas the second and subsequent beacons are each referred to as an auxiliary beacon. An auxiliary beacon is transmitted with a timing different from the timing of the regular beacon for the purpose of acquiring a TPP or another purpose.

In accordance with a demand raised by for example an apparatus on an upper layer of the communication protocol, a communication station may require a communication band exceeding the transmission-prioritized period TPP that can be obtained by transmitting a beacon once in a super frame. In this case, typically, an auxiliary beacon other than the regular beacon is transmitted to acquire another TPP.

FIG. 20 is a diagram showing a state in which a communication station transmits a plurality of virtual beacons each referred to as an auxiliary beacon to increase the length of the transmission-prioritized period. In the example shown in the figure, in order to assure a communication band demanded by an apparatus on an upper layer, communication station #1 finds available beacon slots in the super frame and places auxiliary beacons of its own in the slots to obtain a plurality of TPPs in the super frame.

E-3. Beacon Frame Format

FIG. 21 is a diagram showing a typical format of a beacon frame transmitted in a radio communication system provided by the present invention as a radio communication system having an autonomous-distribution type.

In the example shown in the figure, a beacon includes an RA field, a TA field, a type field, an NBOI/NBAI field, a TOIS field, an ALERT field, a TxNUM field, a serial field, a sense-level field, a netID field, and a TSF field. The RA (Receiver Address) field shows an address uniquely representing a communication station serving as a transmission destination. The TA (Transmitter Address) filed shows an address uniquely representing a communication station serving as transmission source. The type field shows the type of the beacon including this field. The NBOI (Neighboring Beacon Offset Information)/NBAI (Neighboring Beacon Activity Information) field shows reception-time information of a beacon receivable from an adjacent communication station. The TOIS (TBTT Offset Indication Sequence) field shows the aforementioned TBTT offset in the super frame as an offset at which the beacon is actually transmitted. The ALERT field shows various kinds of information to be transmitted to another communication station. The information includes a TBTT change. The TxNUM field shows the quantity of a resource allocated by the communication station by taking precedence of other communication stations. The serial field shows an exclusively unique serial number, which is assigned to the beacon in case a plurality of beacons is transmitted in the same super frame. The sense-level field shows the level of the signal detection capability of the communication station. The NetID field shows a logical network to which the communication station pertains. The TSF (Timing Synchronization Function) field transmits time information included by the communication station as information having nothing to do with control of accesses to the communication media.

In addition, the beacon includes fields for transmitting other information. Since the other information is not directly related to essentials of the present invention, these fields are collected into an ETC field. An example of the information described in the ETC field is paging information directed to a specific communication station. By using the ETC field, a transmission of data right after the beacon to the specific communication station can be planned.

To put it in detail, since a beacon is announced information, the RA (Receiver Address) field is used for storing a broadcast address. If the beacon is an auxiliary beacon transmitted for the purpose of assuring a band, however, the RA field may include unique information showing the receiver communication station. The TA (Transmitter Address) field describes an address uniquely representing the communication station transmitting the beacon.

The type field describes the type of the beacon in the format of a bit map having a length of 8 bits. In this embodiment, as information for indicating whether the beacon is a regular beacon or an auxiliary beacon, values in the range 0 to 255 are each used for showing a priority level. As described before, a regular beacon is a beacon transmitted by every communication station once in a super frame at the head of the super frame, whereas an auxiliary beacon is a beacon transmitted for obtaining a transmission right by taking precedence of other communication stations. To put it concretely, in the case of a regular beacon, which must be transmitted by every communication station once in a super frame at the head of the super frame, the number 255 is assigned to the beacon as a number indicating the highest priority level. On the other hand, a number in the range 0 to 254 is assigned to an auxiliary beacon as a number indicating the priority of the traffic.

The NBOI field of a beacon transmitted by a specific communication station shows information describing a reception time of a beacon transmitted from an adjacent communication station, that is, information describing the position of a beacon that can be received by the specific communication station. As shown in FIG. 14, in this embodiment, slots for positioning up to 16 beacons are provided in a super frame. The positions of slots of beacons that can be received by the specific communication stations are mapped onto bits of a bit map having a length of 16 bits. To put it concretely, the transmission time TBTT for transmitting a regular beacon from the specific communication station corresponds to the most significant bit (MSB) of the NBOI field whereas other slots each correspond to a bit at an offset from the MSB corresponding to the TBTT of the specific communication station. That is to say, any other slot corresponds to a bit position relative to the MSB of the NBOI field. In the NBOI field, bits allocated to slots of beacons transmitted by the specific communication station and slots of beacons that can be received by the specific communication station are each set at 1 while the remaining bits in the NBOI field are each reset at 0 as they are.

Figure 22:
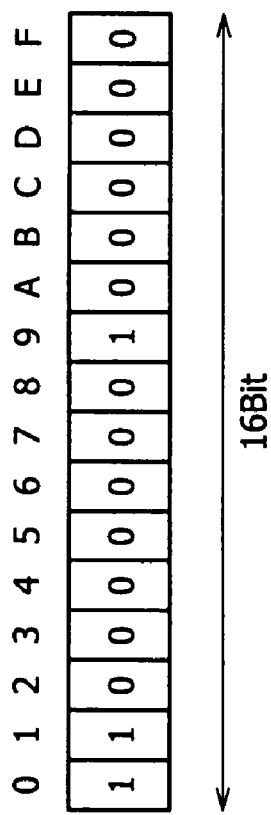
FIG. 22 is a diagram showing an array of typical bit values set in an NBOI field.

FIG. 22 is a diagram showing an array of typical bit values set in the NBOI field. In the example shown in the figure, communication station 0 creates an NBOI field having bit values of 1100 0000 0100 0000. As shown in FIG. 14, a super frame can accommodate slots for a maximum of 16 communication stations, i. e., communication station 0 to communication station F. In a communication environment in which every communication station allocates the first slot to the TBTT, the NBOI field shown in the figure indicates that communication station 0 is capable of receiving beacons transmitted from communication stations 1 and 9. That is to say, every NBOI bit allocated to the relative position of a received beacon is marked to indicate that a transmitted beacon can be received but the bit is left as a space to indicate that no beacon has been received. The value 1 set at the MSB indicates that communication station 0 transmits a regular beacon. Any other bit corresponding to a time at which communication station 0 transmits an auxiliary beacon is also marked.

If a specific communication station exchanges a beacon signal with another communication station and vice versa through a channel, on the basis of the NBOI information included in the beacon, beacon transmission timings to transmit beacons from the specific communication station to the other communication station can be properly placed in the NBOI field and beacon reception timings by which the specific communication station receives beacons from the other communication station can be detected from the NBOI field so that collisions can be avoided.

The NBAI field shows information identifying beacons actually received by the specific communication station. The NBAI field has the same format as the NBOI field.

The TOIS field shows a pseudo random array for determining the TBTT offset described earlier. The TBTT offset relative to the TBTT is an offset at which the beacon is actually transmitted. By providing a TBTT offset, actual beacon transmission times can be shifted from each other even if two communication stations place their beacon transmission timings at the same slot in the super frame. Even if beacons transmitted by communication stations in a super frame collide with each other, the communication stations are capable of mutually listening to their transmitted beacons in another super frame or, to be more specific, any one of two adjacent communication stations is capable of listening to the beacons transmitted by the other communication station.

Figure 23:
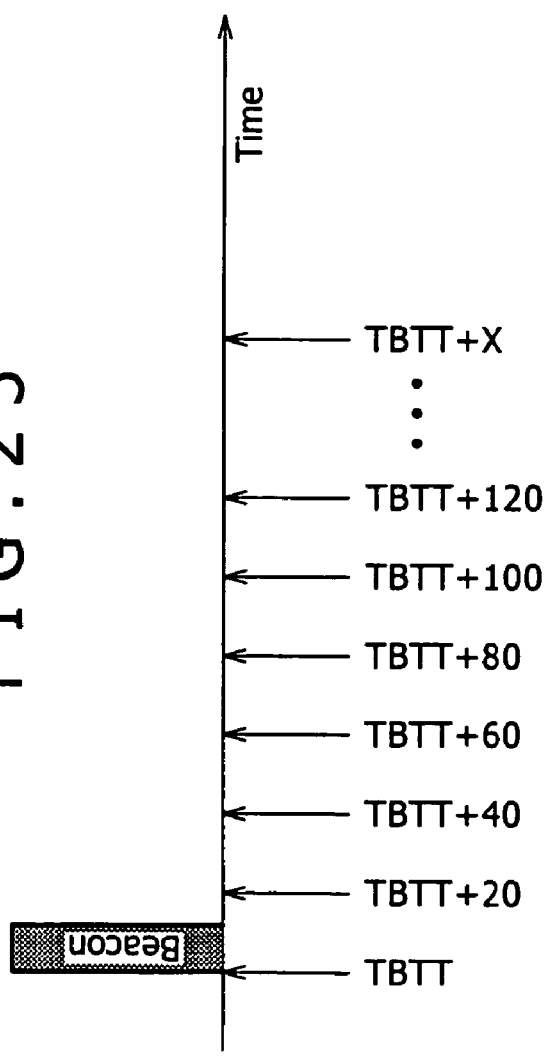
FIG. 23 is a diagram showing a TBTT and actual beacon transmission times.

FIG. 23 is a diagram showing the TBTT and actual beacon transmission times. As shown in the figure, a TBTT offset can be defined as such a value that the actual beacon transmission time coincides with the TBTT, the TBTT+20 microseconds, the TBTT+40 microseconds, the TBTT+60 microseconds, the TBTT+80 microseconds, the TBTT+100 microseconds, or the TBTT+120 microseconds. For each super frame, a communication station determines a TBTT offset at which a beacon is actually transmitted, and updates the TOIS field. In addition, if a communication station is not capable of transmitting a beacon at the time intended for the beacon, the TOIS field is filled up with typically all zeros to inform an adjacent communication station capable of receiving the beacon that the timing to transmit the beacon does not coincide with the intended time.

The ALERT field contains information to be transmitted to an adjacent communication station in the event of an abnormality. Typically, the ALERT field of a beacon transmitted by a specific communication station shows a plan to change the TBTT of the regular beacon of the specific communication station in order to avoid collisions of beacons or shows a request issued to an adjacent communication station as a request to stop a transmission of an auxiliary beacon.

The TxNum field of a beacon transmitted by a communication station shows the number of auxiliary beacons transmitted by the communication station in a super frame. After a transmission of a beacon from a communication station, the communication station is given a TPP or a right of transmission. Thus, the number of auxiliary beacons transmitted by the communication station in a super frame corresponds to a time rate at which transmissions are carried out through assurance of resources by taking precedence of other communication stations.

As described above, the serial field shows an exclusively unique serial number, which is assigned to the beacon in case a plurality of beacons is transmitted in the same super frame. That is to say, a serial number assigned to a beacon is a number exclusively unique to the beacon among all beacons transmitted in the super frame. In this embodiment, the serial number assigned to an auxiliary beacon transmitted by a communication station indicates the order number of the TBTT at which the auxiliary beacon is transmitted by the communication station.

The sense-level field of a beacon transmitted by a communication station shows information indicating the lowest level of a signal that can be detected by the communication station as a received signal. Typically, the level is represented by a reception SINR. In some cases, a communication station reduces the preamble detection precision of a receiver by deliberately not detecting a signal received at a low SINR as a received signal for the purpose of controlling an executable-communication range. This field is used to report a control state in the communication station transmitting the beacon to a communication station receiving the beacon. The communication station receiving the beacon refers to this field to adjust a data rate of data transmitted to the communication station transmitting the beacon and adjust a preamble detection precision of its own in some cases.

The NetID (Network Identifier) field of a beacon shows the identifier of the owner of the communication station transmitting the beacon. The communication station receiving the beacon refers to this field to determine whether or not the communication station receiving the beacon and the communication station transmitting the beacon pertain to the same network.

The TSF (Timing Synchronization Function) field is used for transmitting time information included by the communication station transmitting the beacon. In applications other than the media-access application, the time information is used mainly for the purpose of synchronizing the other applications. The time information shows a transmission time of a signal as a time that can be picked out in a free-run operation with a high degree of fidelity from the clock of the communication station transmitting the beacon without regard to modification of the transmission time of the beacon, correction of the clock for holding a TDMA structure, and access control such as determination of a TBTT offset. The communication station receiving the beacon transmits the value shown in the TSF field and a reception time to an apparatus on an upper layer or holds the value as a reference time for information received from the communication station transmitting the beacon.

E-4. Setting the Beacon TBTT

After the power supply of a communication station is turned on, first of all, any specific communication station carries out a scan operation by making an attempt to receive signals continuously for a period at least equal in length to a super frame in order to recognize the existence of a beacon transmitted by an adjacent communication station. In this process, if no beacons have been received from adjacent communication stations, the specific communication station sets a proper timing as a TBTT.

If beacons have been received from adjacent communication stations in this process, on the other hand, the specific communication station refers to a result of a logical-OR operation carried out on the NBOI fields of the beacons received from the adjacent communication stations after shifting each of the fields in accordance with the reception time of the beacon containing the shifted field. Finally, a timing corresponding to an unmarked bit position is taken as a timing to transmit a beacon. An array of 1s and 0s, which are obtained as a result of reference to a result of the logical-OR operations carried out on the NBOI fields after shifting each of the NBOI fields in accordance with the reception time of the beacon including the shifted field, is referred to as a reception NBOI table (Rx NBOI table).

Basically, a communication station obtains a transmission-prioritized period TPP immediately after transmitting a beacon. From the transmission-efficiency point of view, it is thus rather desirable to uniformly distribute beacon transmission timings of communication stations in a super frame. For this reason, as a result of logical-OR operations carried out on the NBOI fields of beacons received from adjacent communication stations, the center of a segment having a largest space-run length is taken as a beacon transmission timing. If the TBTT interval having the largest space-run length is shorter than the shortest TBTT interval, that is, if the TBTT interval having the largest space-run length is shorter than $B_{min}$, however, no new communication station is capable of participating in this radio communication system.

Figure 24:
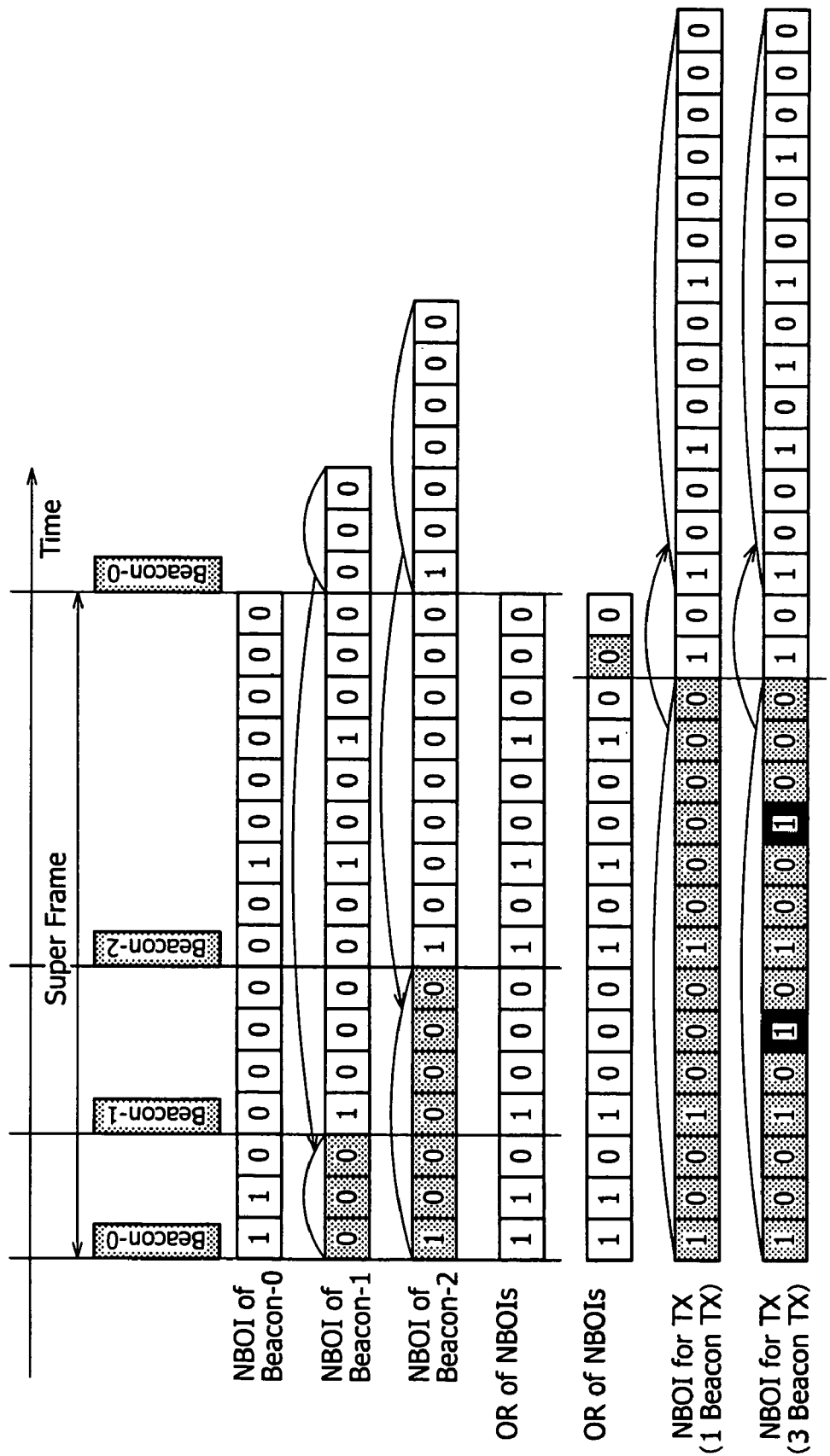
FIG. 24 is a diagram showing a state of an operation carried out by a new communication station participating in the radio communication system to set a TBTT of its own on the basis of the NBOI of a beacon received from each adjacent communication station.

FIG. 24 is a diagram showing a state of an operation carried out by a new communication station participating in the radio communication system to set a TBTT of its own on the basis of the NBOI information of a beacon received from each adjacent communication station.

As described above, after the power supply of a communication station is turned on, first of all, any specific communication station carries out a scan operation by making an attempt to receive signals continuously for a period at least equal in length to a super frame in order to recognize the existence of a beacon transmitted by an adjacent communication station. In this process, if no beacons have been received from adjacent communication stations, the specific communication station sets a proper timing as a TBTT. If beacons have been received from adjacent communication stations in this process, on the other hand, the specific communication station refers to a result of a logical-OR operation carried out on the NBOI fields of the beacons received from the adjacent communication stations after shifting each of the fields in accordance with the reception time of the beacon including the shifted field. Finally, a timing corresponding to an unmarked bit position is taken as a timing to transmit a beacon.

In the example shown in FIG. 24, attention is paid to communication station A, which newly appears on the stage. It is assumed that communication stations 0, 1, and 2 exist at locations surrounding communication station A. Let communication station A be capable or receiving beacons from the three communication stations, i. e., communication stations 0, 1, and 2, in a super frame as a result of a scan operation.

As described earlier, the NBOI field of a beacon transmitted by a communication station is described in the format of a bit map including bit positions including the first bit position and subsequent bit positions, onto which the transmission time of the regular beacon transmitted by the communication station and reception times of beacons from surrounding communication stations are mapped respectively. With such a bit map, communication station A refers to a result of a logical-OR operation carried out on NBOI bits representing timings in the NBOI fields of three beacons received from the surrounding communication stations 0, 1, and 2 after shifting each of the fields in accordance with the reception of the beacon including the shifted field along the time axis to align corresponding positions of the bits.

A result of the logical-OR operation carried out on NBOI bits representing timings in the NBOI fields of three beacons is referred to as "OR of NBOIs" which has a value of '1101 0001 0100 1000' shown in FIG. 24. A '1' represents the relative position of a timing with a TBTT already set in the super frame. On the other hand, a '0' represents the relative position of a timing with a TBTT not set yet in the super frame. In this "OR of NBOIs" array, the greatest length of a space consisting of all zeros is 3 bits. The array includes two spaces each having the greatest length as candidates for a space in which a beacon transmission timing is to be determined. In the example shown in FIG. 24, communication station A determines the darkened 15th bit of the array as the TBTT of a regular beacon of its own.

Communication station A determines the time corresponding to the 15th bit of the array as the TBTT of a regular beacon of its own as described above and, then, starts transmissions of beacons. As explained earlier, the TBTT of a regular beacon of its own is the beginning of a super frame of its own. At that time, the NBOI field of a beacon transmitted by communication station A is described in the format of a bit map including bits each representing a position relative to the transmission time of a regular beacon of its own. Bit positions each marked with a '1' indicate times of reception of beacons from communication stations 0 to 2, which are capable of receiving beacons from communication station A. "NBOI for TX (1 Beacon TX)" shown in FIG. 24 is the NBOI field of a beacon transmitted by communication station A.

It is to be noted that, if communication station A also transmits an auxiliary beacon for typically the purpose of obtaining a transmission-prioritized right, communication station A further searches the "OR of NBOIs" array obtained as a result of carrying out a logical-OR operation on NBOI fields of beacons received from the surrounding communication stations for a space with the greatest length, and sets the transmission time of the auxiliary beacon at a bit position in the space found in the search. As described earlier, a space is a sequence of consecutive 0s. In the example shown in FIG. 24, it is assumed that two auxiliary beacons are transmitted. In this case, the transmission times of the auxiliary beacons are set at the sixth and eleventh bits in spaces of the "OR of NBOIs" array. Thus, marked bits in the NBOI field of a beacon transmitted by communication station A represent the transmission times of the auxiliary beacons in addition to the transmission time of a regular beacon of its own and the reception times of beacons from surrounding communication stations 0 to 2. As described earlier, the positions represented by the marked bits are relative to the position of the regular beacon. "NBOI for TX (3 Beacon TX)" shown in FIG. 24 is the NBOI field of a beacon transmitted by communication station A also transmitting the auxiliary beacons.

When every communication station transmits beacons by setting timing TBTTs to transmit beacons of its own in accordance with a procedure described above, collisions of beacons can be avoided on condition that every communication station is stable and ranges of arrivals of electric waves do not fluctuate. In addition, in accordance with the priority level of transmitted data, an auxiliary beacon or a signal resembling a plurality of auxiliary beacons is transmitted during the super frame so that the beacon-sender communication station is capable of allocating resources by taking precedence of other communication stations and QoS communication can thus be provided. In addition, by referring to the NBOI field showing the number of beacons received from an adjacent communication station, every communication station is capable of autonomously grasping the degree of saturation of the radio communication system. Thus, in spite of the fact that the radio communication system is a distributed-control system, the system is capable of providing accommodation for priority traffic while adding the degree of saturation of the radio communication system to every communication station. In addition, by referring to the NBOI field of a received beacon, every communication station is capable of determining beacon transmission times avoiding collisions. Thus, even if a plurality of communication stations provides accommodation for priority traffic, it is possible to get rid of a situation in which a number of collisions occurs.

E-5. Measurement of a Received Signal SINR and a Signal Detection Capability Threshold In the present invention, when a signal is received, the SINR value of the signal is measured. As an alternative, a maximum of absolute values of correlations obtained at the signal detection time is saved to be reported to an apparatus on a MAC (Media Access Control) layer as information added to the received signal. The apparatus on the MAC (Media Access Control) layer is capable of determining the required level of the capability of detecting the signal on the basis of the additional information.

The required level of the capability of detecting a signal received by a communication station is referred to an Rx sense level. In particular, when a beacon is received, the Rx sense level and transmitted information conveyed by the beacon are used in a variety of applications as will be described in detail later. The threshold value of the signal detection capability is referred to as a sense level. An operation to raise the sense level is defined to mean an operation to reduce the signal detection capability.

E-6. Processing Carried out in Case a Desired Available TBTT is Not Found

In the autonomous-distribution network system provided by the present invention, in accordance with a procedure to carry out a logical-OR operation on beacons received by a specific communication station from surrounding communication stations as already described earlier by referring to FIG. 24, the specific communication station is capable of picking up a beacon transmission time available to itself.

In the case of communication stations existing at dense locations, however, it can be assumed that a time band available to a communication station for transmission of a beacon of its own does not exist anymore. The following description explains processing carried out in case a desired available TBTT is not found.

Figure 25:
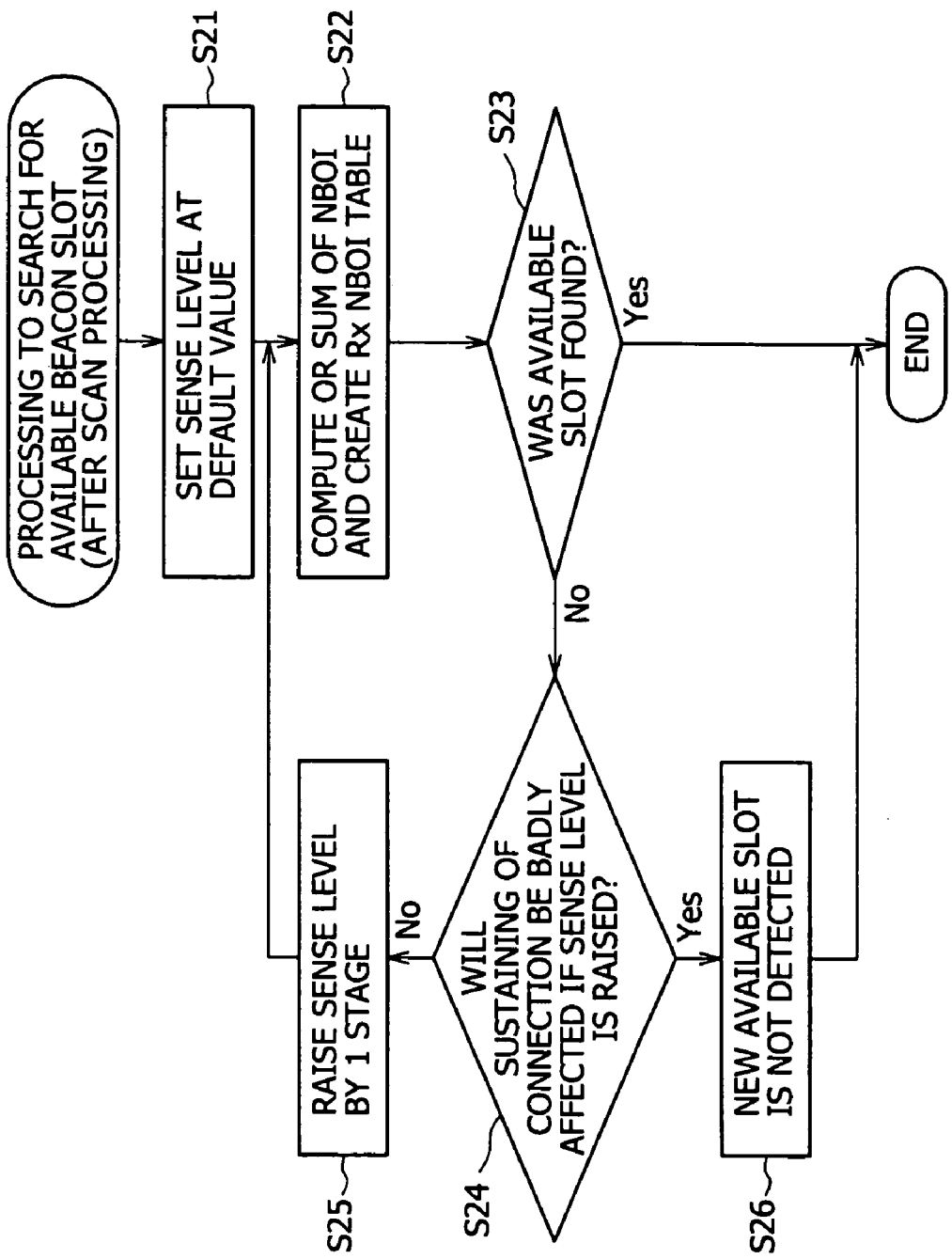
FIG. 25 shows a flowchart representing a processing procedure executed by a communication station to set a beacon transmission time of its own.

FIG. 25 shows a flowchart representing a processing procedure executed by a communication station to set a beacon transmission time of its own. The processing is typically carried out after the communication station performs a scan process to acquire most recent NBOI information.

First of all, at a step S21 at the beginning or the flowchart, the communication station sets a sense level of its own at a default value. The default value is the present value of the sense level of the communication station or the maximum signal detection capability.

Then, at the following step S22, the communication station carries out a logical-OR operation on NBOI bits of received beacons to create an Rx NBOI table. The logical-OR operation is carried out on NBOI bits in accordance with the procedure shown in FIG. 24. At that time, an Rx NBOI table is created by excluding a beacon including an Rx sense level lower than a sense level of its own as additional information from a tabulation. The beacon including an Rx sense level lower than a sense level of its own as additional information is a beacon received from a communication station setting a wider executable-reception range by increasing a signal detection capability to a level higher than the capability of its own.

Subsequently, at the next step S23, the communication station makes an attempt to extract a time for transmitting a new beacon of its own from the created Rx NBOI table. If a time for transmitting a new beacon of its own can be extracted from the created Rx NBOI table, the extracted time is set as a beacon transmission time and the execution of this processing is ended.

If a time for transmitting a new beacon of its own cannot be extracted from the created Rx NBOI table at the step S23, on the other hand, at a step S25, the sense level is raised, that is, the signal detection capability is reduced and the communication station transits to processing to shrink an executable-reception range of its own. At a step S24 preceding the step S25, the communication station determines whether or not a connection being used by the communication station for carrying out the present communication will be broken and whether or not transmission of data of a predetermined amount can no longer be carried out due to the operation to raise the sense level.

If a result of the determination indicates that the sense level can be raised, the communication level raises the sense level by one stage at the step S25. Then, the flow of the procedure goes back to the sep S22 to repeat the processing described above.

If the determination result produced at the step S24 indicates that the extraction of a time to transmit a new beacon will be disabled because the operation to raise the sense level has an effect on the connection being used by the communication station for carrying out the present communication, on the other hand, a proper operation is carried out at a step S26 before the execution of the processing is ended.

Figure 26:
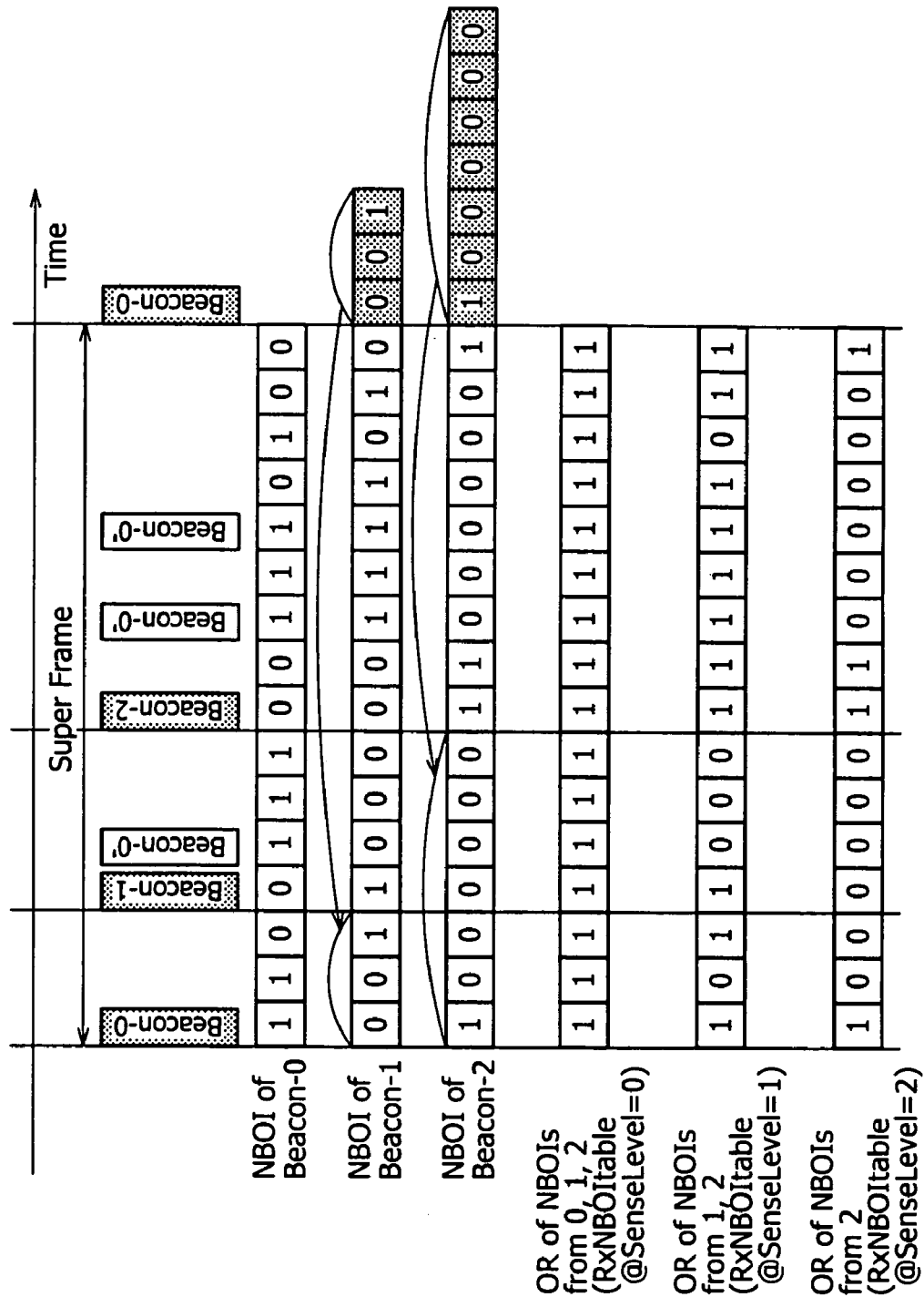
FIG. 26 is an explanatory diagram showing concrete processing operations to raise a sense level, create an Rx NBOI table while shrinking the executable-reception range, and search the created Rx NBOI table for an available slot.

FIG. 26 is an explanatory diagram showing concrete processing operations to raise a sense level, create an Rx NBOI table while shrinking the executable-reception range and search the created Rx NBOI table for an available slot.

In the example shown in the figure, attention is paid to communication station A, which newly appears on the stage as is the case with the example shown in FIG. 24. It is assumed that communication stations 0, 1, and 2 exist at locations surrounding communication station A. Let communication station A be capable or receiving beacons from the three communication stations, i. e., communication stations 0, 1, and 2, in a super frame as a result of a scan operation. Also assume that the RX sense level added to a beacon received from communication station 0 is 1, the Rx sense level added to a beacon received from communication station 1 is 2, and the Rx sense level added to a beacon received from communication station 2 is at least 2.

First of all, communication station A sets a sense level of its own at a default value of 0. Then, communication station A creates an Rx NBOI table as a result of a logical-OR operation carried out on NBOI bits representing timings in the NBOI fields of three beacons received from the surrounding communication stations 0, 1, and 2 after shifting each of the fields in accordance with the reception of the beacon including the shifted field.

'Rx NBOI Table @ Sense Level=0' shown in the figure is the Rx NBOI table created by setting the sense level at 0. As shown in the figure, this Rx NBOI table does not include an available slot.

For this reason, communication station A increments the sense level by 1 in order to lower the signal detection capability by one step. That is to say, communication station A shrinks an executable-reception range of its own by one step. Then, communication station A again carries out the logical-OR operation to create an Rx NBOI table in the same way. In this case, since a beacon received from communication station 0 includes a sense level of 1 as additional information, the beacon is excluded from a tabulation as an object of processing. Thus, there is an available slot as indicated by 'Rx NBOI Table @ Sense Level=1' shown in the figure. If the available slot obtained at this stage is sufficient, communication station A settles at the sense level of 1.

If the number of obtained available slots is not large enough for allocating a band, on the other hand, communication station A again increments the sense level by 1 to 2 in order to further lower the signal detection capability by another step. That is to say, communication station A further shrinks an executable-reception range of its own by another step. Then, communication station A again carries out the logical-OR operation to create an Rx NBOI table in the same way. In this case, since a beacon received from communication station 1 includes a sense level of 2 as additional information, the beacon is excluded from a tabulation as an object of processing. Thus, there is a number of available slots as indicated by 'Rx NBOI Table @ Sense Level=2' shown in the figure. If the available slots obtained at this stage are sufficient, communication station A settles at the sense level of 2.

A communication station sets a timing of an available slot as a beacon transmission time in accordance with such a slot-searching algorithm and then the radio communication system transits to a steady state.

In addition, a reception range can be adjusted by modifying the sense level. In order to adjust the transmission range to accompany the adjustment of the reception range, the transmission power is also adjusted in accordance with typically changes shown in tables 2 to 4 described above so as to sustain the uniformity of the control of accesses to the communication media.

It is to be noted the slot-searching algorithm described above can also be applied to processing to set transmission times of both a regular beacon and an auxiliary beacon.

It is to be noted that the sense level does not have to be set at the same value throughout the super frame. For example, if communications with a specific communication station can be carried out in a narrow range even though it is desirable to announce the existence of a communication station, the sense level in the neighborhood of a transmission time band of a regular beacon can be set at a value for increasing both the executable-reception range and the executable-transmission range, but the sense level in the neighborhood of time bands to transmit an auxiliary beacon in an application with a specific communication station serving as a communication destination and the transmission-prioritized period TPP can set at a value for decreasing both the executable-reception range and the executable-transmission range.

Thus, if it is desired to allocate a band to an adjacent specific communication station destination but a transmission time band of an auxiliary beacon for allocating such a band cannot be found, with a sense level raised for transmitting an auxiliary beacon, an available TBTT is extracted. In this way, the sense level is raised and the transmission power is reduced to transmit an auxiliary beacon only during a time band for transmission of the auxiliary beacon. A control method for such a case is described as follows.

Assume a situation in which a communication station is instructed by an apparatus on a higher layer of the communication protocol to allocate a time band to a specific communication partner but the requested band cannot be allocated due to the fact that a number of slots in the super frame has already been used by surrounding communication stations. In such a case, the communication station starts processing to detect an available slot by raising the sense level or by narrowing the executable-reception range in accordance with the processing procedure shown in FIG. 25. At that time, when the sense level is raised, the transmission power is reduced. Thus, there is also a phenomenon in which the receiver SINR in a partner communication station decreases. Therefore, the number of necessary slots is adjusted while corrections are being made for the phenomenon. It is to be noted that a later description will explain a correction method for the phenomenon in which the receiver SINR in a partner communication station decreases.

If a result of this processing determines that a band can be allocated to a sense level set at 2, the sense level and the transmission-power level are set at 2 only for the vicinity of a time band of a transmission-prioritized period allocated to transmissions to the partner communication station. Thus, the executable-reception range and the executable-transmission range only for the vicinity of a time band are narrowed.

Figure 41:
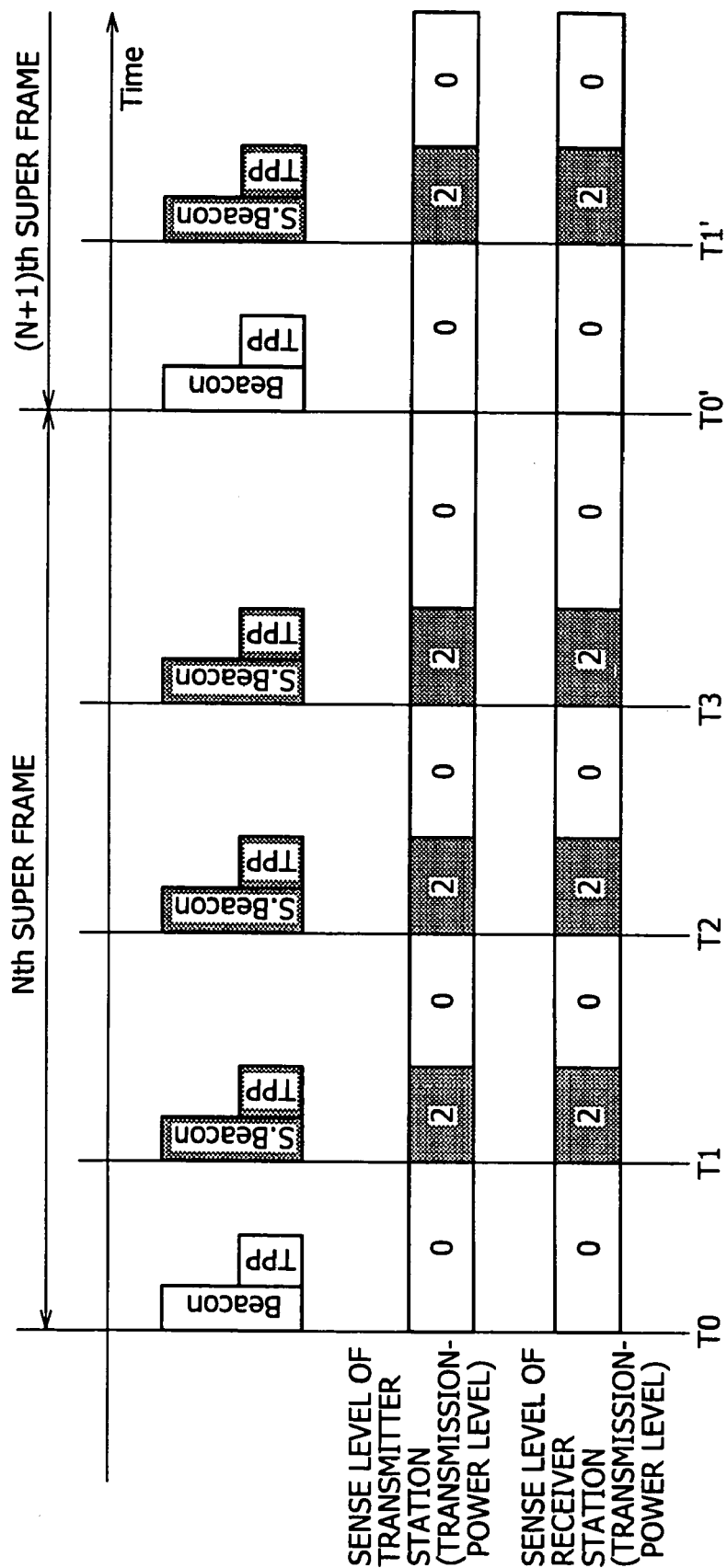
FIG. 41 is a diagram showing a state in which a communication station changes its transmission power and signal detection capability in accordance with a time band.

FIG. 41 is a diagram showing a state in which a communication station changes the transmission power and the signal detection capability in accordance with a time band. In the example shown in the figure, a super frame starts at a time T0. Time bands starting at times T1, T2, and T3 in the super frame are each a slot required by the communication station for allocating a band to a specific communication station. Normally, the communication station sets the levels of the transmission power and the signal detection capability at 0. In the vicinities of the time bands starting at the times T1, T2, and T3, however, the levels of the transmission power and the signal detection capability are each set at 2 in order to narrow the executable-reception range and the executable-transmission range. Thus, a slot can be allocated to the specific communication station without disturbing other surrounding communication stations. Note that, for the purpose of getting rid of detections of unnecessary interference signals or the like, it is necessary to modify the executable-reception range at times preceding a little bit the times T1, T2, and T3.

In processing carried out by a sender communication station to change the executable-reception range and the executable-transmission range only for a time band of transmissions to a receiver communication station, accompanying processes to set the executable-reception range and executable-transmission range of the sender communication station, the executable-reception range and executable-transmission range of the receiver communication station are also modified in some cases. In this case, also in the receiver communication station, only for the vicinities of the time bands starting at the times T1, T2, and T3, the levels of the signal detection capability and the transmission power are set at a lower value of 2 in order to assure signals received from the sender communication station as shown also in FIG. 41. The executable-reception range is changed, and the receiver communication station is capable of suppressing the number of undetected received signals caused by detections of unnecessary interference signals. In addition, the receiver communication station transmits an ACK signal to acknowledge reception of data. The executable-transmission range is changed, interferences on communication stations surrounding the receiver communication stations as interferences caused by the ACK signal can be eliminated. As a result, frequencies can be utilized with a higher degree of efficiency.

Figure 42:
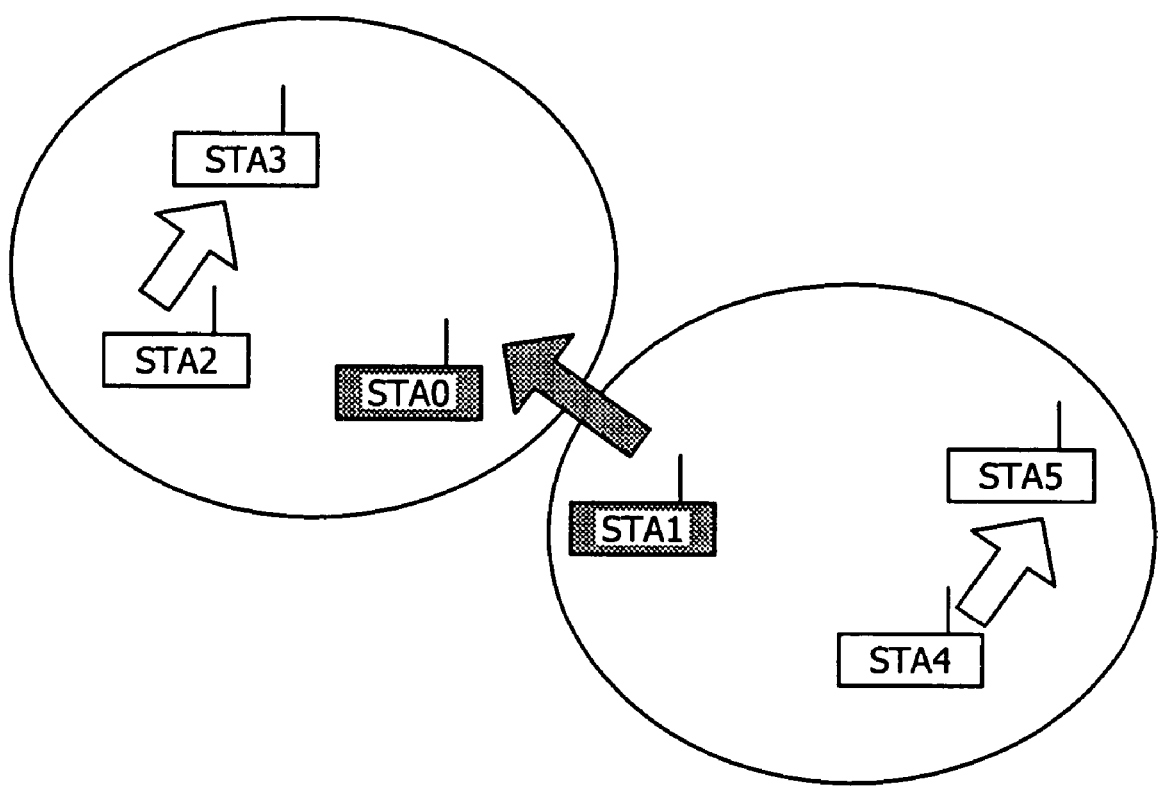
FIG. 42 is a diagram showing a state in which the traffic of communication stations surrounding transmitter communication station STA1 is different from the traffic of communication stations surrounding receiver communication station STA0.

In an ad-hoc environment, communication stations are spread at different locations. The utilization state of peripheral media in a data-sender communication station may thus be different from that in a data-receiver communication station in some cases. FIG. 42 is a diagram showing a state in which the traffic of communication stations surrounding data-sender communication station STA1 is different from the traffic of communication stations surrounding data-receiver communication station STA0. In the example shown in the figure, the communication stations surrounding communication station STA1 are communication stations STA4 and STA5 whereas the communication stations surrounding communication station STA0 are communication stations STA2 and STA3. Thus, the traffic of the communication stations surrounding data-sender communication station STA1 is much different from the traffic of the communication stations surrounding data-receiver communication station STA0.

In such a case, prior to the start of a transmission of information to communication station STA0, communication station STA1 requests communication station STA0 to report the state of utilization of transmission-prioritized periods for the surrounding communication stations by combining some sense levels into one set, and then determines the transmission-prioritized period, the executable-reception range, and the executable-transmission range.

FIG. 43 shows a flowchart representing a processing procedure executed by a communication station to determine an executable-reception range and executable-transmission range of its own on the basis of the state of utilization of the transmission-prioritized period of every adjacent communication station and the sense level of every adjacent communication station.

Assume that communication station STA1 serving as the source of a transmission of information receives a command from an apparatus on an upper layer of the communication protocol as a command to allocate a band to communication station STA0. Also assume that most of slots in the super frame have already been used so that the requested band cannot be allocated in some cases.

In such cases, first of all, at a step S51 at the beginning or the flowchart, communication station STA1 transmits a request to communication station STA0 as a request saying: "Carry out processing to make an attempt to detect an available slot while raising the sense level on the basis of a scan result and report a result of the processing."

Then, at the next step S52, communication station STA1 activates a scan process to recognize the occupation state of the communication media of communication stations surrounding communication station STA1.

In the mean time, receiving the request from communication station STA1 at the next step S53, communication station STA0 also activates a scan process as well. Then, communication station STA0 carries out processing to make an attempt to detect an available slot while raising the sense level in accordance with the processing procedure represented by the flowchart shown in FIG. 25 on the basis of a result of the scan process and extracts the number of available slots detected at each sense level. Subsequently, at the next step S54, communication station STA0 transmits the extracted information to communication station STA1.

Receiving the information from communication station STA0 at the next step S55, communication station STA1 replaces NBOI information obtained from a beacon of communication station STA1 with the information received from communication station STA0 and, then, carries out processing to make an attempt to detect an available slot while raising the sense level in accordance with the processing procedure represented by the flowchart shown in FIG. 25. Subsequently, communication station STA1 determines an executable-transmission range and executable-reception range in a transmission-prioritized period for accommodating the requested traffic.

In the processing to make an attempt to detect an available slot, information received from communication station STA0 is utilized as information on available slots for each sense level, communication station STA1 is capable of detecting available slots by considering additional information on traffic of communication stations surrounding communication station STA0 serving as a receiver communication station for a state in which the sense level of communication station STA0 has been changed. At that time, since the transmission power is reduced to accompany the operation to raise the sense level, it is also very important to adjust the number of required slots while making a correction by also considering a phenomenon of a decreasing receiver SINR in the partner station.

By execution of such a procedure, in a time band of transmitting and receiving information to and from a specific communication station, the executable-transmission range and the executable-reception range are changed in advance by additionally considering the occupation states of the communication media of communication stations surrounding both the transmitter and receiver communication stations so as to allow the time band to be determined.

E-7. Operations in Scan Processing

If a communication station limits its executable-reception range (and hence its executable-transmission range) by changing the sense level thereof, in a steady state, the communication station is no longer capable of knowing states outside the executable-reception range in order to determine whether or not a received signal exists in accordance with a set sense level.

In a network system of the autonomous-distribution type, however, scan processing is carried out at fixed intervals as described above. At that time, nevertheless, it is necessary to extract information on surrounding communication stations outside a limited executable-communication range. To achieve these objectives, a communication station sets the sense level at a minimum value on a temporary basis in a scan operation (or maximizes the signal detection capability) to receive a signal.

In the course of scan processing, a beacon transmitted by a communication station not existing in a steady state is received. However, the Rx sense level included in such a beacon should be lower than a set sense level. Thus, even in the case of a beacon received from a new communication station, if the Rx sense level included in such a beacon is lower than a set sense level, basic processing is carried out by assuming that the new communication station and its beacon do not exist.

In addition, as a result of the scan processing, a communication station creates an Rx NBOI table by treating a beacon including an Rx sense level lower than a set sense level as an object of tabulation. In this case, if an available slot is known to exist in the Rx NBOI table, the communication station may activate processing to move a TBTT of its own to the available slot in order to extend the executable-transmission range and the executable-reception range. That is to say, if an available slot is known to exist in the Rx NBOI table, in a word, the communication station is capable of assuring a sufficient band even if the sense level is lowered in order to expand the executable-communication range.

In this case, the executable-reception range is extended by decrementing the value of the sense level and restoring the value to a minimum that results in an available slot in the Rx NBOI table. In addition, if the sense level is changed, the transmission power is also modified as well to expand the transmission range.

E-8. Processing to Increase the Executable-Transmission Range

If communication station 1 disappears after a steady state has been established without setting the sense level at a maximum range in a situation like the one shown in FIG. 26, for example, communication station A is capable of lowering the sense level, that is, capable of raising the signal detection capability in order to increase the executable-reception range. The following description explains processing for a case in which the sense level once raised is lowered again to increase the executable-communication range.

Figure 27:
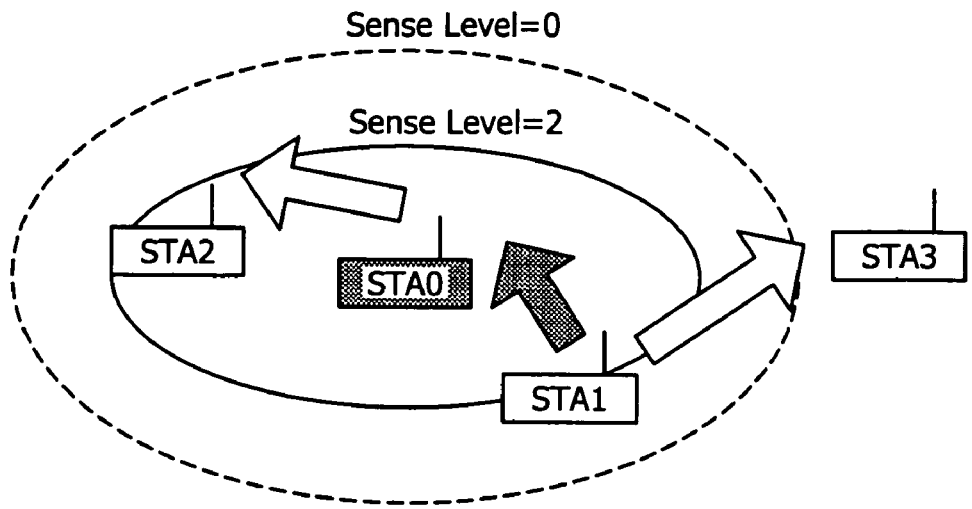
FIG. 27 is a diagram showing a state in which, even though a communication station extends the executable-reception range to a maximum range, no interfering communication station appears.

FIG. 27 is a diagram showing a state in which, even though communication station STA0 sets a sense level of its own at 2 and then changes the sense level to 0 for some reasons in order to extend the executable-reception range to a maximum range, no interfering communication station exists. In such a case, communication station STA0 should keep the sense level at 0 and carries out communications in the maximum executable-communication range.

Figure 28:
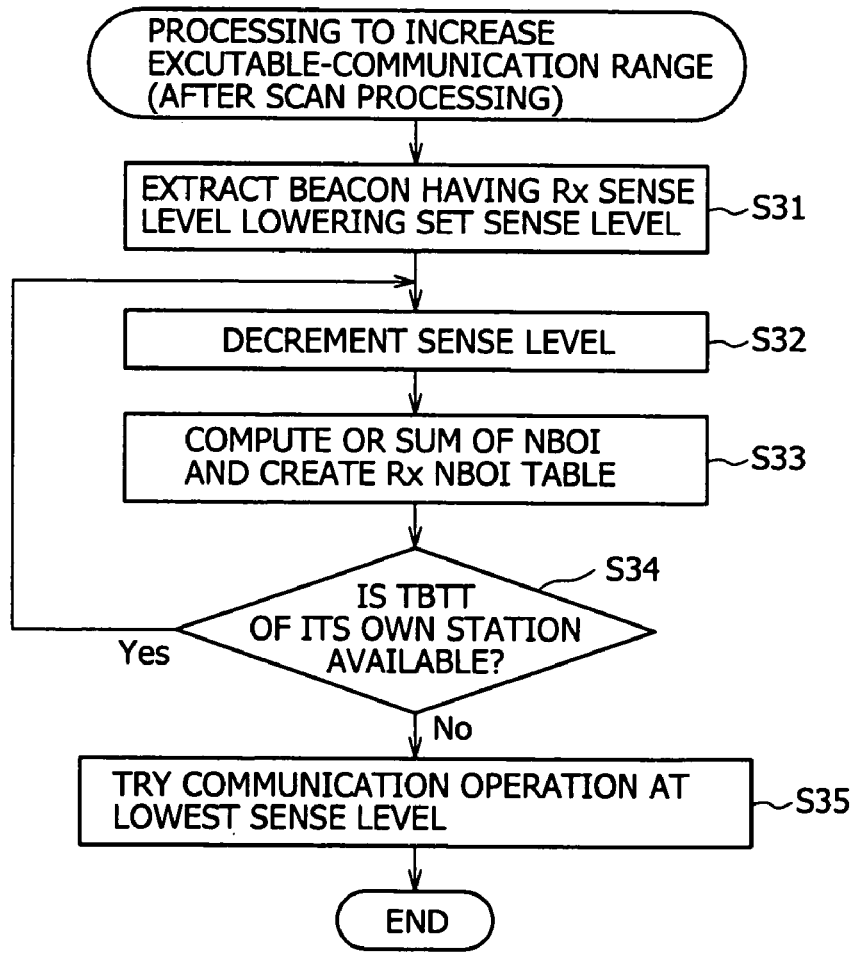
FIG. 28 shows a flowchart representing a processing procedure executed by a communication station to increase an executable-communication range of its own.

FIG. 28 shows a flowchart representing a processing procedure executed by a communication station to increase an executable-communication range of its own. This processing is typically carried out after performing the scan processing described above to grasp the most recent communication state of surrounding communication stations. A communication station limiting its executable-reception range or executable-transmission range but desiring to extend the executable-reception range or the executable-transmission range carries out the following processing.

First of all, at a step S31 at the beginning of the flowchart, the communication station extracts only a beacon with an Rx sense level lower than the current sense level.

Then, at the next step S32, the communication station decrements the value of the sense level. Subsequently, at the next step S33, the communication station creates an Rx NBOI table by taking every beacon accompanying an RX sense level at least equal to the sense level updated at the immediately preceding step S32 as an object of tabulation.

Then, at the next step S34, the communication station examines the Rx NBOI table to determine whether or not a table bit position corresponding to its own target beacon transmission timing TBTT set by the communication station itself has been marked.

If the examination of the Rx NBOI table leads to a determination result indicating that the table bit position corresponding to its own target beacon transmission timing TBTT set by the communication station itself has not been marked, a band can supposedly be allocated without a problem even if the sense level has been updated to the present value. In this case, the flow of the procedure goes on to a step S35 to recognize the fact that, in the future, the sense level can be lowered to the present value. If the determination result obtained at the step S34 indicates that the table bit position corresponding to its own target beacon transmission timing TBTT set by the communication station itself has been marked but the value of the sense level is still greater than 0, on the other hand, the flow of the procedure goes back to the step S32 at which the processing described above is repeated to further increase the executable-reception range.

As described above, the communication station cerates an Rx NBOI table while decrementing the value of the sense level and, if the table bit position corresponding to its own target beacon transmission timing TBTT set by the communication station itself has not been marked, processing to change the sense level to the present value is carried out.

The processing carried out by a communication station to increase the executable-communication range as described above is processing carried out in a case appropriate for a request of an application handled by the communication station. The processing is not processing that must be activated each time scan processing is carried out.

F. Accommodating Communication Stations Serving as a Master and a Slave

In a radio communication system having the autonomous-distribution type as described above, all communication stations are assumed to transmit beacons. However, the radio communication system may accommodate a communication station that carries out only little processing and makes requests for only traffic of a not-so-large amount.

Figure 29:
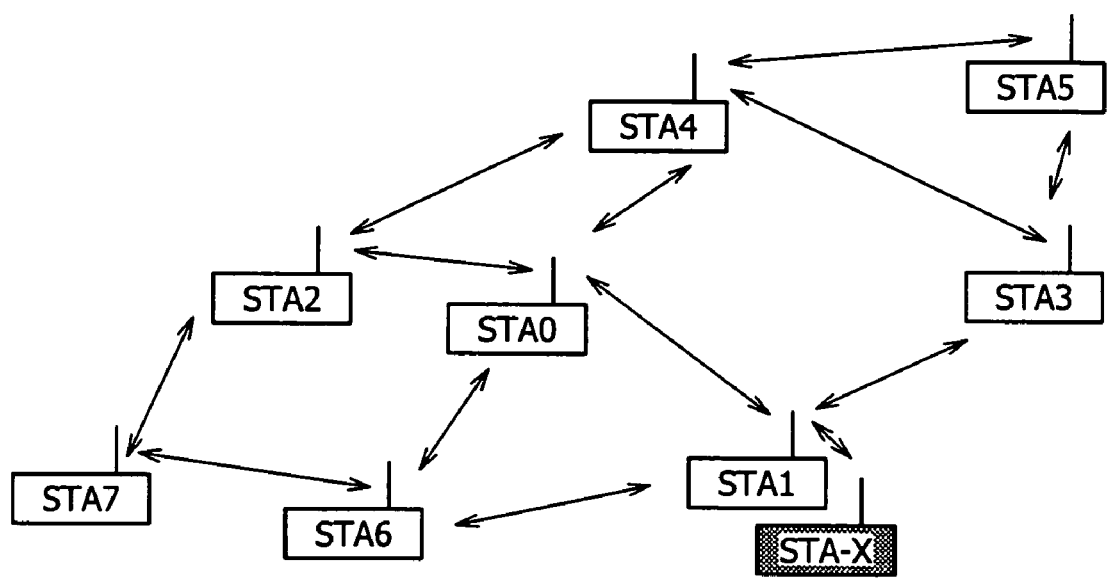
FIG. 29 is a diagram showing a network topology of a radio communication system including a communication station carrying out only little processing.

FIG. 29 is a diagram showing a network topology of a radio communication system including a communication station carrying out only little processing. In the radio communication system shown in the figure, communication stations STA0 to STA7 are each an ordinary communication station, which transmits at least a beacon in every super frame. The ordinary communication stations are each in a position of being capable of carrying out a direct communication with a partner if receiving and transmitter communication stations are in an executable-communication range allowing the receiving and transmitter communication stations to exchange information.

Consider existence of little-processing communication station STA-X which makes only a request for a connection with communication station STA1. For example, communication station STA-X carries out only processing to receive a content distributed by communication station STA1 as a stream. It is thus obvious that communication station STA-X operates at a location very adjacent to communication station STA1 from the application point of view.

In such a case, communication station STA-X informs communication station STA1 of the existence of communication station STA-X by venturing to transmit a massage describing a request for an application to communication station STA1 without transmitting a beacon in processing to obtain an allocated resource from communication station STA1.

A communication procedure executed by communication station STA-X carrying out only little-processing is explained in detail as follows.

Basically, communication station STA-X does not initiate a transmission action autonomously. That is to say, even if communication station STA-X has data to be transmitted, communication station STA-X transmits the data to communication station STA1 only in the form of a response to a polling packet transmitted by communication station STA1 to communication station STA-X. When communication station STA1 recognizes a state in which communication station STA-X carrying out only little-processing desires a communication with communication station STA1, communication station STA1 activates processing to transmit a polling packet to communication station STA-X in a transmission-prioritized period TPP immediately following a regular beacon transmitted by communication station STA1.

Figure 30:
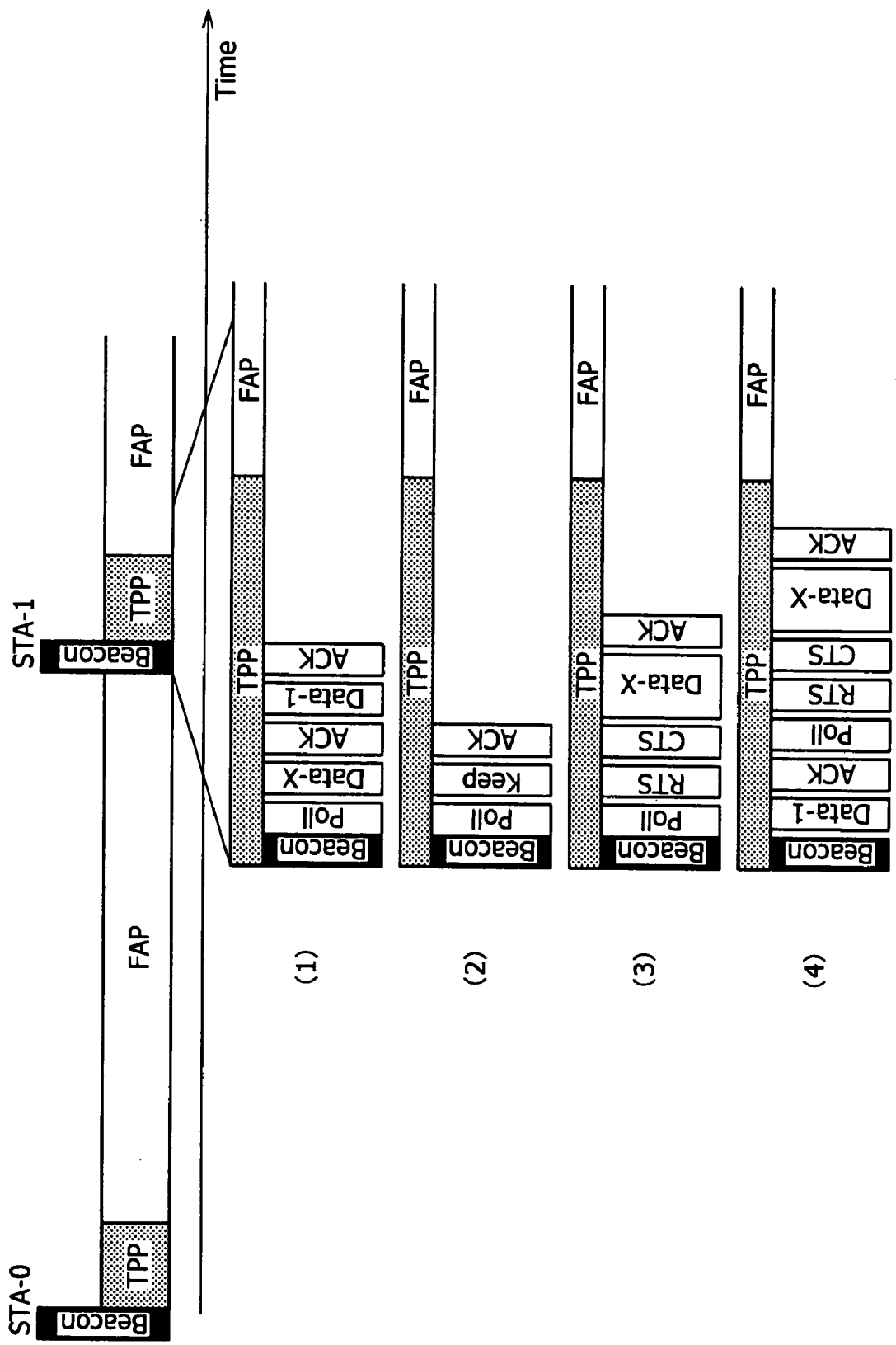
FIG. 30 is an explanatory diagram showing a communication procedure executed between a communication station carrying out only little-processing and a communication station to be connected with the communication station carrying out only little-processing.

FIG. 30 is an explanatory diagram showing a communication procedure executed between a specific communication station carrying out only little processing and a communication station to be connected to the specific communication station. It is needless to say that not only data from communication station STA1 to communication station STA-X carrying out only little processing is transmitted in the TPP of communication station STA1 but data from communication station STA-X to communication station STA1 is also transmitted in the TPP of communication station STA1. The figure shows 4 variations as follows.

In part (1) of FIG. 30, communication station STA1 transmits a polling frame denoted by reference notation Poll to communication station STA-X right after transmitting a beacon of its own. The duration field of the polling frame typically indicates a time duration, which is long enough for receiving data of an estimated small amount from communication station STA-X. In response to this polling frame, communication station STA-X transmits data denoted by reference notation Data-X if the data exists in communication station STA-X as data to be transmitted to communication station STA1. Then, if communication station STA1 successfully receives the data, communication station STA1 transmits an ACK packet to communication station STA-X. In the example shown in part (1) of the figure, communication station STA1 further transmits data denoted by reference notation Data-1 to communication station STA-X.

In a communication procedure shown in part (2) of FIG. 30, communication station STA1 transmits a polling frame denoted by reference notation Poll to communication station STA-X right after transmitting a beacon of its own, but no data exists in communication station STA-X as data to be transmitted to communication station STA1. In this case, communication station STA-X transmits a keep-alive frame to communication station STA1 to inform communication station STA1 of the existence of communication station STA-X. Receiving the keep-alive frame, communication station STA1 recognizes the fact that communication station STA-X still exists in the executable-communication range in a state of being capable of communicating with communication station STA1. It is to be noted that the keep-alive frame does not have to be transmitted every time a polling frame is received. Instead, the keep-alive frame is typically transmitted once for at least every several received polling frames. As an alternative, it is nice to transmit the keep-alive frame at a frequency causing communication station STA1 to recognize the fact that communication station STA-X has not disappeared yet.

As described above, the duration field of the polling frame typically indicates a time duration, which is long enough for receiving data of an estimated small amount from communication station STA-X. However, communication station STA-X may presumably have data of an amount exceeding the estimated one as data to be transmitted to communication station STA1 in some cases. Part (3) of FIG. 30 shows a transmission/reception procedure for such cases.

First of all, communication station STA1 transmits a polling frame. Then, communication station STA-X receiving the polling frame makes an attempt to transmit data to communication station STA1 but communication station STA-X knows that the transmission of the data is impossible due to the fact that the amount of data to be transmitted is greater than an amount corresponding to a time duration shown in the duration field of the polling frame. In order to solve this problem, communication station STA-X transmits an RTS frame in place of the data to communication station STA1. In response to the RTS frame, communication station STA1 transmits a CTS frame to communication station STA-X. In response to the CTS frame, communication station STA-X starts a transmission of the data to communication station STA1. That is to say, communication station STA-X activates an access operation based on the RTS/CTS procedure in response to the polling frame.

Part (4) of FIG. 30 shows a state in which communication station STA1 utilizes a transmission-prioritized period TPP obtained right after a transmission of a beacon of its own to transmit data. As shown in part (4) of the figure, without transmitting a polling frame to communication station STA-X connected to communication station STA1, communication station STA1 starts a transmission of the data to communication station STA-X carrying out only little processing. If communication station STA-X receives the data normally, communication station STA-X transmits an ACK frame to communication station STA1.

Then, at a point of time communication station STA1 does not have data to be transmitted anymore, communication station STA1 transmits a polling frame to communication station STA-X as a frame making an inquiry about the existence/non-existence of data to be transmitted to communication station STA1. In the example shown in part (4) of the figure, since communication station STA-X knows that the transmission of the existing data is impossible due to the fact that the amount of data to be transmitted is greater than an amount corresponding to a time duration shown in the duration field of the polling frame, communication station STA-X activates an access operation based on the RTS/CTS procedure in response to the polling frame.

As described above, the communication station carrying out only little processing is not capable of directly communicating with communication stations other than a communication station serving as a sole object of connection. In the above example, the communication station serving as a sole target of connection is communication station STA1 shown in FIGS. 29 and 30. Thus, the communication station carrying out only little processing may set the signal detection capability of its own at a value adjusted to the signal detection capability of the communication station serving as the sole target of connection. Since the specific communication station carrying out only little processing is capable of obtaining the signal detection capability of the communication station serving as the sole target of connection from beacon information, the specific communication station may set the signal detection capability of its own at a value adjusted to the signal detection capability obtained from the beacon information.

As an alternative, assume that if it is desirable to let a communication station carrying out only little processing have a desire to receive a signal from a communication station other the communication station serving as the sole target of connection. In this case, it is desirable to set the signal detection capability of the specific communication station carrying out only little processing at a value smaller than the signal detection capability of the communication station serving as the sole target of connection, that is, it is desirable to set the sense level of the specific communication station at a value higher than the sense level of the communication station serving as the sole target of connection.

It is also desirable to provide a configuration in which the little-processing communication station having its sense level changed from a default value modifies its transmission power too on the basis of a relation like the one shown typically in table 2 for the reason described above.

G. Data-Rate Determination Procedure

FIG. 2 is a diagram showing the format of a frame used in the radio communication system implemented by this embodiment.

Figure 35:
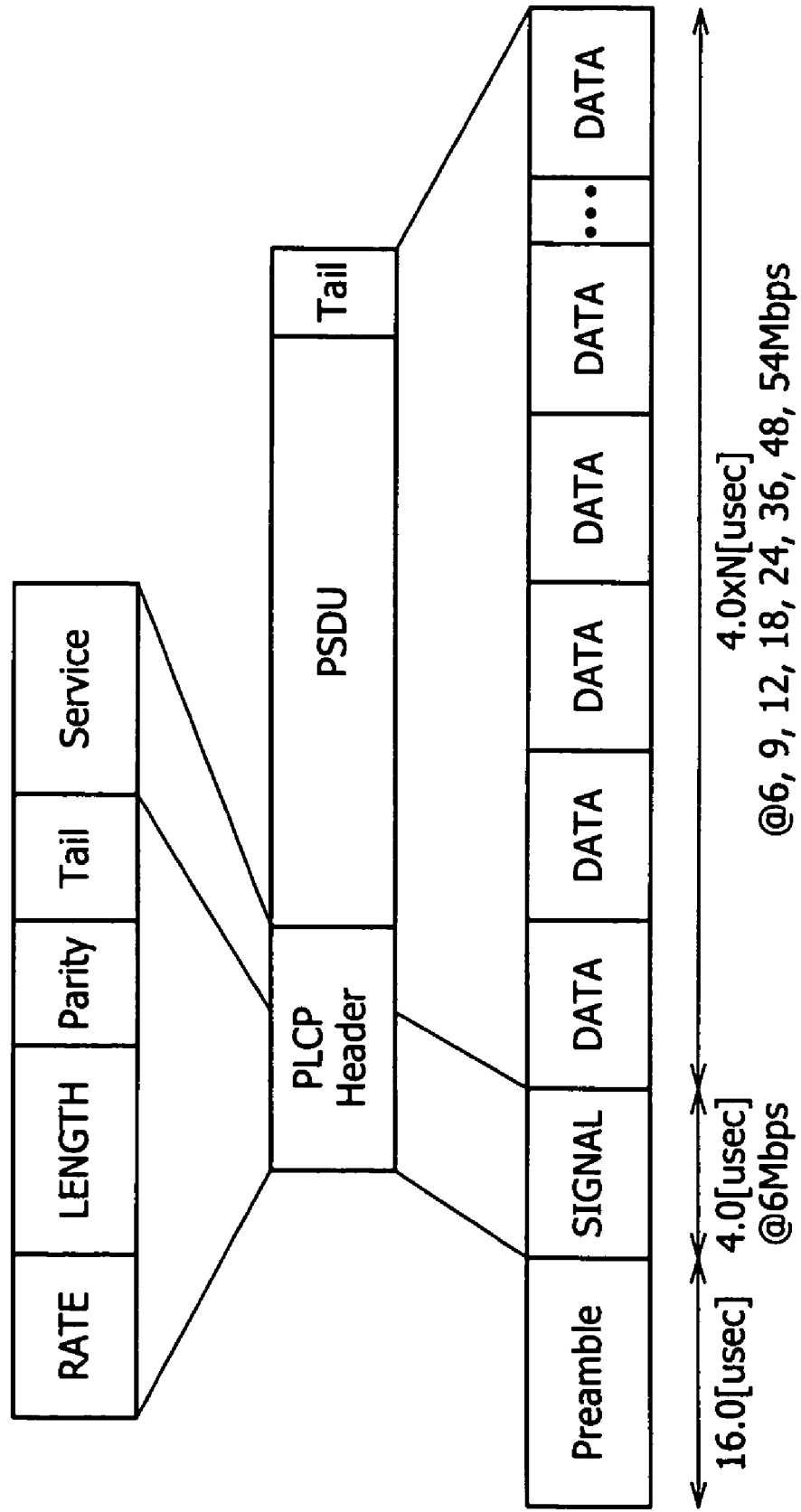
FIG. 35 is a diagram showing a typical configuration of the frame format prescribed in an IEEE802.11a standard, which is an extension standard of IEEE802.11.
Figure 36:
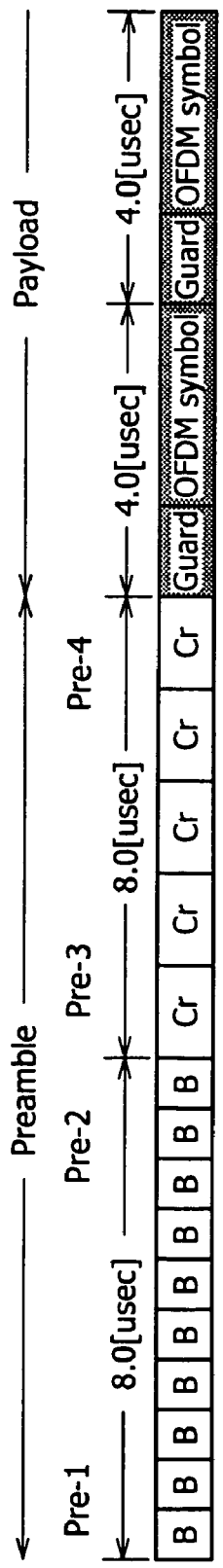
FIG. 36 is a diagram showing a typical structure of a preamble as prescribed in the IEEE802.11a standard.
Figure 37:
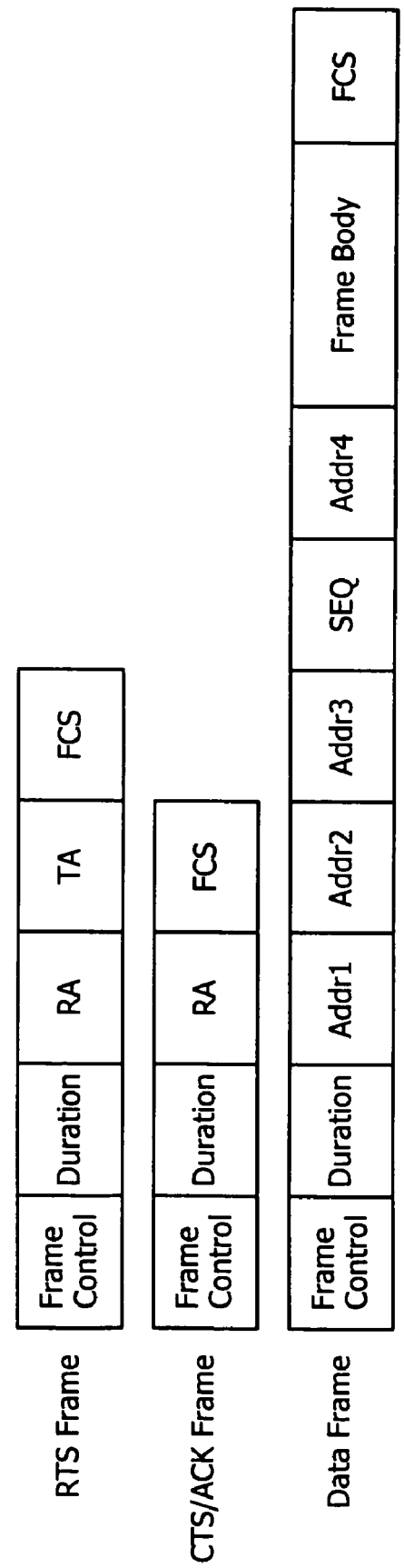
FIG. 37 is a diagram showing a typical structure of a PSDU portion in each of frames defined in the IEEE802.11 standard.

Basically, the format shown in FIG. 2 is not much different from the format shown in FIG. 35 except that the former format includes an additional field named 'Power' as a field showing the transmission power of the signal. Thus, the PLCP header includes the additional field showing the level of the transmission power. However, this field does not have to be included in the PLCP header. In some cases, this field exists at a location corresponding to the MAC header or exists only in a beacon. That is to say, it is important for each of communication stations exchanging data to know the level of the transmission power of the other communication station serving as the partner of the data exchange.

In a radio communication system wherein every communication station knows the executable-transmission range of each of the other communication stations, a communication station transmitting data to another communication station serving as the destination of transmission is capable of determining a proper data rate by inference of the receiver SNR in the other communication station. That is to say, the data-transmitter communication station is capable of inferring the receiver SNR in the data-receiver communication station on the basis of the receiver SNR obtained from a signal received in the past from the data-receiver communication station and the executable-transmission transmission range of the data-receiver communication station as well as an executable-transmission range of its own. Then, the data-transmitter communication station is capable of inferring a proper data rate in accordance with a result of the inference of the SNR.

Figure 31:
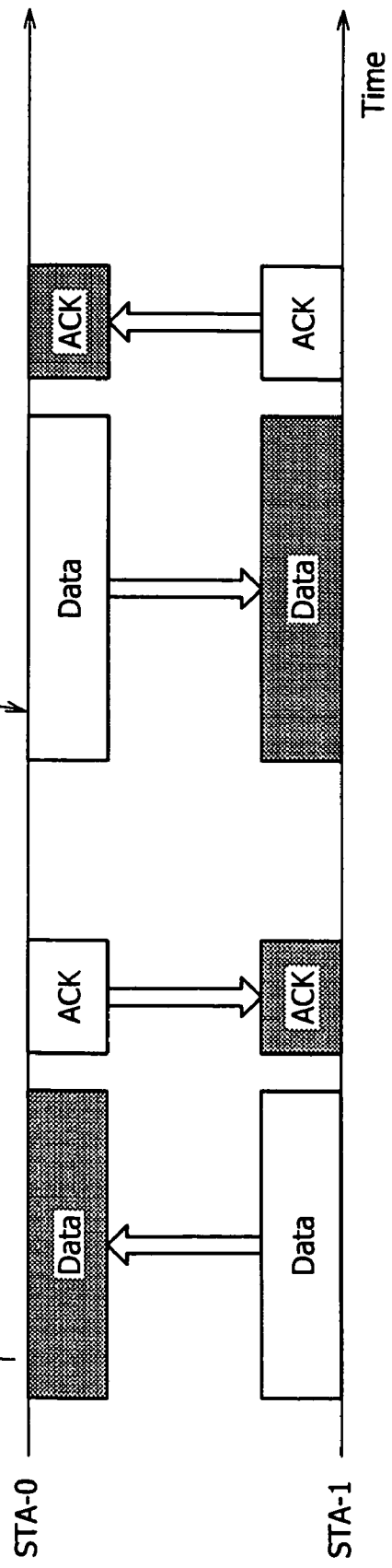
FIG. 31 is an explanatory diagram showing a processing procedure executed by a communication station to determine a data rate in a radio communication system in which every communication station recognizes an executable-transmission range of any other communication station.

By referring to FIG. 31, the following description explains a processing procedure for determining a data rate for a case in which there is no feedback from the data-receiver communication station immediately before the transmission of the data.

In the example shown in the figure, communication stations STA-0 and STA-1 are assumed to be communication stations exchanging data. Receiving some signals such as data from communication station STA-1, communication station STA-0 saves the SINR of the signal received from communication station STA-1 as information [1] and stores the level of the transmission power of communication station STA-1 as information [2].

In addition, communication station STA-0 carries out the following processing as a procedure for determining a data rate for transmission of data to communication station STA-1.

First of all, communication station STA-0 infers the value of the SINR of a signal received from communication station STA-1 as the value of the SINR in communication station STA-1 from the above information [1] and information [2] as well as the transmission of communication station STA-0. Communication station STA-0 uses the inferred value of the SINR as information [3]. The information [3] is computed in accordance with the following equation:

Information [3]=information [1]−information [2]+ transmission power of its own

From the computed information [3], a receiver SINR in the communication station serving as a data transmission destination and a proper data rate are determined. Typically, the communication station has a lookup table prescribing a relation between the receiver SINR and the data rate. In this case, the communication station determines a data rate by referring to the lookup table.

It is to be noted that, in the process of determining a data rate, not only is the lookup table referred to in a simple manner, but the lookup table can also be referred to by additionally considering other parameters including an error rate. As an alternative, a data rate can also be determined on the basis of a result of a filtering process based on the information [3] obtained in the past.

In a word, in a process of inferring a receiver SINR in a communication partner, it is important to take a receiver SINR of its own, the level of a transmission power of its own and the level of the transmission power of the communication partner into consideration.

Figure 32:
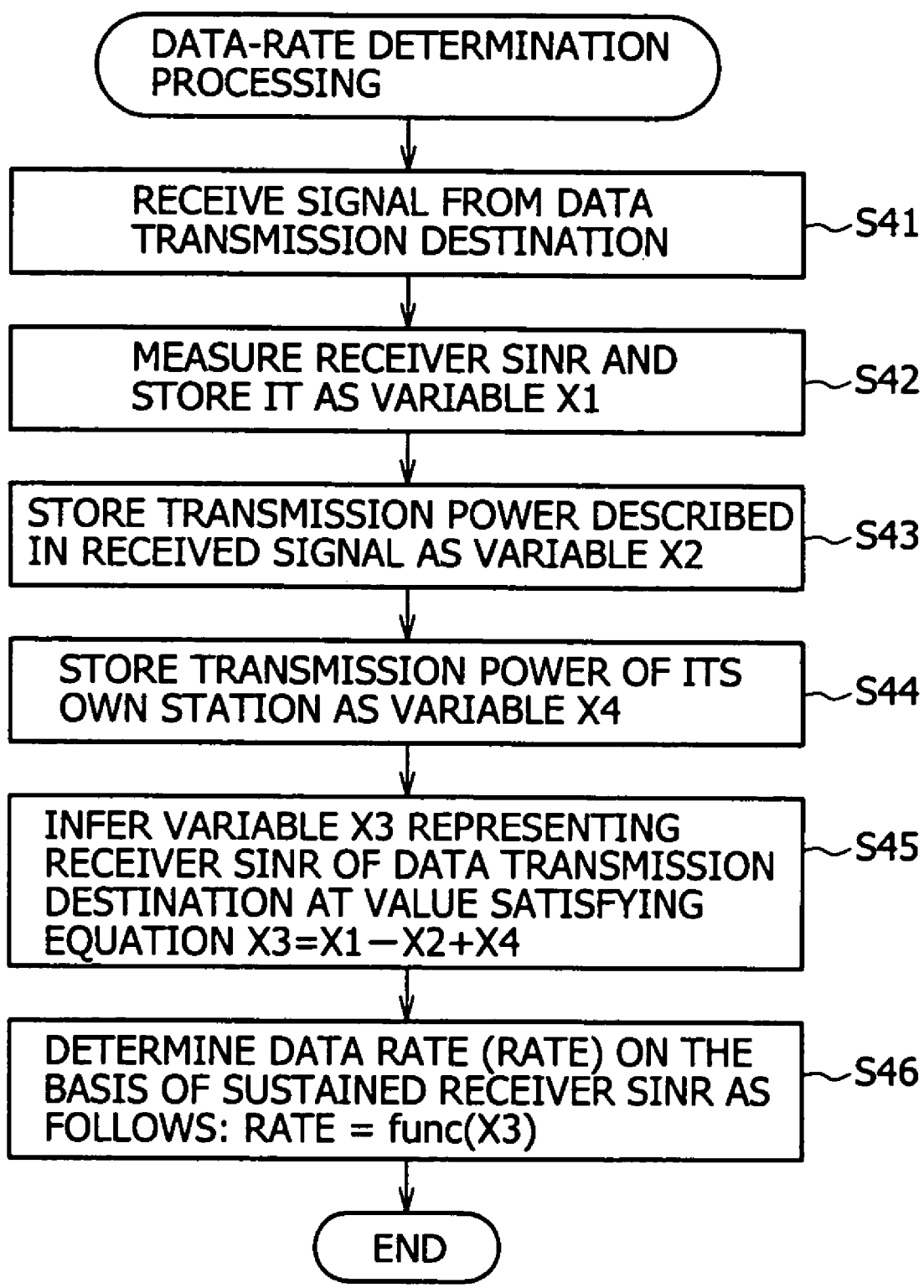
FIG. 32 shows a flowchart representing a processing procedure executed by a communication station to determine a data rate.
Figure 33:
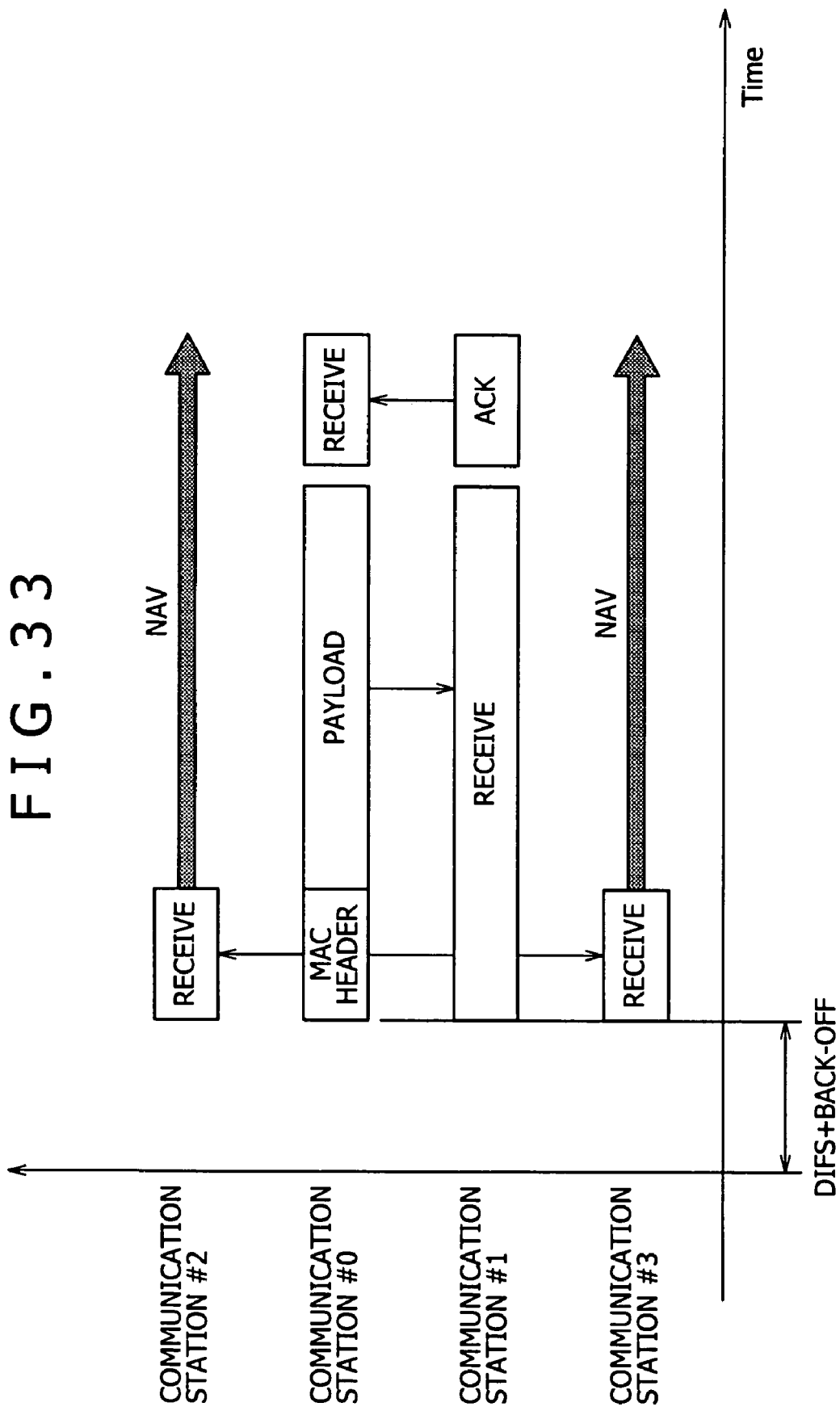
FIG. 33 is an explanatory diagram referred to in describing a transmission/reception procedure based on a CSMA/CA method as an example of the conventional procedure.
Figure 34:
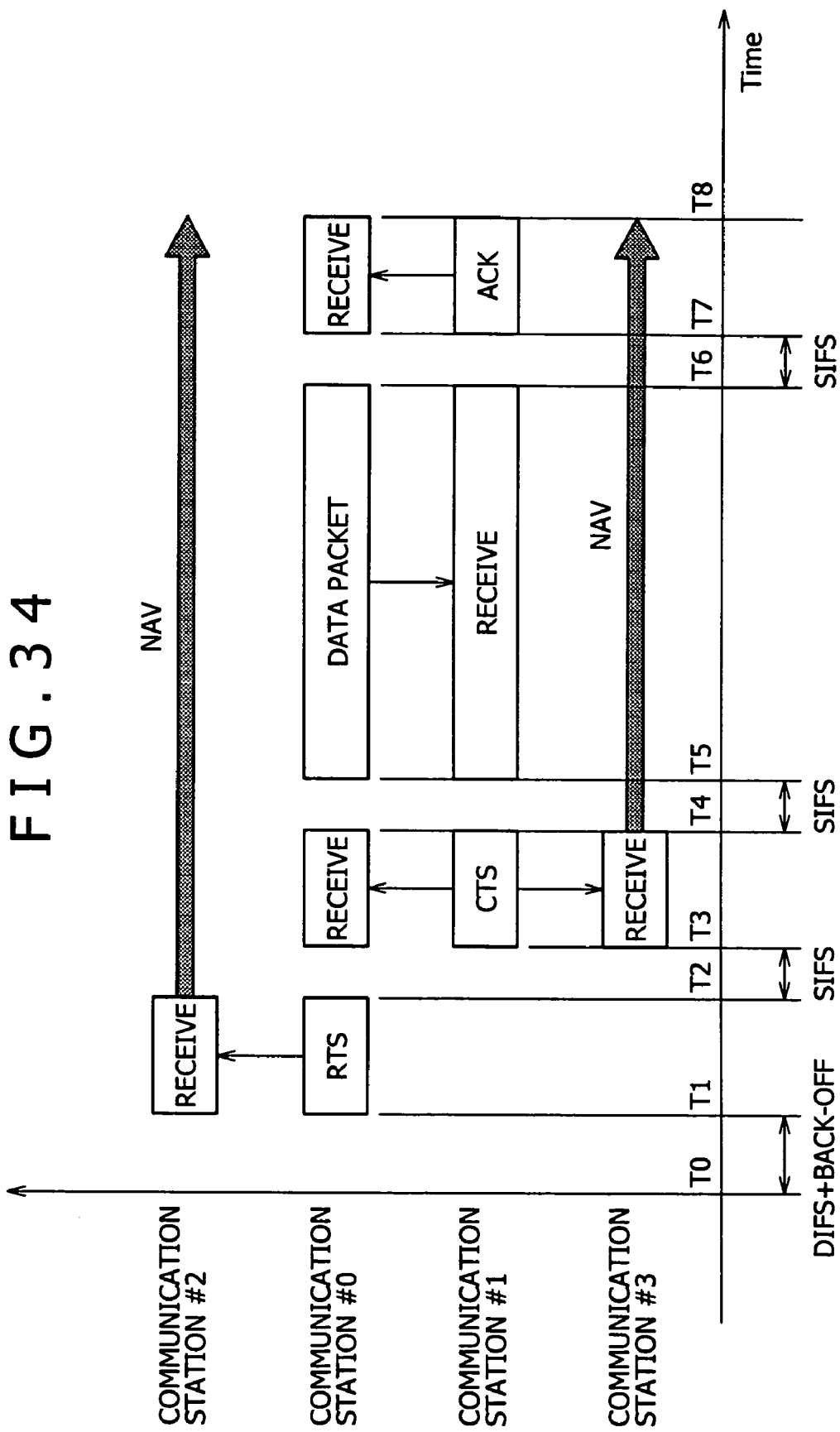
FIG. 34 is an explanatory diagram referred to in describing access control based on an RTS/CTS procedure as an example of the conventional control.

FIG. 32 shows a flowchart representing a processing procedure executed by a communication station to determine a data rate.

First of all, at a step S41 at the beginning or the flowchart, the communication station receives a signal from a data-receiver communication station to serve as the destination of a data transmission. Then, at the next step S42, the communication station measures a receiver SNR from the received signal and stores the receiver SINR as variable X1 [dB].

Subsequently, at the next step S43, the communication station extracts a transmission power (Power) described in the PLCP header of the received signal and stores the extracted transmission power as variable X2 [dBm].

Then, at the next step S44, the communication station determines the transmission power of its own and stores the determined transmission power as variable X4 [dBm].

Subsequently, at the next step S45, the communication station computes an expected receiver SINR[dB] in the communication station to serve as a data-receiver station in accordance with the following equation:

$$X3 = X1 - X2 + X4$$

where symbol X3 denotes the expected receiver SINR in the communication station to serve as a data-receiver station.

Finally, at the last step S46, the communication station computes a data rate as a function of X3 as a data rate proper for transmissions of data to the data-receiver communication station before ending the execution of this whole processing routine.

INDUSTRIAL APPLICABILITY

The present invention has been explained in detail by referring to typical embodiments. It is obvious, however, that a person skilled in the art is capable of making changes to the embodiments and/or conceiving substitutes for the embodiments in a range not deviating from essentials of the present invention.

According to descriptions in this specification, a main embodiment implements a radio communication system in which an executable-communication range of every communication station is determined when the communication station executes control of accesses to communication media while avoiding collisions in accordance with detections of signals transmitted by other communication stations in a radio communication network of the autonomous-distribution type.

If the radio communication system is a communication system in which every communication station executes control of accesses to communication media in accordance with the state of occupation of the media on the basis of mainly the CSMA method, for example, the present invention can also be applied to the system network with a configuration other than the autonomous-distribution type as well. In addition, the present invention can also be applied to a multi-channel system in which every communication station carries out communications by hopping a plurality of frequency channels.

On the top of that, while the embodiments of the present invention have been explained by taking a radio LAN as an example in this specification, essentials of the present invention are not limited to the embodiments. For example, the present invention can also be properly applied to a communication method such as the ultra wide band for transmitting and receiving signals in a lower-SNR environment.

In a word, since the present invention has been disclosed by explaining typical embodiments, the descriptions in this specification should not be interpreted as limitations to the present invention. In order to determine essentials of the present invention, only descriptions given in claims appended to the specification should be referred to.

What is claimed is:

1. A radio communication system allowing each of a plurality of communication stations to access a communication media while avoiding collisions in accordance with detection of signals transmitted by other of the plurality of communication stations or information described in said transmitted signals, comprising:

each of the plurality of communication stations configured to independently set an executable-communication range in which said communication station is capable of transmitting and receiving data, the executable-communication range including an executable-reception range set to match an executable-transmission range, which is set in accordance with a transmission power level of each of the respective plurality of communication stations, wherein each of the respective plurality of communication stations are configured to ignore transmitted signals received from communication stations outside the executable-reception range; and each of the plurality of communication stations configured to check an occupation state of said communication media and set an executable-communication range of its own.

2. The radio communication system according to claim 1 wherein each of the plurality of communication stations exchange information on signal detection capability levels at which signals can be received.

3. A radio communication apparatus configured to access a communication media while avoiding collisions in accordance with detection of signals transmitted by other communication stations or information described in said transmitted signals in a predetermined radio communication environment, said radio communication apparatus comprising:

a communication unit configured to transmit and receive data through a channel;

a media-monitoring unit configured to monitor the occupation state of said communication media; and a communication control unit configured to independently set an executable-communication range in said communication unit on the basis of said communication-media occupation state monitored by said media-monitoring unit, the executable-communication range including an executable-reception range which is set to match an executable-transmission range, which is set in accordance with a transmission power level of the communication unit, wherein the communication control unit is configured to ignore transmitted signals received from communication stations outside the executable-reception range.

4. The radio communication apparatus according to claim 3 wherein said communication unit makes a multi-dimensional connection in time-division multi communication.

5. The radio communication apparatus according to claim 3 wherein said communication control unit controls a signal detection capability of said communication unit to set the executable-reception range of said communication unit and controls a transmission power of said communication unit to set the executable-transmission range of said communication unit.

6. The radio communication apparatus according to claim 3 wherein, when the executable-reception range of said communication unit is changed, said communication control unit sets the executable-transmission range adaptively.

7. The radio communication apparatus according to claim 3 wherein, when the executable-transmission range of said communication unit is changed, said communication control unit sets the executable-reception range adaptively.

8. The radio communication apparatus according to claim 3 wherein said communication control unit recognizes the fact that a communication station adjacent to said radio communication apparatus is sending data by setting the executable-transmission range wider than the executable-transmission range of said communication unit and, as a reaction to such recognition, said communication control unit changes the executable-reception range of said communication unit.

9. The radio communication apparatus according to claim 3 wherein said communication control unit recognizes the fact that said radio communication apparatus is located outside an executable-reception range of an other communication station capable of receiving data transmitted by said radio communication apparatus and, as a reaction to such recognition, said communication control unit changes the executable-reception range of said communication unit.

10. The radio communication apparatus according to claim 3 wherein said communication control unit changes said executable-communication range when a result of determination indicates that reception-power information received from a communication station serving as a communication-partner station is sufficiently high so that data can be transmitted at a desired high data rate even if its transmission power is decreased.

11. The radio communication apparatus according to claim 3 wherein said communication control unit changes said executable-communication range when a result of determination indicates that a period of transmission to a desired communication partner cannot be assured due to the fact that a state in which signals from communication stations other than said desired communication partner are occupying said communication media has been continuing.

12. The radio communication apparatus according to claim 3 wherein said communication control unit changes said executable-communication range when a result of determination indicates ambiguity as to whether one or more communication stations adjacent to said radio communication apparatus are each capable of communicating with said radio communication apparatus due to the fact that said adjacent communication stations are located in the vicinity of the border of a wave range reachable by an electric wave transmitted by said radio communication apparatus.

13. The radio communication apparatus according to claim 3 wherein said communication control unit changes said executable-communication range in accordance with variations in transmission power, transmitted-signal precision, and reception characteristic, which are inherent in communication stations.

14. The radio communication apparatus according to claim 3 wherein said media-monitoring unit checks the occupation state of said communication media and said communication control unit sets said executable-communication range at such a magnitude in accordance with said occupation state of said communication media that the number of communication stations coexisting in said executable-communication range is brought to a value within a predetermined range.

15. The radio communication apparatus according to claim 14 wherein said communication control unit changes the executable-reception range of its own for the purpose of limiting the number of communication stations from which said radio communication apparatus is capable of receiving data.

16. The radio communication apparatus according to claim 14 wherein said communication control unit changes the executable-transmission range of its own for the purpose of limiting the number of communication stations to which said radio communication apparatus is capable of transmitting data.

17. The radio communication apparatus according to claim 14 wherein said communication control unit changes said executable-communication range of its own in accordance with a time band.

18. The radio communication apparatus according to claim 17 wherein said communication control unit changes said executable-communication range of its own only for the neighborhood of a time band of communications with a specific communication station.

19. The radio communication apparatus according to claim 17 wherein said communication control unit extracts media-occupation information according to the executable-transmission range and executable-reception range of both transmitter and receiver communication stations prior to determination of a time band of communications with a specific communication station and determines said communication time band on the basis of said media-occupation information.

20. The radio communication apparatus according to claim 3 wherein:
said radio communication apparatus operates as a communication station in a radio communication environment allowing a beacon signal describing information on a network to be broadcasted in an autonomous-distributed processing way;
said radio communication apparatus further comprises means for generating a beacon signal, means for analyzing a beacon signal, and means for carrying out scan processing to receive a signal from an other adjacent communication station; and
said communication control means sets the executable-reception range of its own at a maximum in execution of said scan processing.

21. The radio communication apparatus according to claim 20 wherein, if a result of said scan processing reveals that a sufficient band can be allocated even if said communication control unit increases said executable-communication range, said communication control unit carries out processing to increase said executable-communication range.

22. The radio communication apparatus according to claim 3 wherein, if said radio communication apparatus operates as a slave station capable of communicating only with a master station, said communication control unit sets the executable-reception range of its own at a value not exceeding an executable-reception range of said master station.

23. The radio communication apparatus according to claim 22 wherein said communication control unit transmits a response signal reporting existence of its own radio communication apparatus to said master station in response to a signal received from said master station.

24. The radio communication apparatus according to claim 3, said radio communication apparatus further comprising:
an interface configured to exchange information on a transmission power with other communication stations through said communication unit; and
an interface configured to acquire a receiver SNR upon reception of a signal from an other communication station, wherein, when said radio communication apparatus transmits data to an other communication station,
wherein said communication control unit is configured to:
estimate a receiver SNR of said other communication station on the basis of a receiver SNR acquired from a signal received in the past from said other communication station as well as transmission powers of said radio communication apparatus and said other communication station; and
determine a data rate in accordance with a result of said estimation.

25. A radio communication method for controlling operations of a radio communication apparatus making accesses to communication media while avoiding collisions in accordance with detection of signals transmitted by other communication stations or information described in said transmitted signals in a predetermined radio communication environment, said radio communication method comprising:
monitoring the occupation state of said communication media; and
setting independently an executable-communication range in a communication unit on the basis of said monitored communication-media occupation state, the executable-communication range including an executable-reception range which is set to match an executable-transmission range, which is set in accordance with a transmission power level of the communication unit, wherein the communication control unit is set to ignore transmitted signals received from communication stations outside the executable-reception range.

26. A memory including a computer program, which when executed by a computer, causes the computer to perform a method of controlling operations of a radio communication apparatus making accesses to communication media while avoiding collisions in accordance with detection of signals transmitted by other communication stations or information described in said transmitted signals in a predetermined radio communication environment, said method comprising:

monitoring the occupation state of said communication media; and setting independently an executable-communication range in a communication unit on the basis of said monitored communication-media occupation state, the executable-communication range including an executable-reception range which is set to match an executable-transmission range, which is set in accordance with a transmission power level of the communication unit, wherein the communication control unit is set to ignore transmitted signals received from communication stations outside the executable-reception range.

* * * * *